United States Patent
Marson et al.

(10) Patent No.: US 12,473,533 B2
(45) Date of Patent: Nov. 18, 2025

(54) GENE TARGETS FOR T-CELL-BASED IMMUNOTHERAPY

(71) Applicant: The Regents of the University of California, Oakland, CA (US)

(72) Inventors: Alexander Marson, Oakland, CA (US); Eric Shifrut, Oakland, CA (US); Julia Carnevale, Oakland, CA (US); Alan Ashworth, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 1090 days.

(21) Appl. No.: 17/259,085

(22) PCT Filed: Jul. 9, 2019

(86) PCT No.: PCT/US2019/041018
§ 371 (c)(1),
(2) Date: Jan. 8, 2021

(87) PCT Pub. No.: WO2020/014235
PCT Pub. Date: Jan. 16, 2020

(65) Prior Publication Data
US 2021/0317406 A1    Oct. 14, 2021

Related U.S. Application Data

(60) Provisional application No. 62/695,672, filed on Jul. 9, 2018.

(51) Int. Cl.
| | |
|---|---|
| *A61K 40/32* | (2025.01) |
| *A61K 40/11* | (2025.01) |
| *A61K 40/42* | (2025.01) |
| *C12N 5/0783* | (2010.01) |
| *C12N 9/22* | (2006.01) |
| *C12N 15/11* | (2006.01) |
| *C12N 15/113* | (2010.01) |

(52) U.S. Cl.
CPC ............ *C12N 5/0636* (2013.01); *A61K 40/11* (2025.01); *A61K 40/32* (2025.01); *A61K 40/4269* (2025.01); *C12N 9/22* (2013.01); *C12N 15/111* (2013.01); *C12N 15/113* (2013.01); *A61K 2239/31* (2023.05); *A61K 2239/38* (2023.05); *A61K 2239/57* (2023.05); *C12N 2310/11* (2013.01); *C12N 2310/141* (2013.01); *C12N 2310/20* (2017.05); *C12N 2310/531* (2013.01); *C12N 2320/34* (2013.01); *C12N 2510/00* (2013.01)

(58) Field of Classification Search
None
See application file for complete search history.

(56) References Cited

U.S. PATENT DOCUMENTS

| | | |
|---|---|---|
| 2016/0122766 A1 | 5/2016 | Wucherpfennig et al. |
| 2017/0175128 A1 | 6/2017 | Welstead |
| 2021/0317406 A1 | 10/2021 | Marson et al. |

FOREIGN PATENT DOCUMENTS

| | | |
|---|---|---|
| CN | 102575227 A | 7/2012 |
| WO | 2008033403 A2 | 3/2008 |
| WO | 2014/201021 A2 | 12/2014 |
| WO | 2017140803 A1 | 8/2017 |
| WO | 2017191274 A2 | 11/2017 |
| WO | 2018049025 A2 | 3/2018 |
| WO | 2018/226685 A2 | 12/2018 |

OTHER PUBLICATIONS

Palmer et al (Trends Immunol. Dec. 2009; 30(12): 592-602. doi:10.1016/j.it.2009.09.009.) (Year: 2009).*
Abate et al (PNAS, Jan. 6, 2017, 114 (4) 764-769, https://doi.org/10.1073/pnas.1608839114). (Year: 2017).*
Boettcher et al (Nat Biotechnol 36, 170-178 (2018). https://doi.org/10.1038/nbt.4062, published online Jan. 15, 2018) (Year: 2018).*
Leary et al, Leukemia Research vol. 11, Issue 9, 1987, pp. 807-815, https://doi.org/10.1016/0145-2126(87)90065-8) (Year: 1987).*
Zhou et al (Nature 506, 52-57 (2014). https://doi.org/10.1038/nature12988) (Year: 2014).*
Wikipedia description of Imatinib (Year: 2024).*
Wikipedia description of Ras p21 protein activator 2 (Rasa2) (Year: 2024).*
National Cancer Institute, "About the RAS Initiative", https://www.cancer.gov/research/key-initiatives/ras/about (Year: 2022).*
Arafeh, et al. "Recurrent inactivating RASA2 mutations in melanoma." Nature genetics 47, No. 12 (2015): 1408-1410.
Pan, et al. "A major chromatin regulator determines resistance of tumor cells to T cell-mediated killing." Science 359, No. 6377 (2018): 770-775.
Seki, et al. "Optimized RNP transfection for highly efficient CRISPR/Cas9-mediated gene knockout in primary T cells." Journal of Experimental Medicine 215, No. 3 (2018): 985-997.
Shang, et al. "Genome-wide CRISPR screen identifies FAM49B as a key regulator of actin dynamics and T cell activation." Proceedings of the National Academy of Sciences 115, No. 17 (2018): E4051-E4060.
Shi, et al. "Cbl-b gene silencing in splenic T lymphocytes as a therapeutic strategy to target the prostate cancer RM-1 cell tumors in immune competent mice." Eur Rev Med Pharmacol Sci 18, No. 24 (2014): 3819-3830.
International Search Report in PCT/US2019/041018, mailed Nov. 14, 2019, 3 pages.

(Continued)

*Primary Examiner* — Christopher M Babic
*Assistant Examiner* — Khoa Nhat Tran
(74) *Attorney, Agent, or Firm* — Kilpatrick Townsend & Stockton LLP

(57) ABSTRACT

Provided herein are genetically modified T cells that exhibit increased proliferation compared to wild-type T cells when stimulated, methods of generating such T cells, and methods of using the T cells for the treatment of a disease such as cancer.

10 Claims, 24 Drawing Sheets

Specification includes a Sequence Listing.

(56) References Cited

OTHER PUBLICATIONS

Boni A, Muranski P, Cassard L, Wrzesinski C, Paulos CM, Palmer DC, Gattinoni L, Hinrichs CS, Chan CC, Rosenberg SA, Restifo NP. Adoptive transfer of allogeneic tumor-specific T cells mediates effective regression of large tumors across major histocompatibility barriers. Blood, The Journal of the American Society of Hematology. Dec. 1, 2008;112(12):4746-54.

Shifrut E, Carnevale J, Ashworth A, Marson A. Genome-wide CRISPR Screens in Primary Human T Cells Reveal Key Regulators of Immune Function.

Wrzesinski C, Paulos CM, Gattinoni L, Palmer DC, Kaiser A, Yu Z, Rosenberg SA, Restifo NP. Hematopoietic stem cells promote the expansion and function of adoptively transferred antitumor CD8+ T cells. The Journal of clinical investigation. Feb. 1, 2007;117(2):492-501.

Zeyda M, Staffler G, Hořejší V, Waldhäusl W, Stulnig TM. LAT displacement from lipid rafts as a molecular mechanism for the inhibition of T cell signaling by polyunsaturated fatty acids. Journal of Biological Chemistry. Aug. 9, 2002;277(32):28418-23.

Zhou P, Shaffer DR, Arias DA, Nakazaki Y, Pos W, Torres AJ, Cremasco V, Dougan SK, Cowley GS, Elpek K, Brogdon J. In vivo discovery of immunotherapy targets in the tumour microenvironment. Nature. Feb. 2014;506(7486):52-7.

Office Action in Application No. CN201980058606.1, mailed Jun. 22, 2024, 23 pages. Including English Translation.

Notice of Second Office Action and Search Report in Application No. CN201980058606.1, mailed Jun. 22, 2024, 6 pages.

Khandelwal et al., "A High-throughput Rnai Screen for Detection of Immune-checkpoint Molecules That Mediate Tumor Resistance to Cytotoxic T Lymphocytes", EMBO Molecular Medicine, vol. 7, No. 4, Apr. 1, 2015, pp. 450-463.

Taneera et al., "Identification of Novel Genes for Glucose Metabolism Based Upon Expression Pattern in Human Islets and Effect on Insulin Secretion and Glycemia", Human Molecular Genetics, vol. 24, No. 7, Apr. 1, 2015, pp. 1945-1955.

* cited by examiner

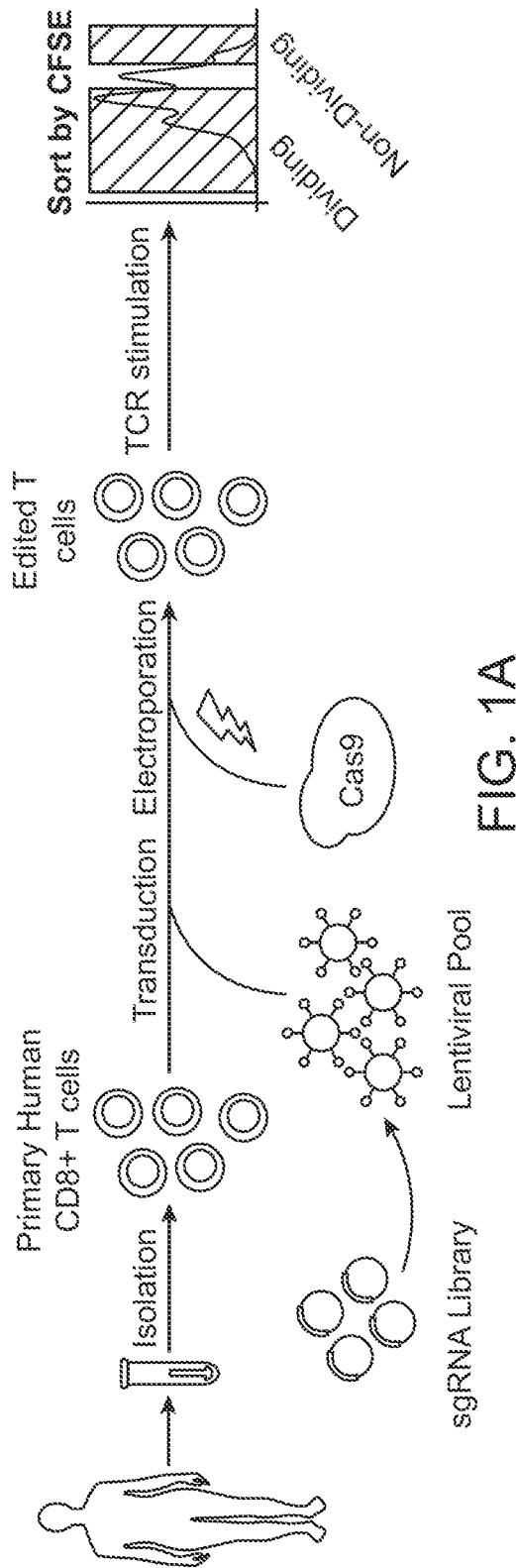
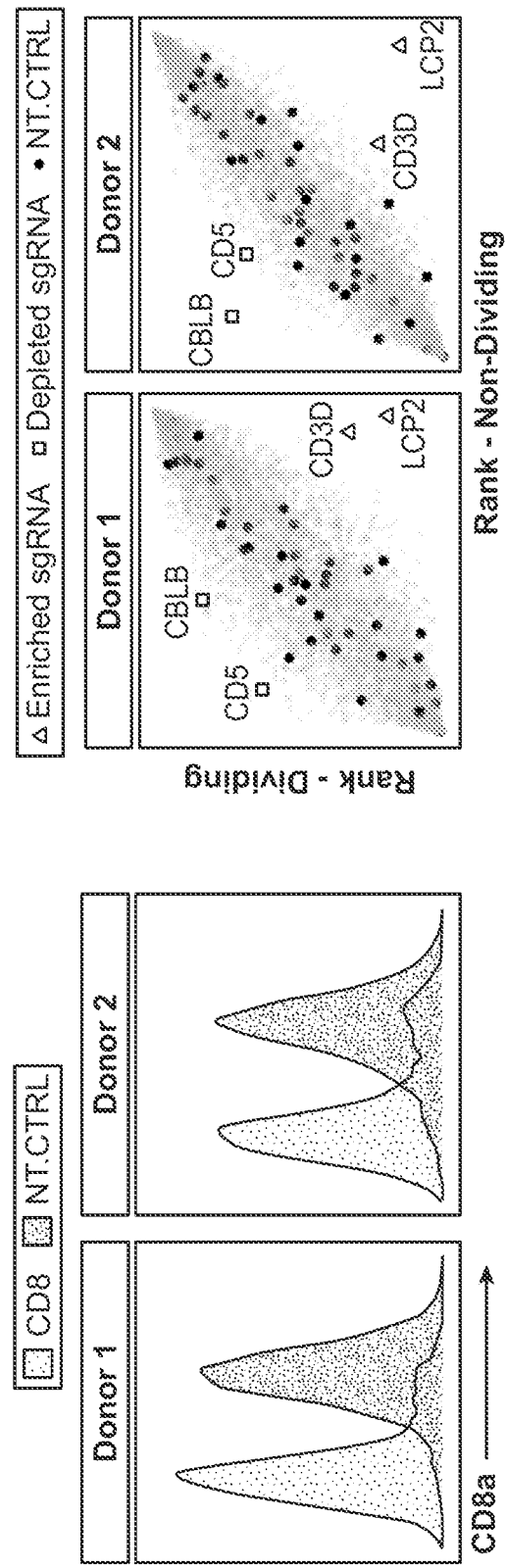
FIG. 1A
FIG. 1B
FIG. 1C

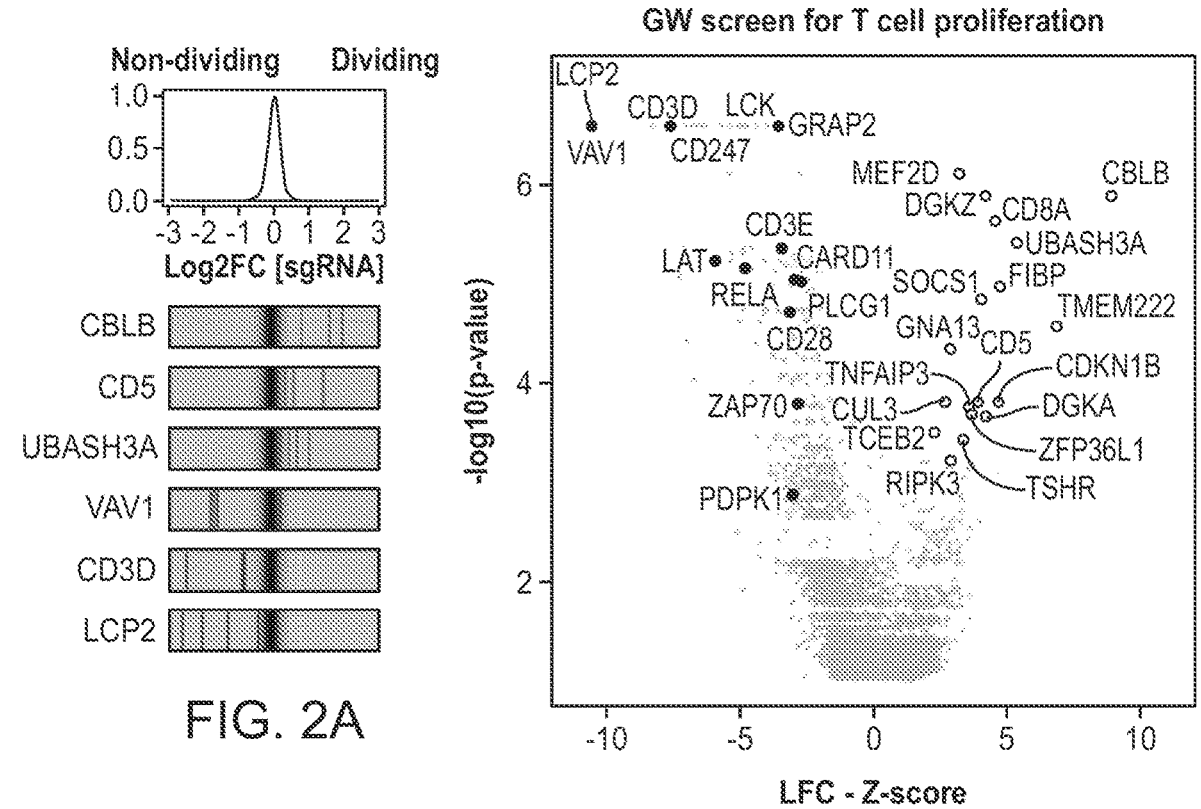
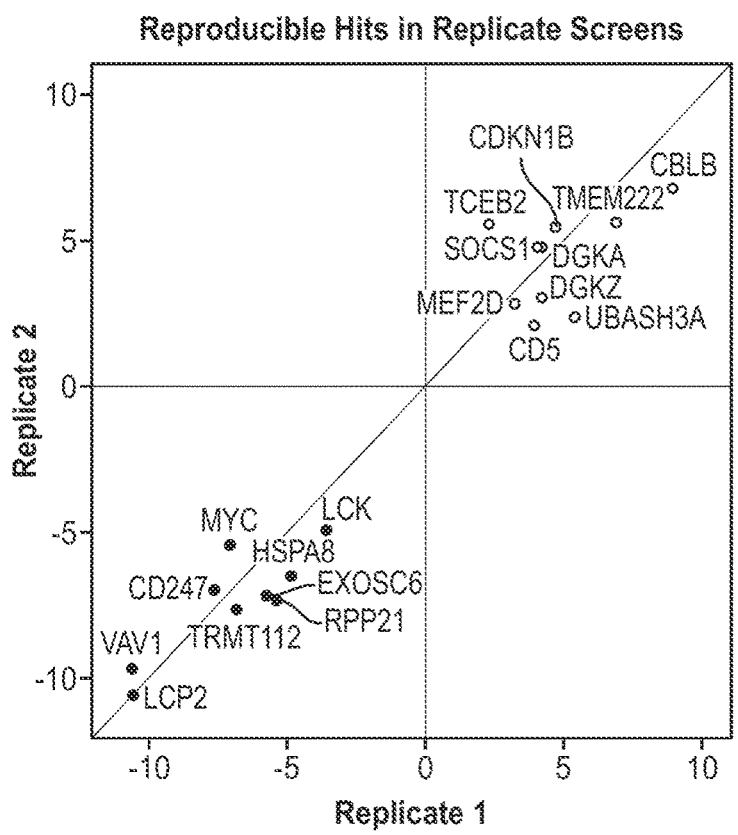
FIG. 2A
FIG. 2B
FIG. 2C

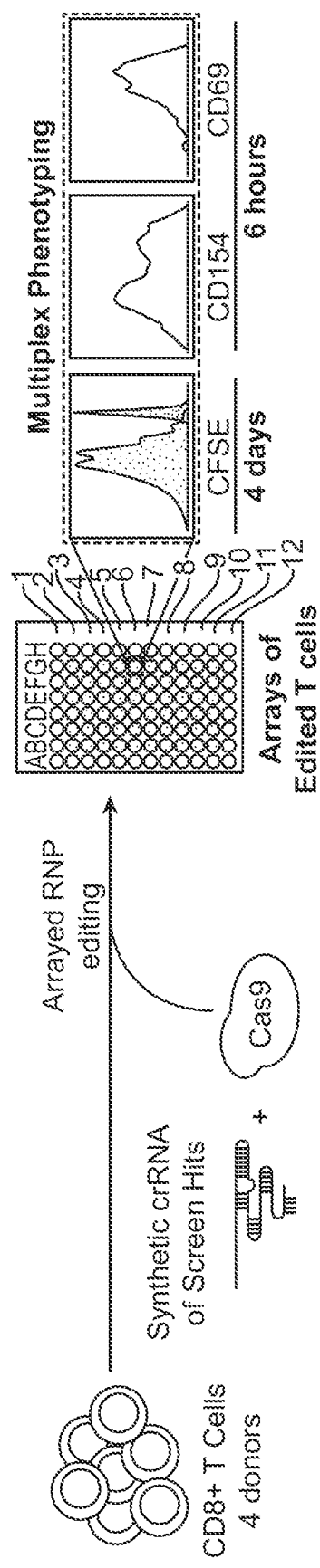
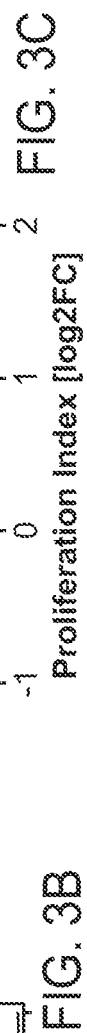
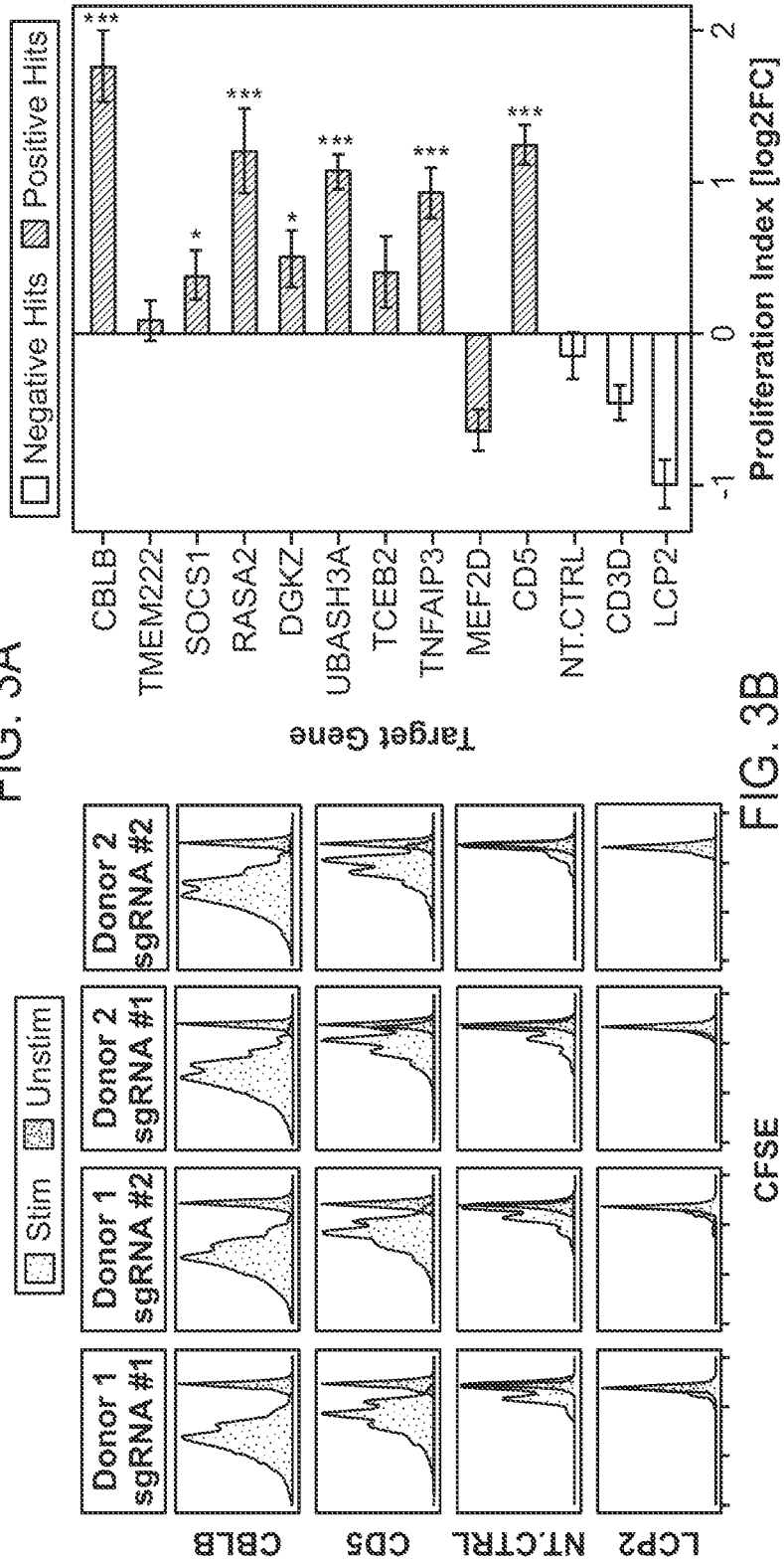

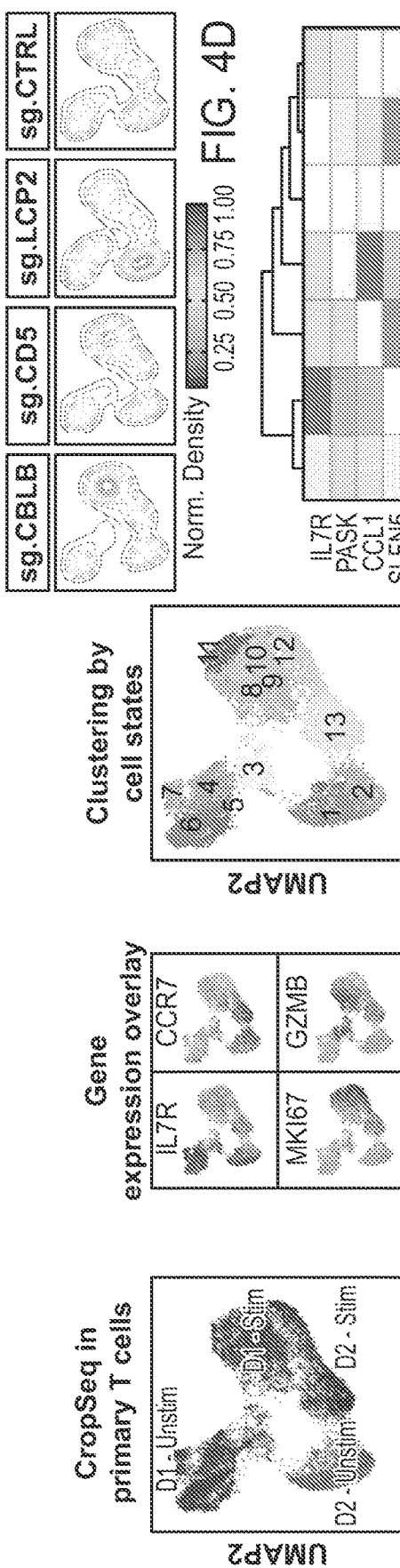
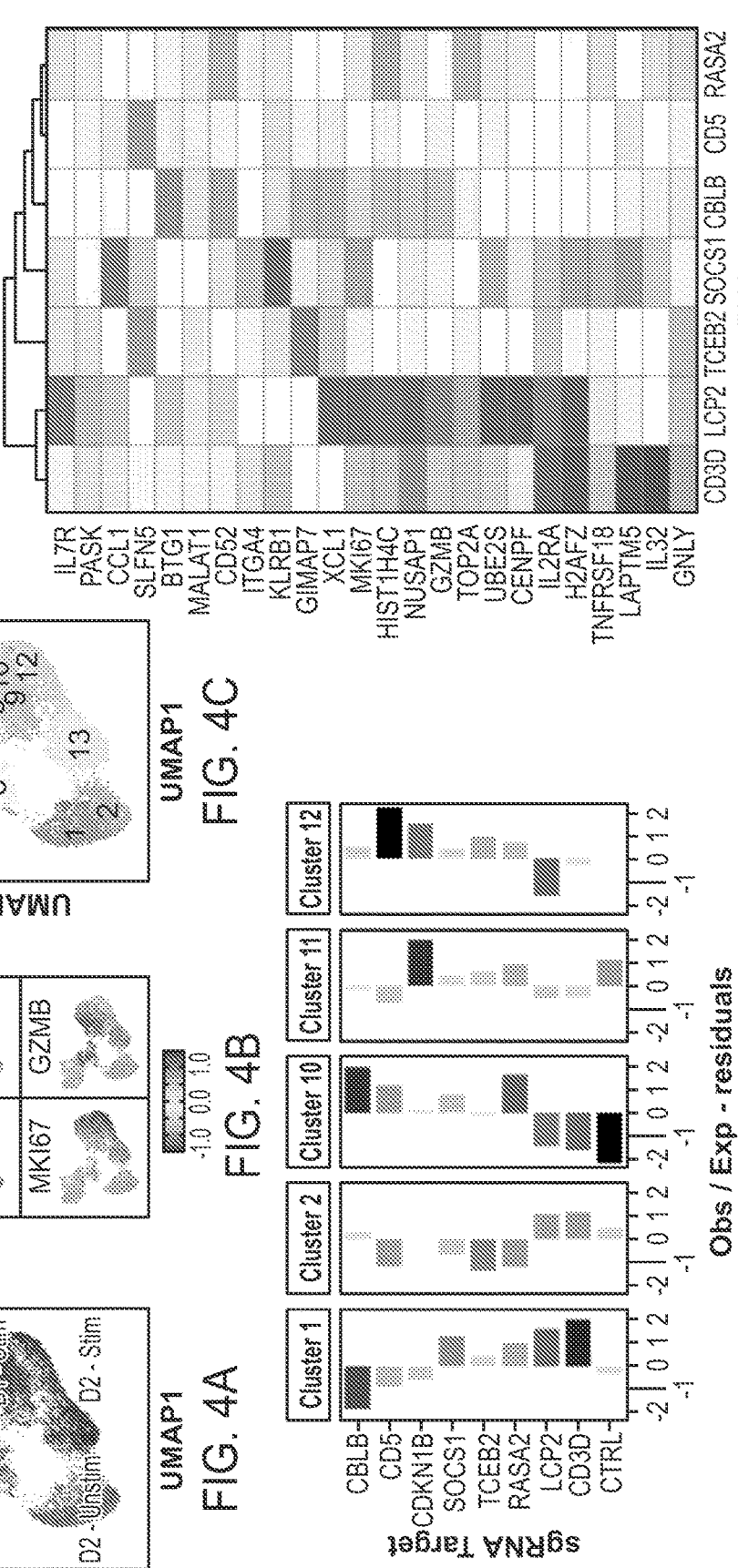
FIG. 4A  FIG. 4B  FIG. 4C  FIG. 4D  FIG. 4E  FIG. 4F

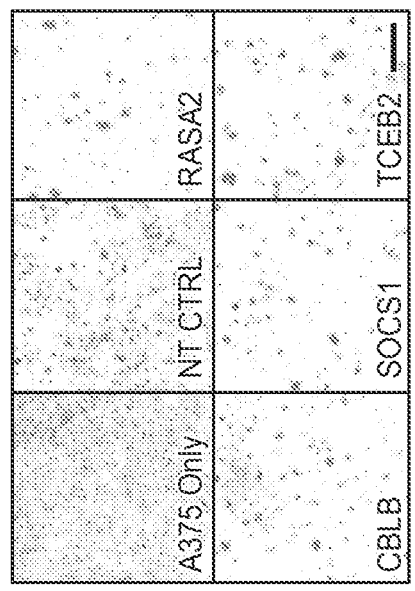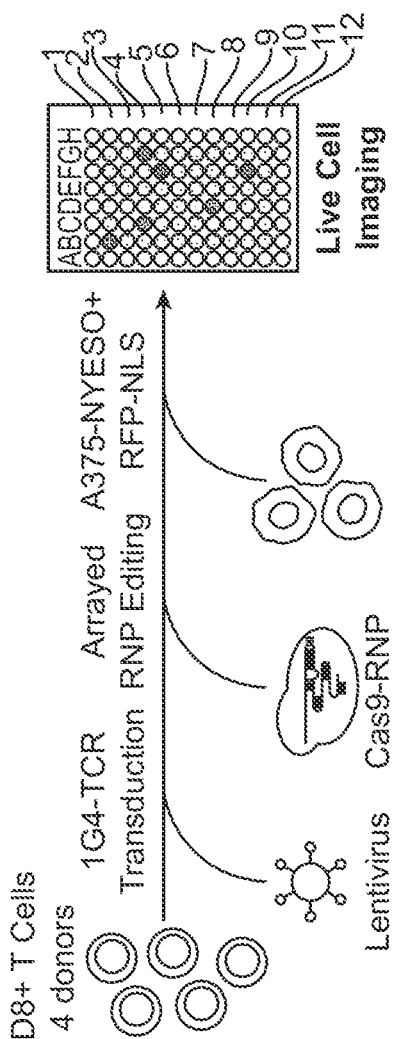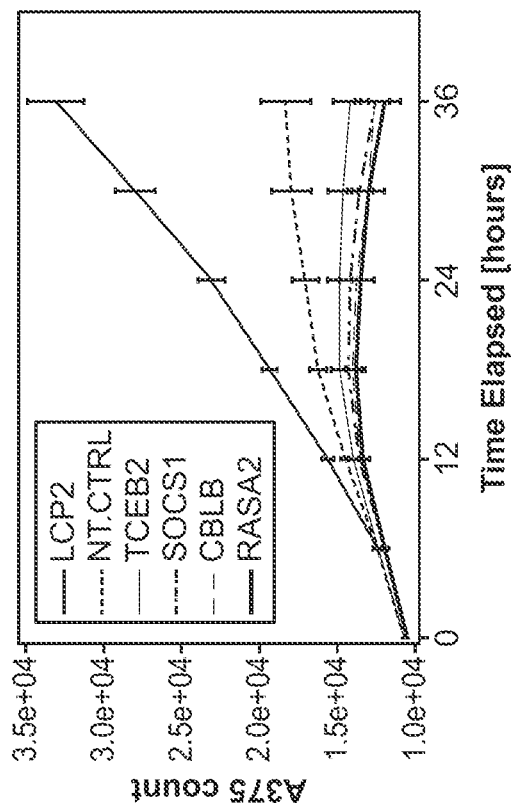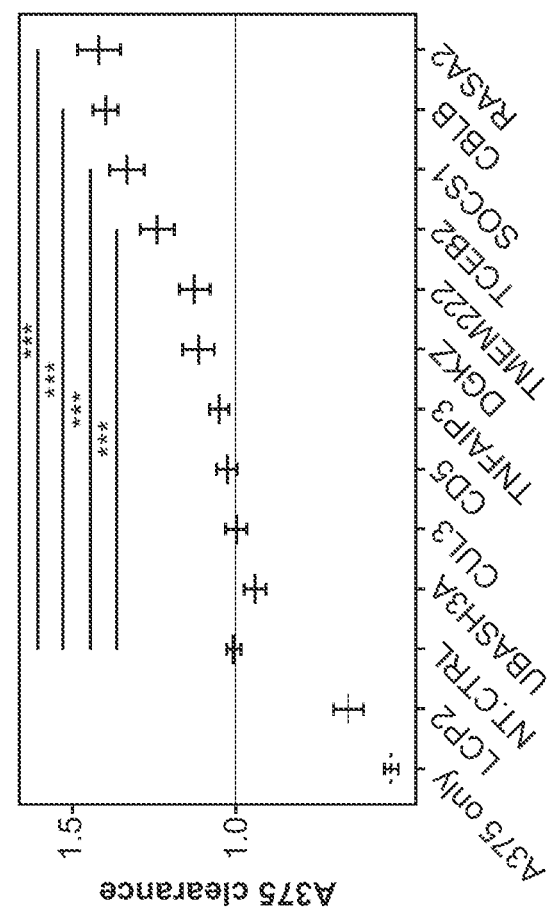
FIG. 5A
FIG. 5B
FIG. 5C
FIG. 5D

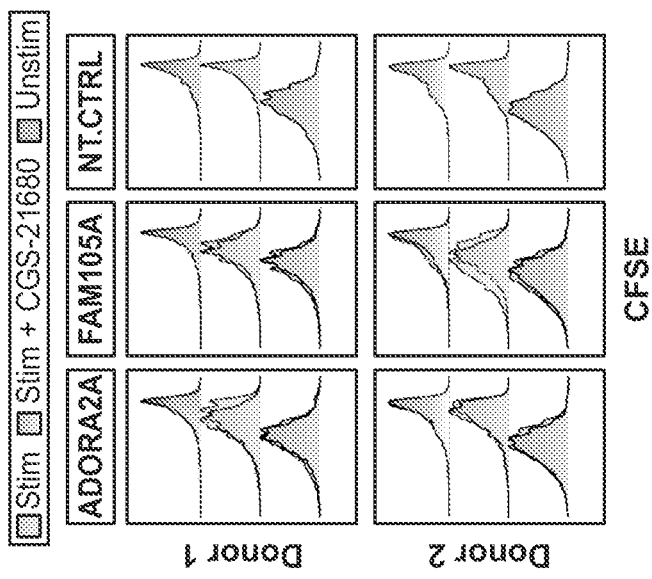
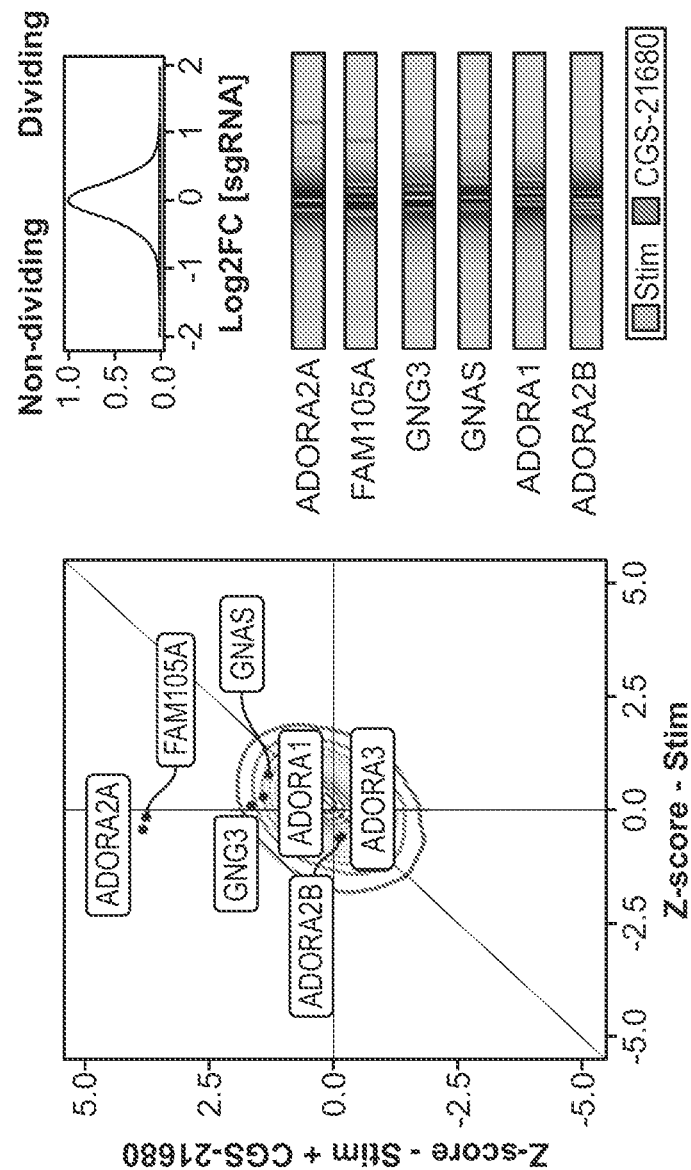
FIG. 6A
FIG. 6B
FIG. 6C

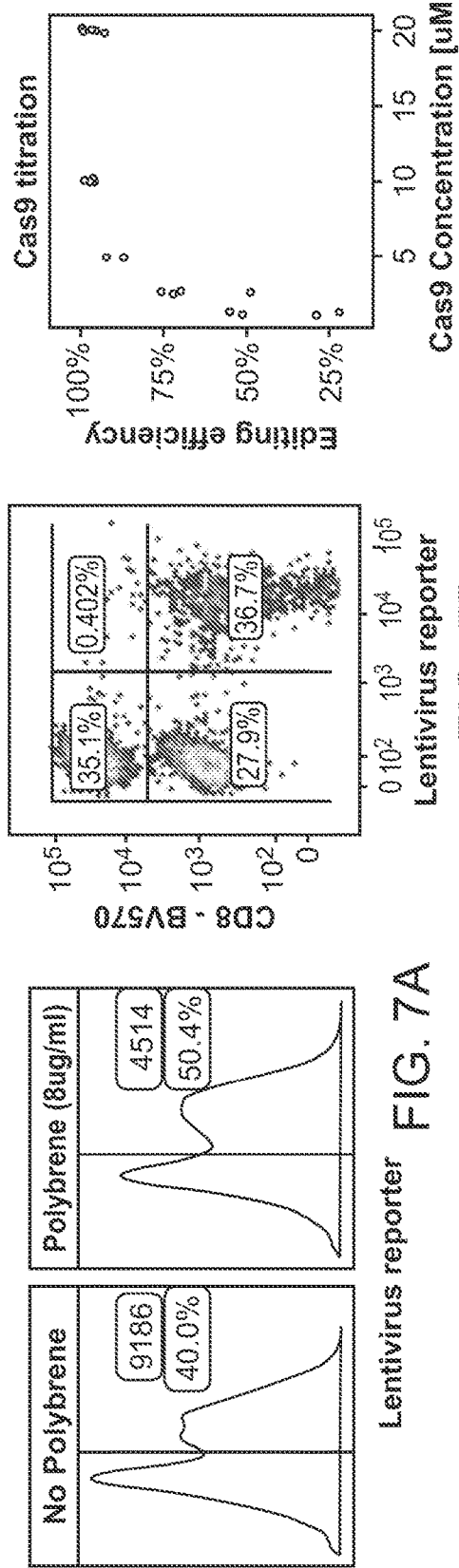
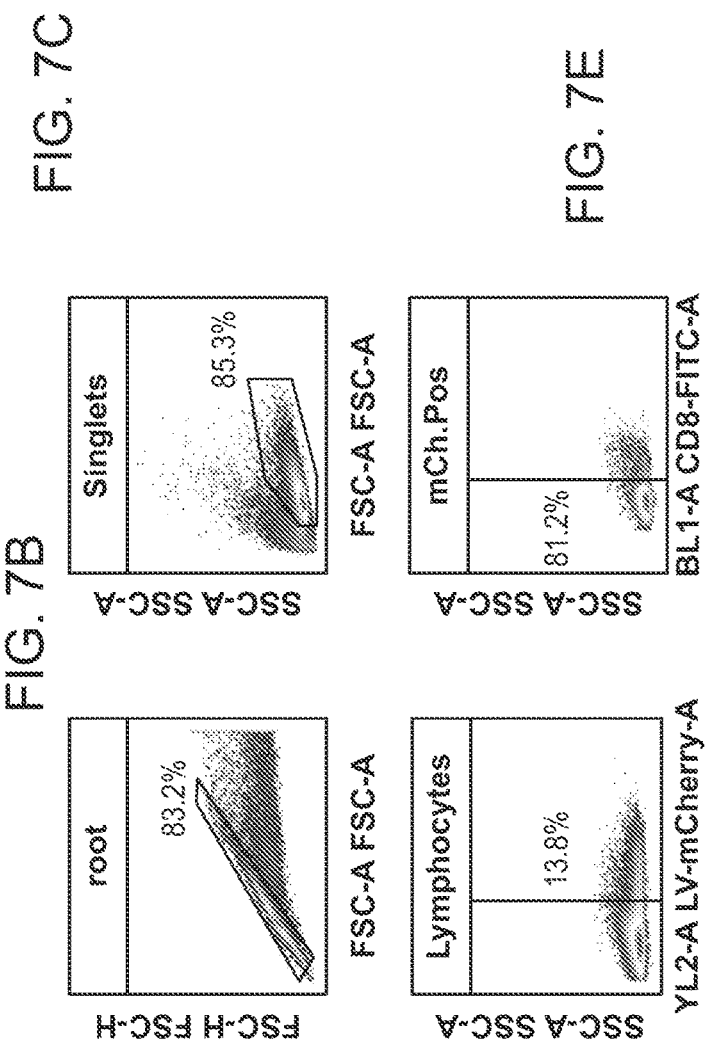
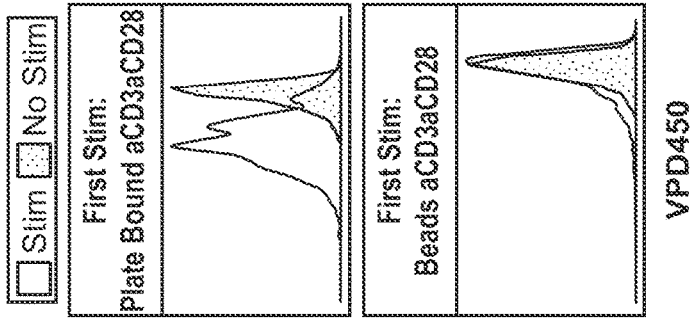
FIG. 7A  FIG. 7B  FIG. 7C  FIG. 7D  FIG. 7E

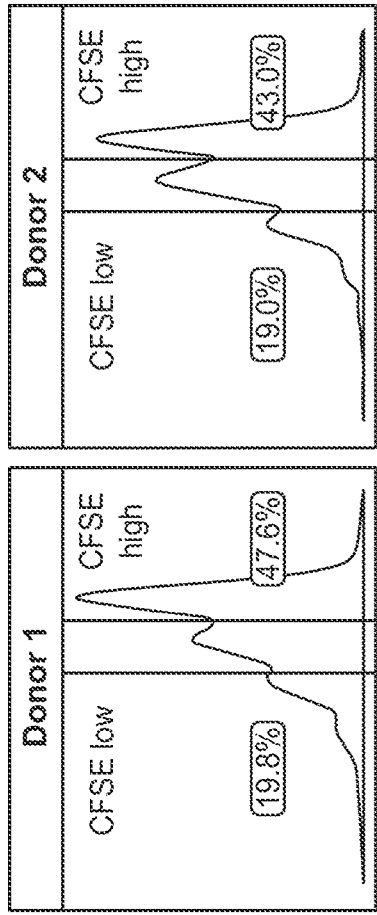
FIG. 7G
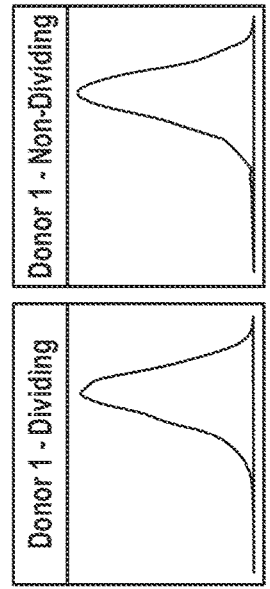
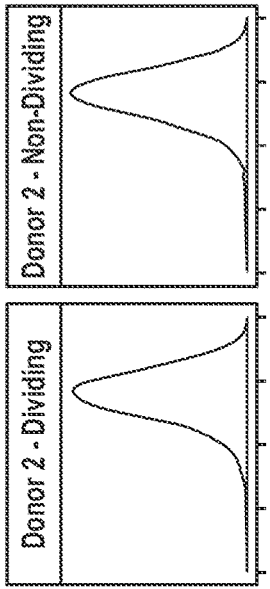
FIG. 7H
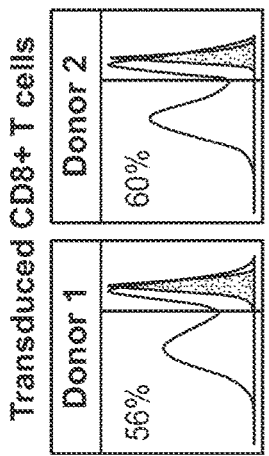
FIG. 7F
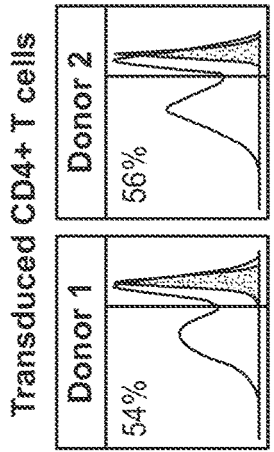

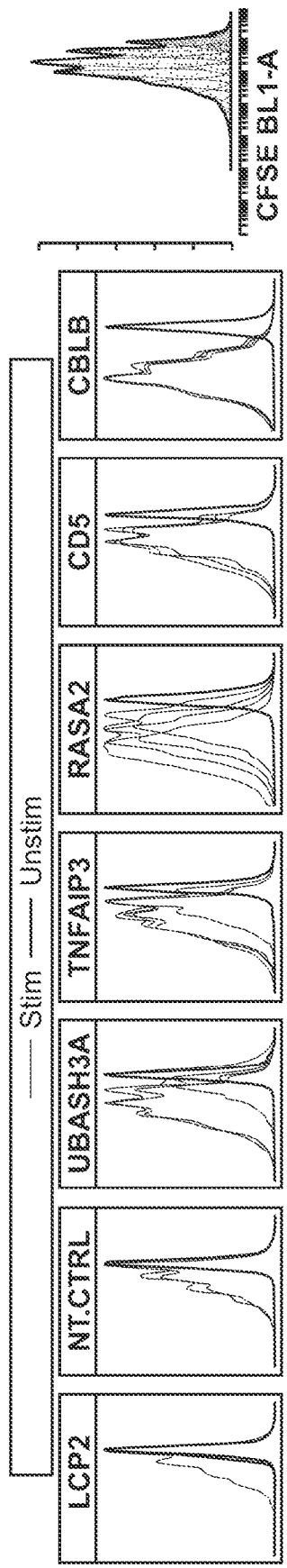
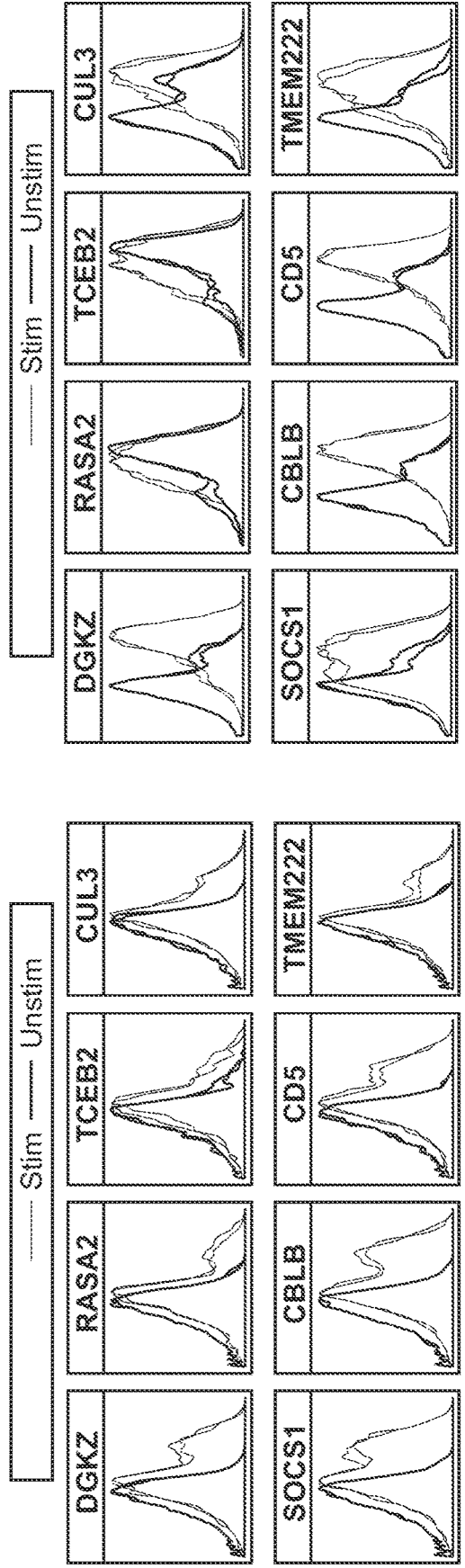
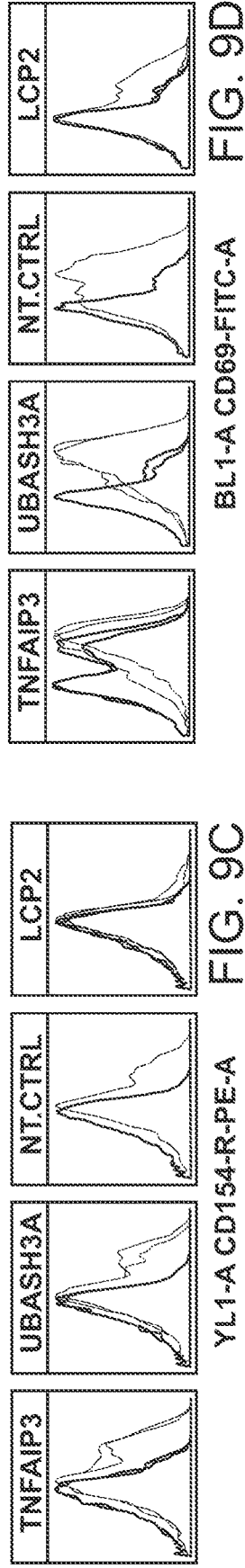
FIG. 9A
FIG. 9B
FIG. 9C
FIG. 9D

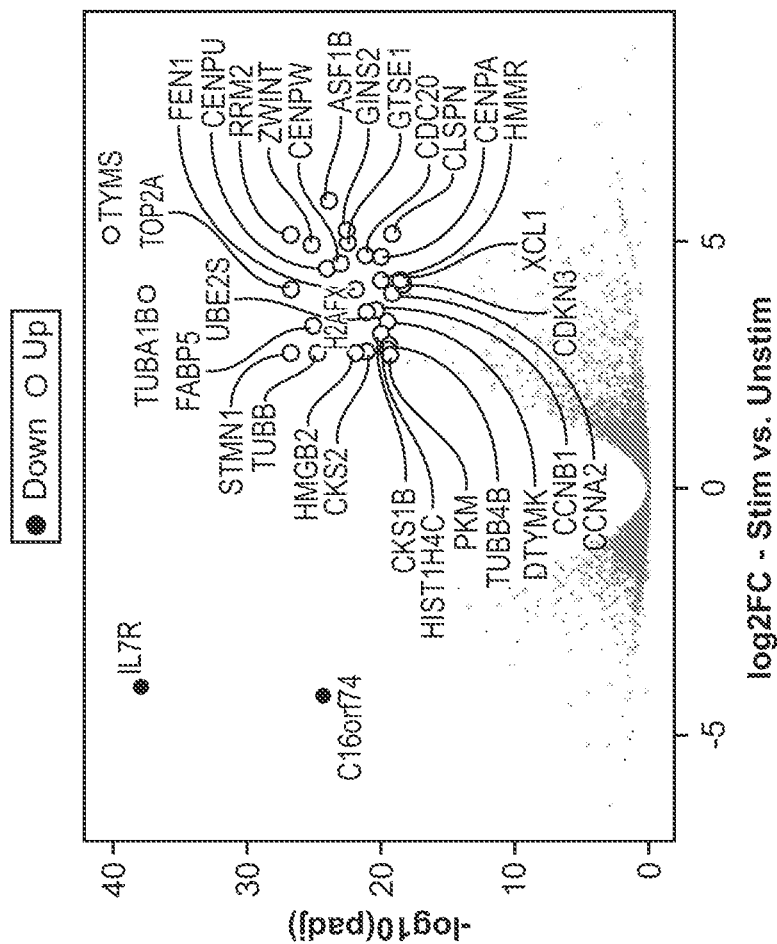
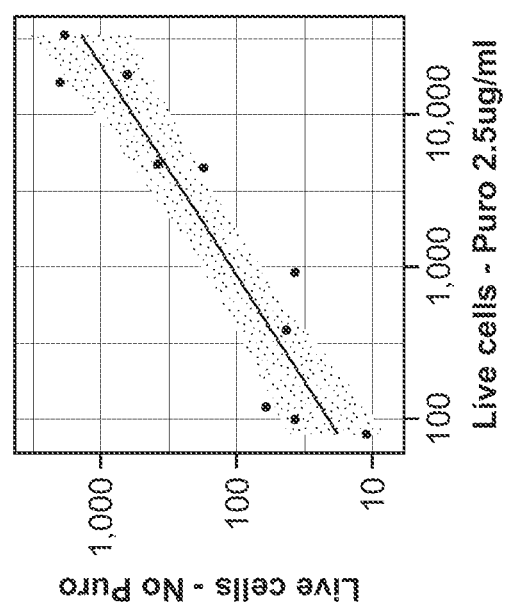
FIG. 10A
FIG. 10B

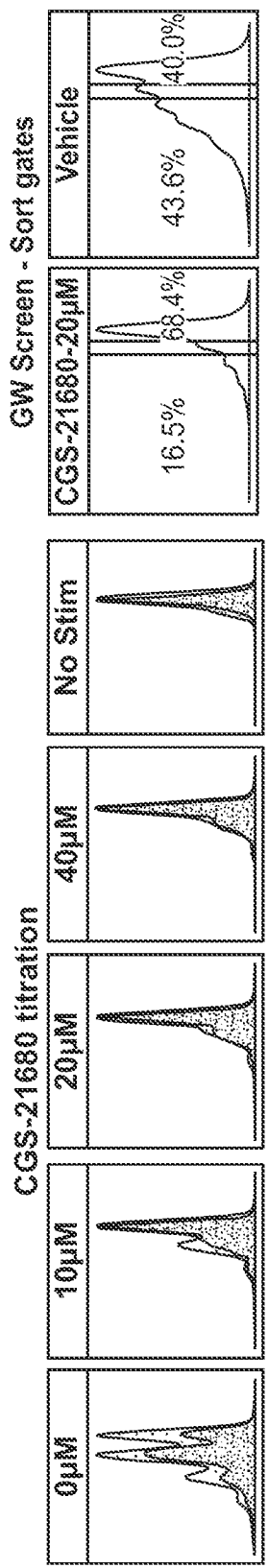
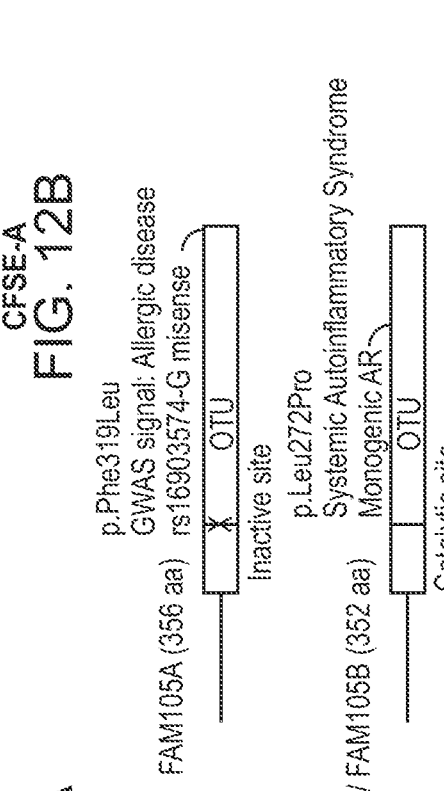
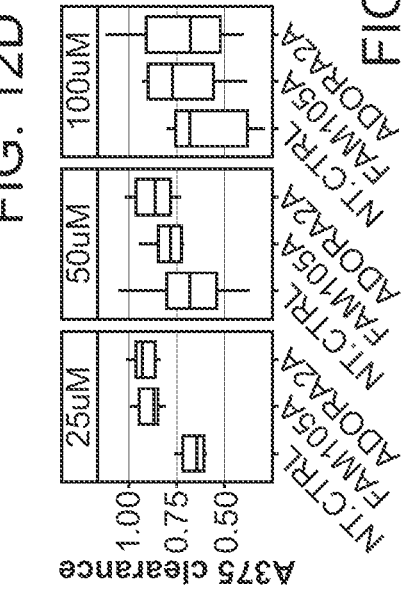
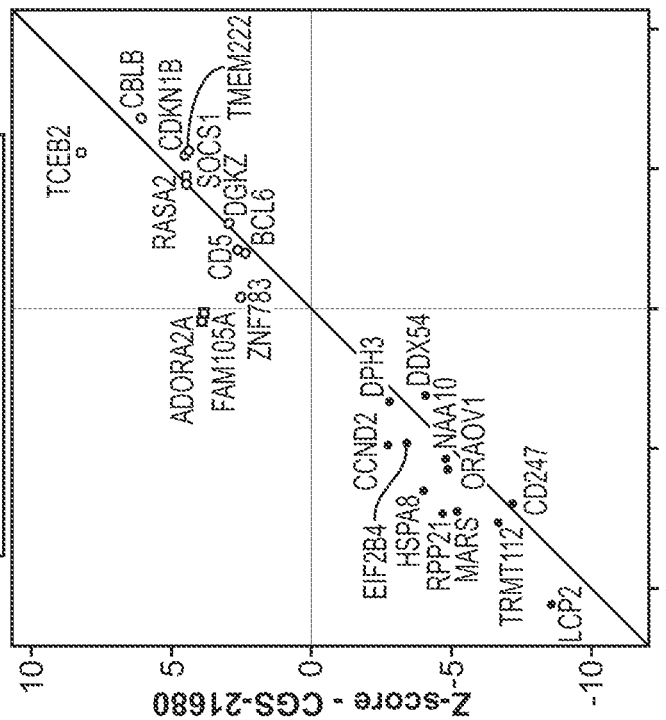
FIG. 12A
FIG. 12B
FIG. 12C
FIG. 12D
FIG. 12E

GENE TARGETS FOR T-CELL-BASED IMMUNOTHERAPY

CROSS-REFERENCE TO RELATED APPLICATIONS

This application is a 371 National Stage Application of PCT/US2019/041018, International Filing Date Jul. 9, 2019, which claims priority benefit of U.S. provisional application no. 62/695,672, filed Jul. 9, 2018, which is herein incorporated by reference.

SEQUENCE LISTING

The instant application contains a Sequence Listing which has been submitted electronically in ASCII format and is hereby incorporated by reference in its entirety. Said ASCII copy, created on Jan. 8, 2021, is named Sequence-Listing_081906-1230054.txt and is 66,706 bytes in size.

BACKGROUND OF THE INVENTION

Cytotoxic T cells play a central role in immune-mediated control of cancer and in autoimmunity. Immunotherapies such as checkpoint blockade or engineered cell-based therapies are revolutionizing cancer treatment, achieving durable responses in a subset of patients with otherwise refractory malignant disease. However, despite dramatic results in some patients, the majority of patients do not respond to the available immunotherapies.

Next-generation adoptive cell therapies are under development utilizing CRISPR-Cas9 genome engineering. Cas9 ribonucleoproteins can be delivered to primary human T cells to efficiently knockout checkpoint genes (Ren et al., 2017; Rupp et al., 2017; Schumann et ah, 2015) or even re-write endogenous genome sequences (Roth et ah). While deletion of the canonical checkpoint gene encoding PD-1 may enhance responses to some cancers (Ren et ah, 2017; Rupp et al., 2017), an expanded set of targets would offer additional therapeutic opportunities. Advances in immunotherapy depend on improved understanding of the genetic programs that determine how T cells respond when they encounter their target antigens. Promising gene targets could enhance proliferation and productive effector responses upon stimulation. In addition, immunosuppressive cells and soluble molecules such as cytokines and metabolites can accumulate within tumors and hamper productive antitumor T cell responses. Gene targets that influence a T cell's ability to overcome the immunosuppressive tumor microenvironments could extend the reach of adoptive cell therapies to solid organ cancers.

Decades of work in animal models and cell lines have identified regulators of T cell suppression and activation, but systematic strategies to comprehensively analyze the function of genes that regulate human T cell responses are still lacking. Gene knock-down with curated RNA interference libraries pointed to targets that enhance in vivo antigen-responsive T cell proliferation in mouse models (Zhou et al., 2014). More recently, CRISPR-Cas9 has ushered in a new era of functional genetics studies (Doench, 2018). Large libraries of single guide RNAs (sgRNAs) are readily designed to target genomic sequences. Transduction of cells with lentivirus encoding these sgRNAs generates pools of cells with diverse genomic modifications that can be tracked by sgRNA sequences in integrated provirus. This approach has been used in cell lines engineered with stable Cas9 expression and in Cas9 transgenic mouse models (Parnas et al., 2015; Shang et al., 2018). Pooled CRISPR screens are already revealing gene targets in human cancer cells that modulate responses to T cell immunotherapies (Manguso et al., 2017; Pan et al., 2018; Patel et al., 2017).

BRIEF SUMMARY OF THE INVENTION

The disclosure is based, in part, on a new method, sgRNA lentiviral infection with Cas9 protein electroporation (SLICE), to identify regulators of stimulation responses in primary human T cells. Genome-wide loss-of-function screens identified important T cell receptor signaling components and genes that negatively tune proliferation following stimulation. Targeted ablation of individual candidate genes validated hits and identified perturbations that enhanced cancer cell killing. SLICE coupled with single-cell RNA-seq revealed signature stimulation-response gene programs altered by key genetic perturbations. SLICE genome-wide screening was also adaptable to identify mediators of immunosuppression, revealing genes controlling response to adenosine signaling. Accordingly, provided herein are hematopoietic cells, such as stem cells and T cells, that are modified to inhibit target gene expression. Thus, for example, genetic modification as described in the present disclosure can be used to modulate CD8+ T cell proliferation and function.

In one aspect, provided herein is a genetically modified hematopoietic cell that comprises a genetic modification to a T-cell inhibitory gene that inhibits expression or activity of the polypeptide product encoded by the T-cell inhibitory gene, wherein expression or activity of the polypeptide product is inhibited by at least 60% compared to a control wild-type hematopoietic cell. In some embodiments, the genetic modification to the T-cell inhibitory gene inactivates the gene. In some embodiments, the genetically modified hematopoietic cell is a hematopoietic stem cell. In some embodiments, the genetically modified hematopoietic cell is a T-cell. In some embodiments, the T-cell is a CD8+ T cell or CD4+ T cell. In some embodiments, the T-cell inhibitory gene is inhibited using a clustered, regularly interspaced, short palindromic repeats (CRISPR) system. Alternatively, the T-cell inhibitory gene may be inhibited using a transcription activator-like effector nuclease (TALEN) system, a zinc finger nuclease system, or a meganuclease system. In some embodiments, the T-cell inhibitory gene is inhibited using antisense RNA, siRNA, microRNA, or a short hairpin RNA. In some embodiments, the T-cell inhibitory gene that is modified is RASA2, TCEB2, SOCS1, CBLB, FAM105A, ARID1 A, or TMEM222. In some embodiments, the T-cell inhibitory gene that is modified is CBLB, CD5, SOCS1, TMEM222, TNFAIP3, DGKZ, RASA2, TCEB2, UBASH3A, or ARID1A. In some embodiments, the T-cell inhibitory gene is CD5, SOCS1, TMEM222, TNFAIP3, RASA2, or TCEB2: or the T-cell inhibitory gene is SOCS1, TCEB2, RASA2, or CBLB. In some embodiments, the T-cell inhibitory gene is SOCS1, TCEB2, or RASA2. In some embodiments, the T-cell inhibitory gene is RASA2. In some embodiments, the T-cell inhibitory gene is TCEB2. In some embodiments, the T-cell inhibitory gene is SOCS1. In some embodiments, the T-cell inhibitory gene is CBLB. In some embodiments, the T-cell inhibitory gene is FAM105A. In some embodiments, the T-cell inhibitory gene is ARID1A. In some embodiments, the T-cell inhibitory gene is TMEM222. In some embodiments, the T-cell inhibitory gene is AGO1, ARIH2, CD8A, CDKN1B, DGKA, FIBP, GNA13, MEF2D, or SMARCR1. In a further aspect, provides herein is a population of cells comprising a genetically modified hematopoietic cell, e.g. a T cell, as described herein, e.g., in this paragraph. In some embodiments, a hematopoietic cell, e.g., a T cell, may comprise two or more genetic modifications as described herein.

In a further aspect, provided herein is a method of treating cancer comprising administering a population of cells comprising a genetically modified hematopoietic cell as described herein, e.g. in the preceding paragraph.

In another aspect, provided herein is a genetically modified T cell that has modulated, e.g., reduced immune function, compared to a control wildtype T cell and comprises a genetic modification to inhibit expression of the polypeptide encoded by the T gene, wherein expression of the polypeptide is inhibited by at least 60% compared to the control wild-type T cell; and the gene is selected from the group consisting of CYP2R1, LCP2, RPP21, VAV1, EIF2B3, RPP21, EXOSC6, RPN1, VARS, CD3D, GRAP2, TRMT112, ALG8, VAV1, EXOSC6, SH2D1A, HSPA8, ZAP70, DDX54, CD247, ALDOA, ZNF131, WDR36, AK2, LCP2, CD247, VHL, EIF2B2, PRELID1, GRPEL1, NAA10, ALDOA, ALG2, MARS, C4orf45, RAC2, LCK, SUPT4H1, SLC25A3, LUC7L3, C3orf17, RPP21, HARS, ZNRD1, CCNH, MYC, CCDC25, EEF1G, CCND2, GCLC, TAF2, EIF6, SEC63, EXOSC6, RPS19BP1, SEC61B, VHL, DAD1, BEND6, FBL, VARS, EIF2B4, RAC2, PAGR1, MYC CD3E, LCP2, MYC, ENOSF1, POLR3H, NOP14, CLNS1A, POLR2L, ZPR1, CARD11, SLC35B1, TRMT112, FARSA, PRELID1, LARS, NOP16, POLR2L, HSPA8, CD247, GEMIN8, TTC27, PMPCA, PWP2, TAF1C, DDOST, ZNF654, FAU, EIF2B3, YARS, DDX20, DDX56, DDX49, UTP20, ERRS, RSL1D1, ATP1B3, EXOSC4, ARMC7, EIF2B4, AUP1, VAV1, PAK1IP1, EIF6, FAM157A, HSPE1-MOB4, LAT, DCAF13, PPP1R10, EXOSC2, SRP9, POLR3K, TAF6, EIF3H, ABCF1, FLJ44635, PTP4A2, EIF3CL, ABCB7, GTF2H4, MARS, TAF4, RPL5, FTSJ3, CD28, ALG13, CARD11, EIF4G1, UTP3, GARS, CACNB4, HSPA8, POP7, ERCC3, GDBD2, SUBT5H, POLR3D, RPP30, C12orf45, DPH3, EIF3B, LACTBL1, THAP11, IMP4, EXOSC7, NOB1, EIF4E, PLCG1, HUWE1, RBM19, GATA3, CCND2, TTI2, THG1L, TAF1C, UR11, TRMT112, EIF3H, CCND2, GCLM, RBSN, QARS, POP7, TAF4, HUWE1, CARS, PTP4A2, PES1, ZNF785, WDR26, PRR20D, STK11, PIK3CD, YARS, STRAP, WDR77, NANS, TARS, HSPA8, TMEM127, FAM35A, ZBTB8OS BPTF, INO80D, NOP14, KARS, SH2D1A, RHOH, DIMT1, CMPK1, TAF6, QTRT1, LCK, NOL10, MYBBP1A, NHP2, DDX54, LAT, TAF2, MBTPS1, GNL3, DEF6, BCL10, NFKBIA, PHB, CD3G, CD3D, QARS, EIF3C, GRPEL1, MBTPS2, ORAOV1, SLC4A2, GATA3, ODF3, SLC7A6OS, ORAOV1, ALG13, and TAF1B. In some embodiments, the gene is any one of the following: HSPA8, RPP21, EXOSC6, LCP2, MYC, CD247, NOP14, VAV1, RHOH, TAF1C, TRMT112, CCND2, SH2D1A, MARS, CD3D, NELFCD LCK, LUC7L3, EIF2B4, ORAOV1, VARS, NOL10, ZBTB8OS, SLC35B1, NAA10, EIF2B3, DHX37, LAT, EMG1, ALDOA, GRPEL1, ARMC7, POLR2L, NOP56, PSENEN, RELA, SUPT4H1, VHL, GFEK, BPTF, RAC2, TSR2, TAF6, PMPCA, EIF6, STT3B, POP7, GMPPB, TP53RK, CCNH, TEX10, DHX33, QARS, EID2, IRF4, TAF2, IARS, GTF3A, NOP2, IMP3, RPL28, UTP3, EIF4G1, GPN1, UTP6, DAD1, ALG2, CDK6, MED19, RASGRP1, PHB2, NFS1, POLR2E, CDIPT, POLR3H, HARS, SEH1L, EIF2B5, TTC27, RRP12, JUNB, HSPE1, GMPS, EIF2S3, SRP14, FAM96B, RPL8, RRP36, MED11, ISG20L2, ROMO1, ATP6V1B2, RPN2, or WASH1. In some embodiments, the gene is inactivated. In some embodiments, the gene is inhibited using a CRISPR system, a TALEN system, a zinc finger nuclease system, a meganuclease system, an siRNA, an antisense RNA, microRNA, or a short hairpin RNA. In a further aspect, the invention provides a cell culture comprising a genetically modified T cell, e.g., as described herein in this paragraph.

In a further aspect, provided herein is a method of treating an autoimmune disease or treating or preventing transplant rejection, the method comprising administering a population of T cells, e.g., CD8+ or CD4+ T cells, as described in the preceding paragraph to a subject that has the autoimmune disease or is undergoing a tissue transplant.

In an additional aspect, provided herein is a method of generating a genetically modified cell population for treatment of a subject that has cancer, the method comprising: obtaining hematopoietic cells from the patient; inhibiting expression of a T-cell inhibitory gene selected from the group consisting of RASA2, TCEB2, SOCS1, CBLB, FAM105A, ARID1A, and TMEM222: selecting hematopoietic cells in which the T-cell inhibitory gene is inhibited; and expanding the selected hematopoietic cell population ex vivo. In some embodiments, the hematopoietic cells are hematopoietic stem cells. In some embodiments, the hematopoietic cells are T cells, e.g., CD8+ or CD4+ T cells. In some embodiments, the T-cell inhibitory gene is inhibited using a CRISPR system, a TALEN system, a zinc finger nuclease system, a meganuclease system, an siRNA, an antisense RNA, microRNA, or a short hairpin RNA.

In an additional aspect, provided herein is a method of generating a genetically modified cell population for treatment of a subject that has cancer, the method comprising: obtaining hematopoietic cells from the patient; inhibiting expression of a T-cell inhibitory gene selected from the group consisting of CBLB, CD5, SOCS1, TMEM222, TNFAIP3, DGKZ, RASA2, TCEB2, UBASH3A, and ARID1A; selecting hematopoietic cells in which the T-cell inhibitory gene is inhibited; and expanding the selected hematopoietic cell population ex vivo. In some embodiments, the hematopoietic cells are hematopoietic stem cells. In some embodiments, the hematopoietic cells are T cells, e.g., CD8+ or CD4+ T cells. In some embodiments, the T-cell inhibitory gene is inhibited using a CRISPR system, a TALEN system, a zinc finger nuclease system, a meganuclease system, an siRNA, an antisense RNA, microRNA, or a short hairpin RNA.

Definitions

As used herein, the singular forms "a," "an," and "the" are also intended to refer to the plural unless the context clearly dictates otherwise.

The terms "polynucleotide" and "nucleic acid" are used interchangeably to refer to a polymeric form of nucleotides of any length, either deoxyribonucleotides or ribonucleotides. The terms include RNA, DNA, and synthetic forms and mixed polymers of the above. In particular embodiments, a nucleotide refers to a ribonucleotide, deoxynucleotide or a modified form or analog of either type of nucleotide, and combinations thereof. In addition, a polynucleotide may include either or both naturally occurring and modified nucleotides linked together by naturally occurring and/or non-naturally occurring nucleotide linkages. The nucleic acid molecules may be modified chemically or biochemically or may contain non-natural or derivatized nucleotide bases. Such modifications include, for example, labels, methylation, substitution of one or more of the naturally occurring nucleotides with an analogue, internucleotide modifications such as uncharged linkages (e.g., methyl phosphonates, phosphotriesters, phosphoramidates, carbamates, etc.), charged linkages (e.g., phosphorothioates, phosphorodithioates, etc.), pendent moieties (e.g., polypeptides), intercalators (e.g., acridine, psoralen, etc.), chelators, alkylators, and modified linkages (e.g., alpha anomeric nucleic acids, etc.). "Polynucleotide" and "nucleic acid" are also intended to include any topological conformation, including single-stranded, double-stranded, partially duplexed, triplex, hairpinned, circular and padlocked conformations. A reference to a nucleic acid sequence encompasses its complement unless otherwise specified. Thus, a reference to a nucleic acid molecule having a particular sequence should be understood to encompass its complementary strand, with its complementary sequence. Reference to a "polynucleotide" or "nucleic acid" that encodes a polypeptide sequence also includes codon-optimized nucleic acids and nucleic acids that comprise alternative codons that encode the same polypeptide sequence.

As used herein, the term "complementary" or "complementarity" refers to specific base pairing between nucleotides or nucleic acids. Base pairing may be perfectly complementary or partially complementary.

The term "gene" can refer to the segment of DNA involved in producing or encoding a polypeptide chain. It may include regions preceding and following the coding region (leader and trailer) as well as intervening sequences (introns) between individual coding segments (exons). Genes are defined by symbol and nomenclature for the human gene as assigned by the HUGO Gene Nomenclature Committee.

A "promoter" is defined as one or more a nucleic acid control sequences that direct transcription of a nucleic acid. As used herein, a promoter includes necessary nucleic acid sequences near the start site of transcription. A promoter also optionally includes distal enhancer or repressor elements, which can be located as much as several thousand base pairs from the start site of transcription.

The term "inhibiting expression" refers to inhibiting or reducing the expression of a gene or a protein. To inhibit or reduce the expression of a gene (i.e., a gene encoding a transcription factor, or a gene regulated by a transcription factor), the sequence and/or structure of the gene may be modified such that the gene would not be transcribed (for DNA) or translated (for RNA), or would not be transcribe or translated to produce a functional protein (e.g., a transcription factor). Various methods for inhibiting or reducing expression of a gene are described in detail further herein. Some methods may introduce nucleic acid substitutions, additions, and/or deletions into the wild-type gene. Some methods may also introduce single or double strand breaks into the gene. To inhibit or reduce the expression of a protein (e.g., a T-cell inhibitory protein), one may inhibit or reduce the expression of the gene or polynucleotide encoding the protein, as described above. In other embodiments, one may target the protein directly to inhibit or reduce the protein's expression using, e.g., an antibody or a protease. "Inhibited" expression refers to a decrease by at least 10% as compared to a reference control level, for example a decrease by at least about 20%, or at least about 30%, or at least about 40%, or at least about 50%, or at least about 60%, or at least about 70%, or at least about 80%, or at least about 90% or up to and including a 100% decrease (i.e. absent level as compared to a reference sample). As used herein, the term "inactivated" refers to preventing expression of a polypeptide product encoded by the gene. Inactivation can occur at any stage or process of gene expression, including, but not limited to, transcription, translation, and protein expression, and inactivation can affect any gene or gene product including, but not limited to, DNA, RNA, such a mRNA, and polypeptides. In some embodiments, "inhibited expression" reflects inactivation in a percentage of cells that are modified, e.g., at least about 20%, or at least about 30%, or at least about 40%, or at least about 50%, or at least about 60%, or at least about 70%, or at least about 80%, or at least about 90% or greater of the cells in a population that also comprises cells in which the target gene is not inactivated.

As used herein, the phrase "modifying" in the context of modifying a genome of a cell refers to inducing a structural change in the sequence of the genome at a target genomic region. For example, the modifying can take the form of inserting a nucleotide sequence into the genome of the cell. For example, a nucleotide sequence encoding a polypeptide can be inserted into the genomic sequence encoding an endogenous cell surface protein in the T cell. The nucleotide sequence can encode a functional domain or a functional fragment thereof. Such modifying can be performed, for example, by inducing a double stranded break within a target genomic region, or a pair of single stranded nicks on opposite strands and flanking the target genomic region. Methods for inducing single or double stranded breaks at or within a target genomic region include the use of a nuclease domain, e.g., Cas9, or a derivative thereof, and a guide, e.g., guide RNA, directed to the target genomic region.

The terms "patient," "subject," "individual," and the like are used interchangeably herein, and refer to any animal, e.g., a mammal, such as a primate. In certain non-limiting embodiments, the patient, subject or individual is a human.

The terms "treatment", "treating", and the like are used herein to generally mean obtaining a desired pharmacologic and/or physiologic effect. The effect may be prophylactic, in terms of completely or partially preventing a disease, condition, or symptoms thereof, and/or may be therapeutic in terms of a partial or complete cure for a disease or condition and/or an adverse effect, such as a symptom, attributable to the disease or condition. "Treatment" as used herein covers any treatment of a disease or condition of a subject and includes: (a) preventing the disease or condition from occurring in a subject which may be predisposed to the disease or condition but has not yet been diagnosed as having it; (b) inhibiting the disease or condition (e.g., arresting its development); or (c) relieving the disease or condition (e.g., causing regression of the disease or condition, providing improvement in one or more symptoms).

BRIEF DESCRIPTION OF THE DRAWINGS

FIG. 1A-C. Framework for unbiased discovery of regulators of T cell proliferation using pooled CRISPR screens. Section A provides a diagram of a hybrid system of sgRNA lentiviral infection and Cas9 electroporation (SLICE), enabling pooled CRISPR screens in primary T cells. Section B provides illustrative data showing that editing of the CD8A gene with SLICE leads to efficient protein knockdown in two independent donors. Section C depicts illustrative data from a targeted screen (~5,000 guides) reveals sgRNA targeting CBLB and CD5 are enriched in proliferating T cells, while LCP2 and CD3D are depleted. Non-targeting sgRNA are evenly distributed across populations.

FIG. 2A-F. Section A: Top panel: distribution of log2 fold-change (LFC) values of dividing over non-dividing cells for >75,000 guides in the genome-wide (GW) library. Bottom panel: LFC for all 4 sgRNA targeting 3 enriched (CBLB, CD5, UBASH3A) and 3 depleted genes (VAV1, CD3D, LCP2), overlaid on grey gradient depicting the overall distribution. Values are averaged over two donors. Section B: Volcano plot for hits from the primary GW screen. X-axis shows Z-score (ZS) for Gene-level LFC (median of LFC for all sgRNA per gene). Y-axis shows the p-value as calculated by MAGeCK. The labeled genes having an LFC-Z-score less than "0" are negative hits (depleted in dividing cells, FDR<0.2 and |ZS|>2), which were annotated for TCR signaling pathway by Gene Ontology (GO). The labeled genes having an LFC-Z-score greater that "0" are positive hits (Rank<20 and |ZS|>2). All values are calculated for two donors as biological replicates. Section C: Gene hits from secondary GW screen in two independent donors are positively correlated to primary screen. Shown are the overlapping hits for the top 25 ranking targets, in both positive and negative directions. Section D: Boxplot for the scaled LFC of the top 100 hits from (B) in each direction, for 3 GW screens with increasing TCR stimulation titers (1×=data in (B)). For both panels, LFC values are trending towards 0, indicating selection pressure is reduced as TCR signal increases. Horizontal line is median, vertical line is data range. Section E: Gene-set enrichment analysis show significantly skewed LFC ranking of screen hits in two curated gene lists: (top panel) previously discovered hits by shRNA screen in a mouse model of melanoma and (bottom panel) TCR signaling pathway by KEGG. Top 8 gene members on the leading edge of each set enrichment are shown in the text-box on the right. Vertical lines on x-axis are members of the gene set, ordered by their LFC rank in the GW screen. FDR=False discovery rate, permutations test. Section F: Modulators of TCR signaling and T cell activation detected in the GW screens. Depicted on the left are positive regulators of the TCR pathway found in our GW screens (FDR<0.25). The TCR pathway is based on wikipathways WP69 and literature review. Depicted on the right are negative regulator genes (both known and unknown) found in the GW screens (FDR<0.25), and represent candidate targets to boost T cell proliferation. Cellular localization and interaction edges are based on literature review. Gene nodes are indicated by their LFC in the GW screen (red for positive and blue for negative LFC values).

FIG. 3A-E. Validation of gene targets that regulate T cell proliferation using RNP arrays. Section A:Overview of orthogonal validation strategy using electroporation of Cas9 RNP. Section B: Proliferation assay with CFSE-stained CD8 T cells. Each panel shows CFSE signal from TCR-stimulated (left peaks) or unstimulated (right-most peak) human CD8 T cells. Shown are data for two guides for two positive hits, CBLB and CD5, compared to NT CTRL and a negative hit, LCP2. Section C: Summary of data in Section B: Gene targets (y-axis) are ordered by their rank in the GW pooled screen. X-axis is the calculated proliferation index (Experimental Procedures), relative to NT CTRL in each donor (log2 transformed). Bars show mean of 2 independent experiments, with 2 donors in each experiment. Error bars are SEM. Section D: Early activation markers, as measured by flow cytometry 6 hours post stimulation. Shown are representative distributions of two guides per targeted gene (y-axis) for CD154 (left) and CD69 (right). Section E: Summary of data in (D) for all gene targets tested (y-axis). X-axis is the fold-change increase in the marker-positive (CD69/CD154) population over NT CTRL. Vertical lines are mean values, error bars are SEM, 2 guides per gene, for 4 donors.

FIG. 4A-F. Pairing SLICE with single cell RNA-Seq for high dimensional molecular phenotyping of gene knockouts in primary cells; Section A: UMAP plot of all single cells with identified sgRNA across stimulated and unstimulated T cells from two human donors. Unstimulated cells are to the left; stimulated cells are to the right. Section B: UMAP with scaled gene expression for four genes showing cluster association with activation state (IL7R, CCR7), cell cycle (MKI67) and effector function (GZMB). Section C: Unsupervised clustering of single cells based on gene expression, 13 clusters identified as labeled. Section D: Clustering of cells expressing sgRNA for CBLB, CD5, LCP and NT CTRL on the UMAP representation. Section E: Y-axis shows over or under representation of cells expressing sgRNA (y-axis) across clusters (panels), as determined by a chi-square test. Section F: Heatmap showing average gene expression (y-axis) across cells with different sgRNA target (x-axis). Data is representative of one donor.

FIG. 5A-D. Top screen hits boost tumor killing in vitro by engineered human T cells. Section A: Diagram of high throughput experimental strategy to test gene targets that boost tumor killing in vitro. Section B: Representative images taken at 36 hours post co-culture of human CD8 T cells and A375 tumor cells. Shown is the red fluorescence channel, for representative wells, as annotated at bottom left of each panel. Scale bar is 500 um. Section C: Clearance of A375 by antigen-specific CD8 T cells after 36 hours. Values are normalized to A375 cell counts in wells with no T cells. Horizontal lines are mean, error bars are SEM, for 2 guides per gene target, across 4 donors and two technical replicates. ***denotes $p<0.001$, Wilcoxon Rank Sum test Section D: Time traces for A375 cell counts as measured by IncuCyte software for selected hits. Lines are mean for 4 donors, two guides per target gene. Error bars are SEM.

FIG. 6A-C. Adapting SLICE to reveal resistance to immunosuppressive signals in primary T cells. Section A: Scatter plot for z scores for genome-wide screen for resistance to adenosine A2A selective agonist CGS-21680. Section B: Top panel: distribution of log2 fold change for all sgRNA in GW library for T cells treated with CGS-21680. Bottom panel: LFC for Individual sgRNA in stimulation only (vehicle) screen (green) sgRNA compared to the CGS-21680 resistance screen (red). Section C: Validation of gene targets from the adenosine resistance screen with RNP edited T cells. Knockout of ADORA2A or FAM105A allows cells to proliferate in the presence of the adenosine agonist, compared to NT CTRL. Each panel shows two independent sgRNA for 2 donors.

FIG. 7A-J. Establishing SLICE in Primary Human T Cells, Related to FIG. 1. Section A: To optimize SLICE for large scale screens, we asked whether increasing infection rates (mCherry reporter) with polybrene yielded a higher absolute number of viable edited cells. Although addition of polybrene modestly increased transduction efficiency (bottom labels)—omitting it improved viability and resulted in higher total number of transduced cells (top labels). Section B: FACS plot showing expression of a fluorescent reporter (x-axis) from transduced primary human CD8$^+$ T cells compared to antibody staining of the targeted protein, CD8A (BV-570, y-axis). Following electroporation of Cas9 protein (3 ul in 20 ul of cell suspension, stock 20 uM), cells expressing the sgRNA are largely CD8 negative. Section C: Editing of the CD8A protein (y-axis) for cells from (A), electroporated with different stock concentration of Cas9 protein. Editing is calculated as the proportion of CD8 negative cells to the CD8 positive cells in successfully transduced cells. Titer shows a dependency of editing efficiency on Cas9 concentration. Data is shown for two human donors. Section D: Proliferation dye VPD450 measures response to second stimulation (Day 9) by anti-CD3 and anti-CD28 complexes, as a function of first stimulus (Day 0) in the SLICE system. Stimulation with anti-CD3/CD28 beads (bottom panel) at a 1:1 bead to T-cell ratio hindered the ability of CD8 T cells to respond to restimulation, perhaps by activation induced exhaustion and cell death. First stimulation using plate bound antibodies (top panel) maintained the ability of cells to respond, allowing for TCR dependent proliferation screens. Section E: Gating strategy for cells shown in FIG. 1, Section B. Section F: SLICE is effective at knockout of candidate target (CD45) in both primary human CD8$^+$ and CD4$^+$ T cells. Not targeting control sgRNA (NT.CTRL, grey) shows that knockout is specific to cells transduced with the CD45 targeting guide (blue). Section G: CFSE signal for pre-sort cells in pilot screen as in FIG. 1C. Section H: Distribution of read counts after deep sequencing of sgRNA of sorted cell populations, across two donors in the pilot screen. Section I: Abundance for top two guides by absolute fold change, for hits in FIG. 1C. Each line is a unique sgRNA targeting the given gene, labeled at the top of each panel. Pattern of guide enrichment and depletion are consistent across two guides and two donors. Section J: Log fold change rank comparison from a parallel screen with the same experimental timeline and sgRNA library as FIG. 1C, but without CFSE-based enrichment sort. This growth based screen has a low signal to noise ratio, indicated by the proximity to the diagonal for TCR related guides from FIG. 1C. Grey dots are individual targeting guides, black dots are non-targeting control (NT.CTRL) guides.

FIG. 9A-D. RNP arrays validate hits from genome-wide screens, Related to FIG. 3. Section A: CFSE traces for hits in FIG. 3, Section C. Each panel shows two unique guides per gene target, for two technical replicates. Data is representative of one donor. Section B: Curve fitting for representative CFSE trace, as in section C of FIG. 3. Panel shows fitted gaussians for CFSE peaks, as determined by flowFit R package. The extracted parameter is the proliferation index, defined as the total count of cells in all generations divided by the calculated number of original parent cells. Section C: Distribution of activation markers CD154, across all targets tested. Lines show the measured expression for stimulated (red) and unstimulated (blue) cells, edited with two guides targeting the gene as labeled at top of each panel. Data is representative of one donor. Section D: Same as Section B, for CD69.

FIG. 10A-F. SLICE coupled with single-cell RNA-Seq, Related to FIG. 4. Section A: Measuring transduction efficiency for CropSeq experiment by puromycin selection. We estimated the infection rate to be 13.9% by linear regression ($R^2$=0.76, blue line, shaded area is 95% CI). This intentionally low transduction rate is predicted to enrich for cells with only a single integrated sgRNA cassette. Section B: Volcano plot for differential gene expression by DESeq2 for synthetic bulk RNA-Seq profiles (collapsed UMI counts per sample) of stimulated cells compared to unstimulated cells. Dots are genes, y-axis shows the significance of enrichment, x-axis shows the magnitude and direction of the log2 fold change (LFC) in transcript abundance. Dots are colored by having |LFC|>2.5 and adjusted p value<1e-18, blue denotes genes that are up-regulated in stimulated cells, red denotes genes that are down-regulated. Section C: Enrichment of gene annotations in clusters based on single-cell RNA expression profiles. Each dot shows the enrichment of a REACTOME annotation (y-axis) across clusters (x-axis). The genes associated with each cluster were determined by a differential gene expression test, comparing all cells in a cluster to all other cells. Size of each dot is proportional to the significance of the enrichment, color is whether the average expression level of genes in the corresponding annotation is up- or down-regulated (red and blue, respectively) in each cluster. Section D: Gene editing at a single cell level for the CROP-Seq experiment. Each panel shows the mean and standard error of the mean (SEM) for unique molecular identifier (UMI) counts of a targeted gene in the library. This is calculated for each target transcript for all cells either expressing an on-target sgRNA (Target) or anon-targeting control guide (NT.CTRL). Mean is calculated across four samples, two guides per gene. Most gene targets show lower level of transcript for cells expressing targeted guides compared to control guides, indicating a successful knockout. We note that some gene targets are expressed at low levels, thus editing might harder to detect at the single cell level. Section E: Gene expression profile for selected sgRNAs, same as FIG. 4, Section F, for the second donor. Genes shown are enriched (|log FC|>1 and adjusted p<0.05) in clusters 8-12, associated with stimulated cells. Dendrogram is based on euclidean distance, with the Ward D2 algorithm, as implemented in hclust in R. Section F: Similarity in cluster association for cells expressing targeting sgRNA. Shown is the pearson correlation coefficient for chi-square residuals across all clusters. Dendrogram calculation is as in Section E, segmented to three levels.

FIG. 12A-E. Screen for Resistance to an Immunosuppressive Signal in Primary T Cells Using SLICE, Related to FIG. 6. Section A: a dose titration of adenosine receptor agonist CGS-21680 for the optimal effects on T cell proliferation inhibition identified 20 μM as sufficiently suppressive. Shown are representative CFSE profiles for varying concentrations of CGS-21680, as labeled at the top of each panel. Data is for CFSE-labeled $CD8^+$ T cells from two human donors. Section B: CFSE profile and sorting gates from the genome wide screen shown in FIG. 6A. Section C: Comparison of the overlapping top 25 hits for the two screen conditions (CGS-21680 and vehicle). We noted that while many hits from the vehicle screen also boosted proliferation in the presence of the immunosuppressive adenosine agonist (trending along diagonal), ADORA2A and FAM105A sgRNAs were enriched selectively in the setting of the adenosine agonist. ADORA2A and FAM105A were the only hits in the top 0.1% by LFC in the CGS-21680 treated condition and also in the top 0.1% by LFC difference between the CGS-21680 and the vehicle GW screen conditions. Section D: Paralogs FAM105A and OTULIN (FAM105B) are 40% homologous and are encoded at neighboring sites on chromosome 5. They share an OTU deubiquitinase domain, which in FAM105A is predicted to be catalytically inactive. A non-synonymous single nucleotide polymorphism (SNP) in FAM105A has been linked to allergic disease by genome wide association studies (Ferreira et al., 2017). A rare mutation in OTULIN has been implicated in monogenic severe inflammatory disease (Damgaard et al, 2016). Section E: Clearance of RFP-labeled A375 cells by antigen-specific CD8 T cells edited with sgRNAs targeting ADORA2A. FAM105A, and a non-targeting control in the presence of increasing doses of CGS-21680. The Y-axis shows the relative clearance levels at each concentration of CGS-21680 compared to vehicle. The X-axis shows the different sgRNAs targeted. Horizontal lines are the median, whiskers are data limits, across four donors and two guides per target.

DETAILED DESCRIPTION OF THE DISCLOSURE

Figure 2D:
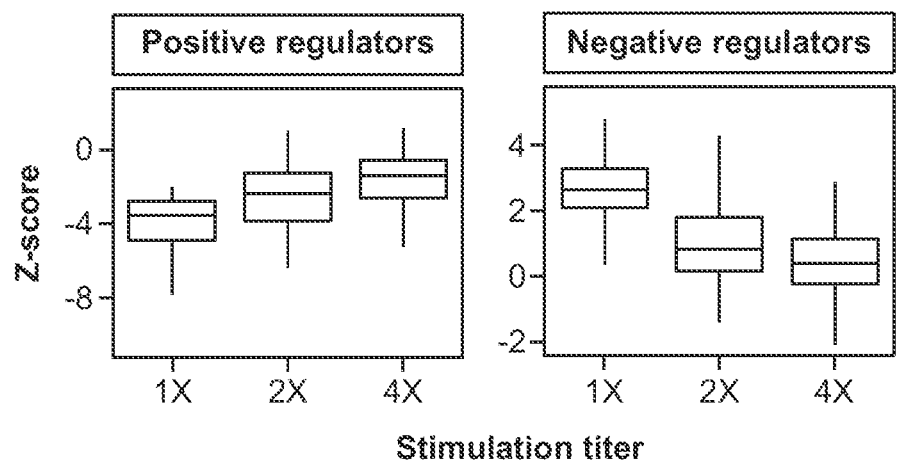

In one aspect, the disclosure provides engineered T cells that exhibit enhanced cytotoxicity to targets of interest, e.g., tumor cells. Such T cells are modified to inhibit expression of a T-cell inhibitory gene. As used herein, a "T-cell inhibitory" gene refers to a gene that negatively affects proliferation following stimulation. Modification to a T cell inhibitory gene in accordance with the invention need not be performed to only T cells. Although the modifications are T-cell receptor (TCR) dependent, they can be applied to other hematopoietic cells. Thus in some embodiments, a cell modified in accordance with the invention is a T cell, such as a CD8+ T cell. In some embodiments, the cell is a hematopoietic stem cell. In further embodiments, the cell is a stem memory T cell, an effector memory T cell, a central memory T cell, or a naïve T cell. In some embodiments, modifications in accordance with the invention are made to CD4+ T cells, or NK cells or gamma delta T cells. Review of T cell subsets are provided, e.g., in Sallusto el al. *Annual Rev. Immunol.* 22745-763, 2004; Mueller et al., *Annual Rev. Immunol* 31:137-161, 2013; and for memory stem T-cells, Gattinoni, et al., *Nature Med.* 23:18-27, 2018. Descriptions of subsets by markers are available in the OMIP Wiley Online Library (see, e.g., Wingender and Kronenberg, OMIP-030: Characterization of human T cell subsets via surface markers *Cytometry Part A* 87 A: 1067-1069, 2015.

Expression of the target gene can be inhibited or, in some embodiments, inactivated, such that the gene does not express an active protein product. In some embodiments, a population of cells can be enriched for cells in which the gene is inactivated.

In some embodiments, the T-cell inhibitory gene that is modified to inhibit expression is CBLB, CD5, SOCS1, TMEM222. TNFAIP3, DGKZ, RASA2, TCEB2 (also referred to as ELOB, elongin B, in HUGO nomenclature), UBASH3A or Mill) I A. In some embodiments, the T-cell inhibitory gene is CD5, SOCS1, TMEM222, TNFAIP3, RASA2, or TCEB2. In some embodiments, the T-cell inhibitory gene is SOCS1, TCEB2, RASA2, or CBLB. In some embodiments, the T-cell inhibitory gene is SOCS1, TCEB2, or RASA2. In some embodiments, the T-cell inhibitory gene that is modified to inhibit expression is RASA2, TCEB2, SOCS1, CBLB, FAM105A, ARID1 A, or TMEM222. In some embodiments, the T-cell inhibitory gene that is modified to inhibit expression is AGO1, ARIH2, CD8A, CDKN1B, DGKA, FIBP, GNA13. MEF2D, or SMARCB1. In some embodiments, a hematopoietic cell, e.g., a T cell, further comprises a second modification to inhibit expression of a T-cell inhibitory gene.

Any number of assays can be used to assess function. Illustrative assays measure T-cell proliferative responses, e.g., in response to T cell receptor (TCR) stimulation. Exemplary assays are described in the EXAMPLES section. Assay include, but are not limited to, CFSE (or other similar dye) dilution, growth-based assays, in vivo expansion at a particular site, or sorting for the other markers of activation or effector function, e.g. cytokine production, induction of a cell surface marker, or granzyme production.

In a further aspect, the disclosure provides engineered T-cells that are modified to inhibit expression of a T-cell gene to suppress T cell function, e.g., to target the gene for treatment of an autoimmune disorder or other disorder for which it is desirable to suppress T cell function, e.g., transplant rejection. In some embodiments, the T-cell gene to be modified is CYP2R1, LCP2, RPP21, VAV1, EIF2B3, RPP21, EXOSC6, RPN1, VARS, CD3D, GRAP2, TRMT112, ALG8, VAV1, EXOSC6, SH2D1A, ZAP70, DDX54, CD247, ALDOA, ZNF131, WDR36, AK2, LCP2, CD247, VHL, EIF2B2, PRELID1, GRPEL1, NAA10, ALDOA, ALG2, MARS, C4orf45, RAC2, LCK, SUPT4H1, SLC25A3, LUC7L3, C3orf17, RPP21, HARS, ZNRD1, CCNH, MYC, CCDC25, EEF1G, CCND2, GCLC, TAF2, EIF6, SEC63, EXOSC6, RPS19BP1, SEC61B, VHL, DAD1, BEND6, FBL, VARS, EIF2B4, RAC2, PAGR1, MYC, CD3E, LCP2, MYC, ENOSF1, POLR3H, NOP14, CLNS1A, POLR2L, ZPR1, CARD11, SLC35B1, TRMT112, FARSA, PRELID1, LARS, NOP16, POLR2L, CD247, GEMIN8, TTC27, PMPCA, PWP2, TAF1C, DDOST, ZNF654, FAU, EIF2B3, YARS, DDX20, DDX56, DDX49, UTP20, ERRS, RSL1D1, ATP1B3, EXOSC4, ARMC7, EIF2B4, AUP1, VAV1, PAK1IP1, EIF6, FAM157A, HSPE1-MOB4, LAT, DCAF13, PPP1R10, EXOSC2, SRP9, POLR3K TAF6, EIF3H, ABCF1, FLJ44635, PTP4A2, EIF3G1, ABCB7, GTF2H4, MARS, TAF4, RPL5, FTSJ3, CD28, ALG13, CARD11, EIF4G1, UTP3, GARS, CACNB4, HSPA8, POP7, ERCC3, GDPD2, SUBT5H, POLR3D, RPP30, C12orf45, DPH3, EIF3B, LACTBL1, THAP11, IMP4, EXOSC7, NOB1, EIF4E, PLCG1, HUWE1, RBM19, GATA3, CCND2, TTI2, THG1L, TAF1C, UR11, TRMT112, EIF3H, CCND2, GCLM, RBSN, QARS, POP7, TAF4, HUWE1, CARS, PTP4A2, PES1, ZNF785, WDR26, PRR20D, STK11, PIK3CD, YARS, STRAP, WDR77, NANS, TARS, TMEM127, FAM35A, ZBTB8OS, BPTF, INO80D, NOP14, KARS, SH2D1A, RHOH, DIMT1, CMPK1, TAF6, QTRT1, LCK, NOL10, MYBBP1A, NHP2, DDX54, LAT, TAF2, MBTPS1, GNL3, DEF6, BCL10, NFKBIA, PHB, CD3G, CD3D, QARS, EIF3C, GRPEL1, MBTPS2, ORAOV1, SLC4A2, GATA3, ODF3, SLC7A6OS, ORAOV1, ALG13, or TAF1B. In some embodiments, the gene is any one of the following: HSPA8, RPP21, EXOSC6, LCP2, MYC, CD247, NOP14, VAV1, RHOH, TAF1C, TRMT112, CCND2, SH2D1A, MARS, CD3D, NELFCD LCK, LUC7L3, EIF2B4, ORAOV1, VARS, NOL10, ZBTB8OS, SLC35B1, NAA10, EIF2B3, DHX37, LAT, EMG1, ALDOA, GRPEL1, ARMC7, POLR2L, NOP56, PSENEN, RELA, SUPT4H1, VHL, GFER, BPTF, RAC2, TSR2, TAF6, PMPCA, EIF6, STT3B, POP7, GMPPB, TP53RK, CCNH, TEX10, DHX33, QARS, EID2, IRF4, TAF2, IARS, GTF3A, NOP2, IMP3, RPL28, UTP3. EIF4G1, GPN1, UTP6, DAD1, ALG2, CDK6, MED19, RASGRP1, PHB2, NFS1, POLR2E, CDIPT, POLR3H, HARS, SEH1L, EIF2B5, TTC27, RRP12, JUNB, HSPE1, GMPS, EIF2S3, SRP14, FAM96B, RPL8, RRP36, MED11, ISG20L2, ROMO1, ATP6V1B2, RPN2, or WASH1.

In a further aspect, a T-cell is modified to inhibit expression of a gene that is involved in resistance to an immunosuppressive agent. In some embodiments, the gene is FAM105A (also referred to as OTULINL (OTU deubiquitinase with linear linkage specificity like) in HUGO nomenclature).

In some embodiments, the T-cell inhibitory gene is inactivated by a gene deletion. As used herein, "gene deletion" refers to removal of at least a portion of a DNA sequence from, or in proximity to, a gene. In some embodiments, the sequence subjected to gene deletion comprises an exonic sequence of a gene. In some embodiments, the sequence subjected to gene deletion comprises a promoter sequence of the gene. In some embodiments, the sequence subjected to gene deletion comprises a flanking sequence of a gene. In some embodiments, a portion of a gene sequence is removed from a gene. In some embodiments, the complete gene sequence is removed from a chromosome. In some embodiments, the host cell comprises a gene deletion as described in the any of the embodiments herein. In some embodiments, the gene is inactivated by deletion of at least one nucleotide or nucleotide base pair in a gene sequence results in a non-functional gene product. In some embodiments, the gene is inactivated by a gene deletion, wherein deletion of at least one nucleotide to a gene sequence results in a gene product that no longer has the original gene product function or activity; or is a dysfunctional gene product. In some embodiments, the gene is inactivated by a gene addition or substitution, wherein addition or substitution of at least one nucleotide or nucleotide base pair into the gene sequence results in a non-functional gene product. In some embodiments, the gene is inactivated by a gene inactivation, wherein incorporation or substitution of at least one nucleotide to the gene sequence results in a gene product that no longer has the original gene product function or activity; or is a dysfunctional gene product. In some embodiments, the gene is inactivated by an addition or substitution, wherein incorporation or substitution of at least one nucleotide into the gene sequence results in a dysfunctional gene product. In some embodiments, the host cell comprises a gene deletion as described in the any of the embodiments herein.

Methods and techniques for inactivating a T-cell inhibitory gene in a host cell, or inactivating a target gene as described herein to suppress T cell function, include, but are not limited to, small interfering RNA (siRNA), small hairpin RNA (shRNA; also referred to as a short hairpin RNA), clustered, regularly interspaced, short palindromic repeats (CRISPR), transcription activator-like effector nuclease (TALEN), zinc-finger nuclease (ZFN), homologous recombination, non-homologous end-joining, and meganuclease. See, e.g., O'Keefe, Mater Methods, 3, 2013; Doench et al., *Nat Biotechnol*, 32, 2014; Gaj et al., *Trends Biotechnol*, 31, 2014; and Silva et al., *Curr Gene Ther*, 11, 2011.

Inhibitory RNA

In some embodiments, the T-cell inhibitory gene, or gene to be modified to suppress T cell function, is inactivated by a small interfering RNA (siRNA) system. siRNA sequences to inactivate a target gene can be identified using considerations such as length of siRNA, e.g., 21-23 nucleotides, or fewer; avoidance of regions with 50-100 nucleotides of the start codon and termination codon, avoidance of intron regions; avoidance of stretches of four or more of the same nucleotide; avoidance of regions with GC content that is less than 30% or greater than 60%; avoidance of repeats and low sequence complexity region; avoidance of single nucleotide polymorphic sites, and avoidance of sequences that are complementary to sequences in other off-target genes (see, e.g., Rules of siRNA design for RNA interference, Protocol Online, May 29, 2004; and Reynolds et al., *Nat Biotechnol*, 22:3236-330 2004).

In some embodiments, the siRNA system comprises a siRNA nucleotide sequence that is about 10 to 200 nucleotides in length, or about 10 to 100 nucleotides in length, or about 15 to 100 nucleotides in length, or about 10 to 60 nucleotides in length, or about 15 to 60 nucleotides in length, or about 10 to 50 nucleotides in length, or about 15 to 50 nucleotides in length, or about 10 to 30 nucleotides in length, or about 15 to 30 nucleotides in length. In some embodiments, the siRNA nucleotide sequence is approximately 10-25 nucleotides in length. In some embodiments, the siRNA nucleotide sequence is approximately 15-25 nucleotides in length. In some embodiments, the siRNA nucleotide sequence is at least about 10, at least about 15, at least about 20, or at least about 25 nucleotides in length. In some embodiments, the siRNA system comprises a nucleotide sequence that is at least about 80%, at least about 85%, at least about 90%, at least about 95%, or 100% complementary to a region of a the target mRNA molecule. In some embodiments, the siRNA system comprises a nucleotide sequence that is at least at least about 80%, at least about 85%, at least about 90%, at least about 95%, or 100% complementary to a region of the target pro-mRNA molecule. In some, embodiments, the siRNA system comprises a double stranded RNA molecule. In some embodiments, the siRNA system comprises a single stranded RNA molecule.

In some embodiments, the host cell comprises a siRNA system as described in the any of the embodiments herein. In some embodiments, the host cell comprises a pro-siRNA nucleotide sequence that is processed into an active siRNA molecule as described in the any of the embodiments herein. In some embodiments, the host cell comprises a siRNA nucleotide sequence that is at least about 80%, at least about 85%, at least about 90%, at least about 95%, or 100% complementary to a region of the target mRNA molecule. In some embodiments, the host cell comprises an expression vector encoding a siRNA molecule as described in the any of the embodiments herein. In some embodiments, the host cell comprises an expression vector encoding a pro-siRNA molecule as described in the any of the embodiments herein.

In some embodiments, the siRNA system comprises a delivery vector. In some embodiments, the host cell comprises a delivery vector. In some embodiments, the delivery vector comprises the pro-siRNA and/or siRNA molecule.

In some embodiments, the T-cell inhibitory gene is inactivated by a small hairpin RNA (shRNA; also referred to as a short hairpin RNA) system. Gene inactivation by shRNA systems are available. In some embodiments, the shRNA system comprises a nucleotide sequence that is about 10 to 200 nucleotides in length, or about 10 to 100 nucleotides in length, or about 15 to 100 nucleotides in length, or about 10 to 60 nucleotides in length, or about 15 to 60 nucleotides in length, or about 10 to 50 nucleotides in length, or about 15 to 50 nucleotides in length, or about 10 to 30 nucleotides in length, or about 15 to 30 nucleotides in length. In some embodiments, the shRNA nucleotide sequence is approximately 10-25 nucleotides in length. In some embodiments, the shRNA nucleotide sequence is approximately 15-25 nucleotides in length. In some embodiments, the shRNA nucleotide sequence is at least about 10, at least about 15, at least about 20, or at least about 25 nucleotides in length. In some embodiments, the shRNA system comprises a nucleotide sequence that is at least about 80%, at least about 85%, at least about 90%, at least about 95%, or 100% complementary to a region of a T-cell inhibitory nucleic acid mRNA molecule. In some embodiments, the shRNA system comprises a nucleotide sequence that is at least about 80%, at least about 85%, at least about 90%, at least about 95%, or 100% complementary to a region of a pro-mRNA molecule. In some embodiments, the shRNA system comprises a double stranded RNA molecule. In some embodiments, the shRNA system comprises a single stranded RNA molecule. In some embodiments, the host cell comprises a shRNA system as described in the any of the embodiments herein. In some embodiments, the host cell comprises a pre-shRNA nucleotide sequence that is processed in an active shRNA nucleotide sequence as described in any of the embodiments herein. In some embodiments, the pro-shRNA molecule composed of DNA. In some embodiments, the pro-shRNA molecule is a DNA construct. In some embodiments, the host cell comprises a shRNA nucleotide sequence that is at least about 80%, at least about 85%, at least about 90%, at least about 95%, or 100% complementary to a region of the T-cell inhibitory gene mRNA molecule. In some embodiments, the host cell comprises an expression vector encoding a shRNA molecule as described in the any of the embodiments herein. In some embodiments, the host cell comprises an expression vector encoding a pro-shRNA molecule as described in the any of the embodiments herein.

In some embodiments, the shRNA system comprises a delivery vector. In some embodiments, the host comprises a delivery vector. In some embodiments, the delivery vector comprises the pro-shRNA and/or shRNA molecule. In some embodiments, the delivery vector is a virus vector. In some embodiments, the delivery vector is a lentivirus. In some embodiments, the delivery vector is an adenovirus. In some embodiments, the vector comprises a promoter.

CRISPR

In some embodiments, inhibiting expression of a T cell inhibitory gene is accomplished using CRISPR/CAS methodology. Illustrative methods of using the CRISPR/Cas system to reduce gene expression are described in various publications, e.g., U.S. Patent Application Publication No. 2014/0170753. A CRISPR/Cas system includes a Cas protein and at least one to two ribonucleic acids that hybridize to a target motif in the T cell inhibitory gene and direct the Cas protein to the target motif. Any CRISPR/Cas system that is capable of altering a target polynucleotide sequence in a cell can be used. In some embodiments, the CRISPR Cas system is a CRISPR type I system, in some embodiments, the CRISPR/Cas system is a CRISPR type II system. In some embodiments, the CRISPR/Cas system is a CRISPR type V system.

The Cas protein used in the invention can be a naturally occurring Cas protein or a functional derivative thereof. A "functional derivative" includes, but are not limited to, fragments of a native sequence and derivatives of a native sequence polypeptide and its fragments, provided that they have a biological activity in common with a corresponding native sequence polypeptide. A biological activity contemplated herein is the ability of the functional derivative to hydrolyze a DNA substrate into fragments. The term "derivative" encompasses both amino acid sequence variants of polypeptide, covalent modifications, and fusions thereof such as derivative Cas proteins. Suitable derivatives of a Cas polypeptide or a fragment thereof include but are not limited to mutants, fusions, covalent modifications of Cas protein or a fragment thereof.

There are three main types of Cas nucleases (type I, type II, and type III), and 10 subtypes including 5 type I, 3 type II, and 2 type III proteins (see, e.g., Hochstrasser and Doudna, *Trends Biochem Sci,* 2015:40(1):58-66). Type II Cas nucleases include Cas1, Cas2, Csn2, and Cas9. These Cas nucleases are known to those skilled in the art. For example, the amino acid sequence of the *Streptococcus pyogenes* wild-type Cas9 polypeptide is set forth, e.g., in NBCI Ref. Seq. No. NP_269215, and the amino acid sequence of *Streptococcus thermophilus* wild-type Cas9 polypeptide is set forth, e.g., in NBCI Ref. Seq. No. WP_011681470. Some CRISPR-related endonucleases that may be used in methods described herein are disclosed, e.g., in U.S. Application Publication Nos. 2014/0068797, 2014/0302563, and 2014/0356959. Non-limiting examples of Cas nucleases include Cas1, Cas1B, Cas2, Cas3, Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, Csf4, homologs thereof, variants thereof, mutants thereof, and derivatives thereof.

Cas9 homologs are found in a wide variety of eubacteria, including, but not limited to bacteria of the following taxonomic groups: Actinobacteria, Aquificae, Bacteroidetes-Chlorobi, Chlamydiae-Verrucomicrobia, Chlroflexi, Cyanobacteria, Firmicutes, Proteobacteria, Spirochaetes, and Thermotogae. An exemplary Cas9 protein is the *Streptococcus pyogenes* Cas9 protein. Additional Cas9 proteins and homologs thereof are described in, e.g., Chylinksi, et al., *RNA Biol.* 2013 May 1; 10(5): 726-737; *Nat. Rev. Microbiol.*

2011 June; 9(6): 467-477; Hou, et al., *Proc Natl Acad Sci USA*. 2013 Sep. 24; 110(39): 15644-9; Sampson et al., *Nature*. 2013 May 9; 497(7448):254-7; and Jinek, et al., *Science*. 2012 Aug. 17; 337(6096):816-21. Variants of any of the Cas9 nucleases provided herein can be optimized for efficient activity or enhanced stability in the host cell. Thus, engineered Cas9 nucleases are also contemplated. Cas 9 from *Streptococcus pyogenes* contains 2 endonuclease domains, including an RuvC-like domain that cleaves target DNA that is noncomplementary to crRNA, and an HNH nuclease domain that cleave target DNA complementary to crRNA. The double-stranded endonuclease activity of Cas9 also involves a short conserved sequence, (2-5 nucleotides), known as a protospacer-associated motif (PAM), which follows immediately 3'- of a target motif in the target sequence Additionally, Cas nucleases, e.g., Cas9 polypeptides, can be derived from a variety of bacterial species including, but not limited to, *Veillonella* atypical, *Fusobacterium nucleatum, Filifactor alocis, Solobacterium moorei, Coprococcus catus, Treponema denticola, Peptoniphilus* duerdenii, *Catenibacterium mitsuokai, Streptococcus mutans. Listeria innocua, Staphylococcus pseudintermedius, Acidaminococcus* intestine, *Olsenella uli, Oenococcus kitaharae, Bifidobacterium bifidum, Lactobacillus rhamnosus, Lactobacillus gasseri, Finegoldia magna, Mycoplasma* mobile. *Mycoplasma gallisepticum, Mycoplasma ovipneumoniae, Mycoplasma canis, Mycoplasma synoviae, Eubacterium rectale, Streptococcus thermophilus, Eubacterium dolichum, Lactobacillus coryniformis* subsp. *Torquens, Ilyobacter polytropus, Ruminococcus albus, Akkermansia muciniphila, Acidothermus cellulolyticus, Bifidobacterium longum, Bifidobacterium dentium, Corynebacterium diphtheria, Elusimicrobium minutum, Nitratifractor salsuginis, Spaerochaeta globus, Fibrobacter succinogenes* subsp. *Succinogenes, Bacteroides fragilis, Capnocytophaga ochracea, Rhodopseudomonas palustris, Prevotella micans, Prevotella ruminicola, Flavobacterium columnare, Aminomonas paucivorans, Rhodospirillum rubrum, Candidatus* Puniceispirillum *marinum, Verminephrobacter eiseniae, Ralstonia syzygii, Dinoroseobacter shibae, Azospirillum, Nitrobacter hamburgensis, Bradyrhizobium, Wolinella succinogenes, Campylobacter jejuni* subsp. *Jejuni, Helicobacter mustelae, Bacillus cereus, Acidovorax ebreus, Clostridium perfringens, Parvibaculum lavamentivorans, Roseburia intestinalis, Neisseria meningitidis, Pasteurella multocida* subsp. *Multocida, Sutterella wadsworthensis,* proteobacterium, *Legionella pneumophila, Parasutterella excrementihominis, Wolinella succinogenes,* and *Francisella novicida.*

Other RNA-mediated nucleases include Cpf1 (See. e.g., Zetsche et al., Cell, Volume 163, Issue 3, p 759-771, 22 Oct. 2015) and homologs thereof.

As used herein, the term "Cas9 ribonucleoprotein" complex and the like refers to a complex between the Cas9 protein and a guide RNA, the Cas9 protein and a crRNA, the Cas9 protein and a trans-activating crRNA (tracrRNA), or a combination thereof (e.g., a complex containing the Cas9 protein, a tracrRNA, and a crRNA guide RNA). It is understood that in any of the embodiments described herein, a Cas9 nuclease can be substituted with another RNA-mediated nuclease, e.g., an alternative Cas protein or a Cpf1 nuclease.

In some embodiments, the Cas protein is introduced into T-cells in polypeptide form. Thus, for example, in certain embodiments, the Cas proteins can be conjugated to or fused to a cell-penetrating polypeptide or cell-penetrating peptide that is well known in the art. Non-limiting examples of cell-penetrating peptides include those provided in Milletti F, "*Drug Discov. Today* 17: 850-860, 2012, the relevant disclosure of which is hereby incorporated by reference in its entirety. In some cases, T cells may be genetically engineered to produce the Cas protein.

In some embodiments, a Cpf1 nuclease or the Cas9 nuclease and the gRNA are introduced into the cell as a ribonucleoprotein (RNP) complex.

In some embodiments, the RNP complex may be introduced into about $1 \times 10^5$ to about $2 \times 10^6$ cells (e.g., $1 \times 10^5$ cells to about $5 \times 10^5$ cells, about $1 \times 10^5$ cells to about $1 \times 10^6$ cells, $1 \times 10^5$ cells to about $1.5 \times 10^6$ cells, $1 \times 10^5$ cells to about $2 \times 10^6$ cells, about $1 \times 10^6$ cells to about $1.5 \times 10^6$ cells, or about $1 \times 10^6$ cells to about $2 \times 10^6$ cells). In some embodiments, the cells are cultured under conditions effective for expanding the population of modified cells. Also disclosed herein is a population of cells, in which the genome of at least 20%, 30%, 40%, 50%, 60%, 70%, 80%, 90%, 95%, 99% or greater of the cells comprises a genetic modification or heterologous polynucleotide that inhibits expression of a T cell inhibitory genes as described herein. In some embodiments, the population comprises subpopulations of cells each of which subpopulations have a different genetic modification to inhibit expression of a T cell inhibitory gene as described herein.

In some embodiments, the RNP complex is introduced into the T cells by electroporation. Methods, compositions, and devices for electroporating cells to introduce a RNP complex are available in the art, see, e.g., WO 2016/123578, WO/2006/001614, and Kim, J. A. et al. *Biosens. Bioelectron.* 23, 1353-1360 (2008). Additional or alternative methods, compositions, and devices for electroporating cells to introduce a RNP complex can include those described in U.S. Patent Appl. Pub. Nos. 2006/0094095; 2005/0064596; or 2006/0087522; Li, L. H. et al. *Cancer Res. Treat.* 1, 341-350 (2002); U.S. Pat. Nos. 6,773,669; 7,186,559; 7,771, 984; 7,991,559; 6,485,961; 7,029,916; and U.S. Patent Appl. Pub. Nos: 2014/0017213; and 2012/0088842; Geng, T. et al., *J. Control Release* 144, 91-100 (2010); and Wang, J., et al. *Lab. Chip* 10, 2057-2061 (2010).

In some embodiments, the Cas9 protein can be in an active endonuclease form, such that when bound to target nucleic acid as part of a complex with a guide RNA or part of a complex with a DNA template, a double strand break is introduced into the target nucleic acid. In the methods provided herein, a Cas9 polypeptide or a nucleic acid encoding a Cas9 polypeptide can be introduced into the T cell. The double strand break can be repaired by HDR to insert the DNA template into the genome of the T cell. Various Cas9 nucleases can be utilized in the methods described herein. For example, a Cas9 nuclease that requires an NGG protospacer adjacent motif (PAM) immediately 3' of the region targeted by the guide RNA can be utilized. Such Cas9 nucleases can be targeted to a region in exon 1 of the TRAC or exon 1 of the TRAB that contains an NGG sequence. As another example, Cas9 proteins with orthogonal PAM motif requirements can be used to target sequences that do not have an adjacent NGG PAM sequence. Exemplary Cas9 proteins with orthogonal PAM sequence specificities include, but are not limited to those described in Esvelt el al., *Nature Methods* 10: 1116-1121 (2013).

In some cases, the Cas9 protein is a nickase, such that when bound to target nucleic acid as part of a complex with a guide RNA, a single strand break or nick is introduced into the target nucleic acid. A pair of Cas9 nickases, each bound to a structurally different guide RNA, can be targeted to two proximal sites of a target genomic region and thus introduce a pair of proximal single stranded breaks into the target genomic region, for example exon 1 of a TRAC gene or exon 1 of a TRBC gene. Nickase pairs can provide enhanced specificity because off-target effects are likely to result in single nicks, which are generally repaired without lesion by base-excision repair mechanisms. Illustrative Cas9 nickases include Cas9 nucleases having a D10A or H840A mutation (See, for example, Jinek et al., *Science* 337:816-821, 2012; Qi et al, Cell, 152(5): 1173-1183, 2012; Ran et al. Cell 154: 1380-1389, 2013). In one embodiment, the Cas9 polypeptide from *Streptococcus pyogenes* comprises at least one mutation at position D10, G12, G17, E762, H840, N854, N863, H982, H983, A984, D986, A987 or any combination thereof. Descriptions of such dCas9 polypeptides and variants thereof are provided in, for example, International Patent Publication No. WO 2013/176772. The Cas9 enzyme may contain a mutation at D10, E762, H983, or D986, as well as a mutation at H840 or N863. In some instances, the Cas9 enzyme may contain a D10A or DION mutation. In further embodiments, the Cas9 enzyme may contain a H840A, H840Y, or H840N. In some embodiments, the Cas9 enzyme may contain D10A and H840A; D10A and H840Y; D10A and H840N; DION and H840A, DION and H840Y; or DION and H840N substitutions. The substitutions can be conservative or non-conservative substitutions to render the Cas9 polypeptide catalytically inactive and able to bind to target DNA.

In some embodiments, the Cas nuclease can be a high-fidelity or enhanced specificity Cas9 polypeptide variant with reduced off-target effects and robust on-target cleavage. Non-limiting examples of Cas9 polypeptide variants with improved on-target specificity include the SpCas9 (K855A), SpCas9 (K810A/K1003A/R1060A) (also referred to as eSpCas9(1.0)), and SpCas9 (K848A/K1003A/R1060A) (also referred to as eSpCas9(1.1)) variants described in Slaymaker et al., *Science,* 351(6268):84-8 (2016), and the SpCas9 variants described in Kleinstiver et al., *Nature,* 529(7587): 490-5 (2016) containing one, two, three, or four of the following mutations: N497A, R661A, Q695A, and Q926A (e.g., SpCas9-HF1 contains all four mutations).

In some embodiments, the target motifs can be selected to minimize off-target effects of the CRISPR/Cas systems of the present invention. For example, in some embodiments, the target motif is selected such that it contains at least two mismatches when compared with all other genomic nucleotide sequences in the cell. In some embodiments, the target motif is selected such that it contains at least one mismatch when compared with all other genomic nucleotide sequences in the cell. Those skilled in the art will appreciate that a variety of techniques can be used to select suitable target motifs for minimizing off-target effects (e.g., bioinformatics analyses).

As used throughout, a guide RNA (gRNA) sequence is a sequence that interacts with a site-specific or targeted nuclease and specifically binds to or hybridizes to a target nucleic acid within the genome of a cell, such that the gRNA and the targeted nuclease co-localize to the target nucleic acid in the genome of the cell. Each gRNA includes a DNA targeting sequence or protospacer sequence of about 10 to 50 nucleotides in length that specifically binds to or hybridizes to a target DNA sequence in the genome. For example, the targeting sequence may be about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nucleotides in length. In some embodiments, the gRNA comprises a crRNA sequence and a transactivating crRNA (tracrRNA) sequence. In some embodiments, the gRNA does not comprise a tracrRNA sequence.

The sgRNAs can be selected depending on the particular CRISPR/Cas system employed, and the sequence of the target polynucleotide, as will be appreciated by those skilled in the art. As indicated above, in some embodiments, the one to two ribonucleic acids can also be selected to minimize hybridization with nucleic acid sequences other than the target polynucleotide sequence. In some embodiments, the one to two ribonucleic acids hybridize to a target motif that contains at least two mismatches when compared with all other genomic nucleotide sequences in the cell. In some embodiments, the one to two ribonucleic acids hybridize to a target motif that contains at least one mismatch when compared with all other genomic nucleotide sequences in the cell. In some embodiments, the one to two ribonucleic acids are designed to hybridize to a target motif immediately adjacent to a deoxyribonucleic acid motif recognized by the Cas protein. In some embodiments, each of the one to two ribonucleic acids are designed to hybridize to target motifs immediately adjacent to deoxyribonucleic acid motifs recognized by the Cas protein which flank a mutant allele located between the target motifs. Guide RNAs can also be designed using software that are readily available, for example, at the website crispr.mit.edu. The one or more sgRNAs can be transfected into T cells in which Cas protein is present by transfection, according to methods known in the art.

In some cases, the DNA targeting sequence can incorporate wobble or degenerate bases to bind multiple genetic elements. In some cases, the 19 nucleotides at the 3' or 5' end of the binding region are perfectly complementary to the target genetic element or elements. In some cases, the binding region can be altered to increase stability. For example, non-natural nucleotides, can be incorporated to increase RNA resistance to degradation. In some cases, the binding region can be altered or designed to avoid or reduce secondary structure formation in the binding region. In some cases, the binding region can be designed to optimize G-C content. In some cases, G-C content is preferably between about 40% and about 60% (e.g., 40%, 45%, 50%, 55%, 60%).

In some embodiments, the sequence of the gRNA or a portion thereof is designed to complement (e.g., perfectly complement) or substantially complement (e.g., 50%, 55%, 60%, 65%, 70%, 75%, 80%, 85%, 90%, 91%, 92%, 93%, 94% 95%, 96%, 97%, 98%, or 99% complement) the target region in the T-cell inhibitory gene. In some embodiments, the portion of the gRNA that complements and binds the targeting region in the polynucleotide is, or is about, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39 or 40 or more nucleotides in length. In some cases, the portion of the gRNA that complements and binds the targeting region in the polynucleotide is between about 19 and about 21 nucleotides in length. In some cases, the gRNA may incorporate wobble or degenerate bases to bind target regions. In some cases, the gRNA can be altered to increase stability. For example, non-natural nucleotides, can be incorporated to increase RNA resistance to degradation. In some cases, the gRNA can be altered or designed to avoid or reduce secondary structure formation. In some cases, the gRNA can be designed to optimize G-C content. In some cases, G-C content is between about 40% and about 60% (e.g., 40%, 45%, 50%, 55%, 60%). In some cases, the binding region can contain modified nucleotides such as, without limitation, methylated or phosphorylated nucleotides.

In some embodiments, the gRNA can be optimized for expression by substituting, deleting, or adding one or more nucleotides. In some cases, a nucleotide sequence that provides inefficient transcription from an encoding template nucleic acid can be deleted or substituted. For example, in some cases, the gRNA is transcribed from a nucleic acid operably linked to an RNA polymerase III promoter. In such cases, gRNA sequences that result in inefficient transcription by RNA polymerase III, such as those described in Nielsen et al., Science. 2013 Jun. 28; 340(6140): 1577-80, can be deleted or substituted. For example, one or more consecutive uracils can be deleted or substituted from the gRNA sequence. In some cases, if the uracil is hydrogen bonded to a corresponding adenine, the gRNA sequence can be altered to exchange the adenine and uracil. This "A-U flip" can retain the overall structure and function of the gRNA molecule while improving expression by reducing the number of consecutive uracil nucleotides.

In some embodiments, the gRNA can be optimized for stability. Stability can be enhanced by optimizing the stability of the gRNA:nuclease interaction, optimizing assembly of the gRNA:nuclease complex, removing or altering RNA destabilizing sequence elements, or adding RNA stabilizing sequence elements. In some embodiments, the gRNA contains a 5' stem-loop structure proximal to, or adjacent to, the region that interacts with the gRNA-mediated nuclease. Optimization of the 5' stem-loop structure can provide enhanced stability or assembly of the gRNA:nuclease complex. In some cases, the 5' stem-loop structure is optimized by increasing the length of the stem portion of the stem-loop structure.

gRNAs can be modified by methods known in the art. In some cases, the modifications can include, but are not limited to, the addition of one or more of the following sequence elements: a 5' cap (e.g., a 7-methylguanylate cap); a 3' polyadenylated tail; a riboswitch sequence; a stability control sequence; a hairpin; a subcellular localization sequence; a detection sequence or label; or a binding site for one or more proteins. Modifications can also include the introduction of non-natural nucleotides including, but not limited to, one or more of the following: fluorescent nucleotides and methylated nucleotides.

Also provided herein are expression cassettes and vectors for producing gRNAs in a host cell. The expression cassettes can contain a promoter (e.g., a heterologous promoter) operably linked to a polynucleotide encoding a gRNA. The promoter can be inducible or constitutive. The promoter can be tissue specific. In some cases, the promoter is a U6, H1, or spleen focus-forming virus (SFFV) long terminal repeat promoter. In some cases, the promoter is a weak mammalian promoter as compared to the human elongation factor 1 promoter (EF1 A). In some cases, the weak mammalian promoter is a ubiquitin C promoter or a phosphoglycerate kinase 1 promoter (PGK). In some cases, the weak mammalian promoter is a TetOn promoter in the absence of an inducer. In some cases, when a TetOn promoter is utilized, the host cell is also contacted with a tetracycline transactivator. In some embodiments, the strength of the selected gRNA promoter is selected to express an amount of gRNA that is proportional to the amount of Cas9 or dCas9. The expression cassette can be in a vector, such as a plasmid, a viral vector, a lentiviral vector, etc. In some cases, the expression cassette is in a host cell. The gRNA expression cassette can be episomal or integrated in the host cell.

Modifications Using Alternative Targeted Nuclease Systems

In some embodiments, a targeted nuclease that is employed in modifying a T cell to inhibit expression of a T-cell regulatory gene a transcription activator-like effector nuclease (TALEN), a zinc finger nuclease (ZFN) or a megaTAL (See, for example, Merkert and Martin "Site-Specific Genome Engineering in Human Pluripotent Stem Cells," *Int. J. Mol. Sci.* 18(7): 1000 (2016)).

Zinc-Finger Nuclease to Inhibit T-Cell Inhibitory Gene Expression

In some embodiments, modified T cells comprising a T-cell inhibitory gene-targeted alteration are produced by inhibiting expression using ZFN. Methods of using the ZFNs to reduce gene expression are described, e.g., in U.S. Pat. No. 9,045,763, and also in Durai et al., *Nucleic Acid Research* 33:5978-5990, 2005; Carroll et al. *Genetics Society of America* 188: 773-782, 2011; and Kim et al. *Proc. Natl. Acad. Sci. USA* 93: 1156-1160.

A ZFN comprises a FokI nuclease domain (or derivative thereof) fused to a DNA-binding domain. In the case of a ZFN, the DNA-binding domain comprises one or more zinc fingers. A zinc finger is a small protein structural motif stabilized by one or more zinc ions. A zinc finger can comprise, for example, Cys2His2, and can recognize an approximately 3-bp sequence. Various zinc fingers of known specificity can be combined to produce multi-finger polypeptides which recognize about 6, 9, 12, 15 or 18-bp sequences. Various selection and modular assembly techniques are available to generate zinc fingers (and combinations thereof) recognizing specific sequences, including phage display, yeast one-hybrid systems, bacterial one-hybrid and two-hybrid systems, and mammalian cells.

A ZFN dimerizes to cleave DNA. Thus, a pair of ZFNs are used to target non-palindromic DNA sites. The two individual ZFNs bind opposite strands of the DNA with their nucleases properly spaced apart (see, e.g., Bitinaite el al., *Proc. Natl. Acad. Sci. USA* 95: 10570-5, 1998). A ZFN can create a double-stranded break in the DNA, which can create a frame-shift mutation if improperly repaired, leading to a decrease in the expression and level of expression of the target gene in a cell in a cell.

TALENs to Inhibit T-Cell Inhibitory Genes

In some embodiments, T-cells that comprise a targeted alteration are produced by inhibiting the desired T-cell inhibitory gene with transcription activator-like effector nucleases (TALENS). TALENs are similar to ZFNs in that they bind as a pair around a genomic site and direct anon-specific nuclease, e.g., FoKI, to cleave the genome at a specific site, but instead of recognizing DNA triplets, each domain recognizes a single nucleotide. Methods of using TALENS to reduce gene expression are disclosed, e.g., in U.S. Pat. No. 9,005,973; Christian et al. "*Genetics* 186(2): 757-761, 2010; Zhang et al. 2011 Nature Biotech. 29: 149-53, 2011; Geibler et al. 2011 PLoS ONE 6: e19509, 2011; Boch et al. 2009 Science 326: 1509-12; Moscou et al. 2009 Science 326: 3501.

To produce a TALEN, a TALE protein is typically fused to a FokI endonuclease, which can be a wild-type or mutated FokI endonuclease. Several mutations to FokI have been made for its use in TALENs; these, for example, improve cleavage specificity or activity. Cermak et al, *Nucl. Acids Res.* 39:e82, 2011; Miller et al., *Nature Biotech.* 29:143-8, 2011; Hockemeyer et al., *Nature Biotech.* 29:731-734, 2011; Wood et al., *Science* 333:307, 2011; Doyon et al., *Nature Methods* 8:74-79, 2010; Szczepek et al., *Nature Biotech.* 25:786-793, 2007; and Guo et al., *J. Mol. Biol.* 200:96, 2010.

The FokI domain functions as a dimer and typically employ two constructs with unique DNA binding domains for sites in the target genome with proper orientation and spacing. Both the number of amino acid residues between the TALE DNA binding domain and the FokI cleavage domain and the number of bases between the two individual TALEN binding sites appear to be important parameters for achieving high levels of activity, (e.g. Miller et al., 2011, supra).

Meganucleases

"Meganucleases" are rare-cutting endonucleases or homing endonucleases that can be highly specific, recognizing DNA target sites ranging from at least 12 base pairs in length, e.g., from 12 to 40 base pairs or 12 to 60 base pairs in length. Meganucleases can be modular DNA-binding nucleases such as any fusion protein comprising at least one catalytic domain of an endonuclease and at least one DNA binding domain or protein specifying a nucleic acid target sequence. The DNA-binding domain can contain at least one motif that recognizes single- or double-stranded DNA. The meganuclease can be monomeric or dimeric.

In some embodiments of the methods described herein, meganucleases may be used to inhibit the expression of a T-cell inhibitory gene or inhibit expression of a gene to suppress immune function as described herein. In some instances, the meganuclease is naturally-occurring (found in nature) or wild-type, and in other instances, the meganuclease is non-natural, artificial, engineered, synthetic, or rationally designed. In certain embodiments, the meganucleases that may be used in methods described herein include, but are not limited to, an I-CreI meganuclease, I-CeuI meganuclease, I-MsoI meganuclease, I-SceI meganuclease, variants thereof, mutants thereof, and derivatives thereof.

Detailed descriptions of useful meganucleases and their application in gene editing are found, e.g., in Silva et al., *Curr Gene Ther*, 2011, 11(1): 11-27; Zaslavoskiy et al., *BMC Bioinformatics*, 2014, 15:191; Takeuchi et al., *Proc Natl Acad Sci USA*, 2014, 111(11):4061-4066, and U.S. Pat. Nos. 7,842,489; 7,897,372; 8,021,867; 8,163,514; 8,133,697; 8,021,867; 8,119,361; 8,119,381; 8,124,36; and 8,129,134.

Efficiency of the inhibition of expression of any T-cell regulatory gene using a method as described herein can be assessed by measuring the amount of mRNA or protein using methods well known in the art, for example, quantitative PCR, western blot, flow cytometry, etc and the like. In some embodiments, the level of protein is evaluated to assess efficiency of inhibition efficiency. In certain embodiments, the efficiency of reduction of target gene expression is at least 5%, at least 10%, at least 20%, at least 30%, at least 50%, at least 60%, or at least 80%, or at least 90%, or greater, as compared to corresponding cells that do not have the targeted modification. In certain embodiments, the efficiency of reduction is from about 10% to about 90%. In certain embodiments, the efficiency of reduction is from about 30% to about 80%. In certain embodiments, the efficiency of reduction is from about 50% to about 80%. In some embodiments, the efficiency of reduction is greater than or equal to about 80%.

Treatment Methods and Compositions

Any of the methods described herein may be used to modify T cells, e.g., CD8+ T cells, obtained from a human subject. T-cells modified in accordance with the invention may be used to treat any number of diseases or conditions, including cancer, an autoimmune disease, an infectious disease, or a disease or condition associated with transplant rejection.

Methods of Treating Cancer

In some embodiments, T cells are modified to decrease expression of a T-cell inhibitory gene as described herein. In some embodiments, the T-cell inhibitory gene that is modified is CBLB, CD5, SOCS1, TMEM222, TNFAIP3, DGKZ, RASA2, TCEB2, UBASH3A or ARID1A. In some embodiments, the T-cell inhibitory gene is CD5, SOCS1, TMEM222, TNFAIP3, RASA2, or TCEB2. In some embodiments, the T-cell inhibitory gene is SOCS1, TCEB2, RASA2, or CBLB. In some embodiments, the T-cell inhibitory gene is SOCS1, TCEB2, or RASA2. In some embodiments, the T-cell inhibitory gene that is modified is RASA2. TCEB2, SOCS1, CBLB, FAM105A, ARID1 A, or TMEM222. In some embodiments, the T-cell inhibitory gene that is modified is AGO1, ARIH2, CD8A, CDKN1B, DGKA, FIBP, GNA13, MEF2D, or SMARCB1. Thus, in some embodiments, provided herein is a method of treating cancer in a human subject comprising: a) obtaining T cells, e.g., CD8+ T cells, from the subject; b) modifying the T cells using any of the methods provided herein to decrease expression of a T cell inhibitor gene, e.g., a gene disclosed in this paragraph; and c) administering the modified T cells to the subject.

In some embodiments, T cells, e.g., CD8+ T cells, obtained from a subject that has cancer may be expanded ex vivo. The characteristics of the subject's cancer may determine a set of tailored cellular modifications (e.g., selection of one or more inhibitory gene targets), and these modifications may be applied to the T cells using any of the methods described herein. Modified Tcells may then be reintroduced to the subject. This strategy capitalizes on and enhances the function of the subject's natural repertoire of cancer specific T cells, providing a diverse arsenal to eliminate mutagenic cancer cells quickly.

Any cancer can be treated with genetically modified T cells as described herein. In some embodiments, the cancer is a carcinoma or a sarcoma. In some embodiments, the cancer is a hematological cancer. In some embodiments, the cancer is breast cancer, prostate cancer, testicular cancer, renal cell cancer, bladder cancer, liver cancer, ovarian cancer, cervical cancer, endometrial cancer, lung cancer, colorectal cancer, anal cancer, pancreatic cancer, gastric cancer, esophageal cancer, hepatocellular cancer, kidney cancer, head and neck cancer, glioblastoma, mesothelioma, melanoma, a chondrosarcoma, or a bone or soft tissue sarcoma. In some embodiments, the cancer is adrenocortical carcinoma, anal cancer, appendix cancer, astrocytoma, basal-cell carcinoma, bile duct cancer, bone tumor, brainstem glioma, brain cancer, cerebellar astrocytoma, cerebral astrocytoma, ependymoma, medulloblastoma, supratentorial primitive neuroectodermal tumors, visual pathway and hypothalamic glioma, or bronchial adenomas. In some embodiments, the cancer is acute lymphoblastic leukemia, acute myeloid leukemia, Burkitt's lymphoma, central nervous system lymphoma, chronic lymphocytic leukemia, chronic myelogenous leukemia, hairy cell leukemia, chronic myeloproliferative disorders, a myelodysplastic syndrome, an adult acute myeloproliferative disorder, multiple myeloma, cutaneous T-cell lymphoma, Hodgkin lymphoma, or non-Hodgkin lymphoma. In some embodiments, the cancer is desmoplastic small round cell tumor, ependymoma, epitheliod hemangioendothelioma (EHE), Ewing's sarcoma, extracranial germ cell tumor, extragonadal germ cell tumor, extrahepatic bile duct cancer, intraocular melanoma, retinoblastoma, gallbladder cancer, gastrointestinal carcinoid tumor, gastrointestinal stromal tumor (GIST), germ cell tumor, gestational trophoblastic tumor, gastric carcinoid, heart cancer, hypopharyngeal cancer, hypothalamic and visual pathway glioma, childhood, intraocular melanoma, islet cell carcinoma, Kaposi sarcoma, laryngeal cancer, lip and oral cavity cancer, liposarcoma, non-small cell lung cancer, small-cell lung cancer, macroglobulinemia, male breast cancer, malignant fibrous histiocytoma of bone, medulloblastoma, melanoma, Merkel cell cancer, mesothelioma, metastatic squamous neck cancer, mouth cancer, multiple endocrine neoplasia syndrome, mycosis fungoides, chronic, myxoma, nasal cavity and paranasal sinus cancer, nasopharyngeal carcinoma, neuroblastoma, oligodendroglioma, oral cancer, oropharyngeal cancer, osteosarcoma, ovarian epithelial cancer, ovarian germ cell tumor, ovarian low malignant potential tumor, paranasal sinus and nasal cavity cancer, parathyroid cancer, penile cancer, pharyngeal cancer, pheochromocytoma, pineal astrocytoma, pineal germinoma, pineoblastoma, supratentorial primitive neuroectodermal tumors, pituitary adenoma, plasma cell neoplasia, pleuropulmonary blastoma, primary central nervous system lymphoma, renal cell carcinoma, retinoblastoma, rhabdomyosarcoma, salivary gland cancer, uterine sarcoma, Sezary syndrome, non-melanoma skin cancer, melanoma Merkel cell skin carcinoma, small intestine cancer, squamous cell carcinoma, squamous neck cancer, throat cancer, thymoma, thyroid cancer, transitional cell cancer of the renal pelvis and ureter, trophoblastic tumor, gestational, urethral cancer, uterine cancer, vaginal cancer, vulvar cancer, Waldenström macroglobulinemia, or Wilms tumor.

In certain embodiments, the genetically modified T cells, or individual populations of sub-types of the genetically modified T cells, are administered to the subject at a range of about one million to about 100 billion cells, such as, e.g., 1 million to about 50 billion cells (e.g., about 5 million cells, about 25 million cells, about 500 million cells, about 1 billion cells, about 5 billion cells, about 20 billion cells, about 30 billion cells, about 40 billion cells, or a range defined by any two of the foregoing values), such as about 10 million to about 100 billion cells (e.g., about 20 million cells, about 30 million cells, about 40 million cells, about 60 million cells, about 70 million cells, about 80 million cells, about 90 million cells, about billion cells, about 25 billion cells, about 50 billion cells, about 75 billion cells, about 90 billion cells, or a range defined by any two of the foregoing values), and in some cases about 100 million cells to about 50 billion cells (e.g., about 120 million cells, about 250 million cells, about 350 million cells, about 450 million cells, about 650 million cells, about 800 million cells, about 900 million cells, about 3 billion cells, about 30 billion cells, about 45 billion cells) or any value in between these ranges.

In some embodiments, the dose of total cells and/or dose of individual subpopulations of cells is within a range of between at or about $10^4$ and at or about $10^9$ cells/kilograms (kg) body weight, such as between $10^5$ and $10^6$ cells/kg body weight, for example, at least about $1\times10^5$ cells/kg, $1.5\times10^5$ cells/kg, $2\times10^5$ cells/kg, $5\times10^5$ cells/kg, or $1\times10^6$ cells/kg body weight.

The appropriate dosage may depend on the type of cancer to be treated, the severity and course of the disease, previous therapy, the subject's clinical history and response to the cells, and the discretion of the attending physician. The compositions and cells are in some embodiments suitably administered to the subject at one time or over a series of treatments.

The cells can be administered by any suitable means, for example, by bolus infusion, by injection, e.g., intravenous or subcutaneous injections, intraocular injection, periocular injection, subretinal injection, intravitreal injection, transseptal injection, subscleral injection, intrachoroidal injection, intracameral injection, subconjectval injection, subconjuntival injection, sub-Tenon's injection, retrobulbar injection, peribulbar injection, or posterior juxtascleral delivery. In some embodiments, they are administered by parenteral, intrapulmonary, and intranasal, and, if desired for local treatment, intralesional administration. Parenteral infusions include intramuscular, intravenous, intraarterial, intraperitoneal, or subcutaneous administration. In some embodiments, a given dose is administered by a single bolus administration of the cells. In some embodiments, it is administered by multiple bolus administrations of the cells, for example, over a period of no more than 3 days, or by continuous infusion administration of the cells.

In some embodiments, the cells are administered as part of a combination treatment, such as simultaneously with or sequentially with, in any order, another therapeutic intervention, such as an antibody or engineered cell or receptor or agent, such as a cytotoxic or therapeutic agent. The cells in some embodiments are co-administered with one or more additional therapeutic agents or in connection with another therapeutic intervention, either simultaneously or sequentially in any order. In some contexts, the cells are co-administered with another therapy sufficiently close in time such that the cell populations enhance the effect of one or more additional therapeutic agents, or vice versa. In some embodiments, the cells are administered prior to the one or more additional therapeutic agents. In some embodiments, the cells are administered after the one or more additional therapeutic agents.

Methods of Treating Autoimmune Disease or Transplant Rejection Conditions

Also provided herein are methods of treating an autoimmune disease or other condition, e.g., transplant rejection, for which it is desirable to inhibit the immune system by administering T cells, e.g., CD8+ T cells, that are modified to inhibit expression of a CYP2R1, LCP2, RPP21, VAV1, EIF2B3, RPP21, EXOSC6, RPN1, VARS, CD3D, GRAP2, TRMT112, ALG8, VAV1, EXOSC6, SH2D1A, HSPA8, ZAP70, DDX54, CD247, ALDOA, ZNF131, WDR36, AK2, LCP2, CD247, VHL, EIF2B2, PRELID1, GRPEL1, NAA10, ALDOA, ALG2, MARS, C4orf45, RAC2, LCK, SUPT4H1, SLC25A3, LUC7L3, C3orf17, RPP21, HARS, ZNRD1, CCNH, MYC, CCDC25, EEF1G, CCND2, GCLC, TAF2, EIF6, SEC63, EXOSC6, RPS19BP1, SEC61B, VHL, DAD1, BEND6, FBL, VARS, EIF2B4, RAC2, PAGR1, MYC, CD3E, LCP2, MYC, ENOSF1, POLR3H, NOP14, CLNS1A, POLR2L, ZPR1, CARD11, SLC35B1, TRMT112, FARSA, PRELID1, LARS, NOP16, POLR2L, HSPA8, CD247, GEMIN8, TTC27, PMPCA, PWP2, TAF1C, DDOST, ZNF654, FAU, EIF2B3, YARS, DDX20, DDX56, DDX49, UTP20, EPRS, RSL1D1, ATP1B3, EXOSC4, ARMC7, EIF2B4, AUP1, VAV1, PAK1IP1, EIF6, FAM157A, HSPE1-MOB4, LAT, DCAF13, PPP1R10, EXOSC2, SRP9, POLR3K, TAF6, EIF3H, ABCF1, FLJ44635, PTP4A2, EIF3CL, ABCB7, GTF2H4, MARS, TAF4, RPL5, FTSJ3, CD28, ALG13, CARD11, EIF4G1, UTP3, GARS, CACNB4, HSPA8, POP7, ERCC3, GDPD2, SUPT5H, POLR3D, RPP30, C12orf45, DPH3, EIF3B, LACTBL1, THAP11, IMP4, EXOSC7, NOB1, EIF4E, PLCG1, HUWE1, RBM19, GATA3, CCND2, TTI2, THG1L, TAF1C, UR11, TRMT112, EIF3H, CCND2, GCLM, RBSN, QARS, POP7, TAF4, HUWE1, CARS, PTP4A2, PES1, ZNF785, WDR26, PRR20D, STK11, PIK3CD, YARS, STRAP, WDR77, NANS, TARS, HSPA8, TMEM127, FAM35A, ZBTB8OS BPTF, INO80D, NOP14, KARS, SH2D1A, RHOH, DIMT1, CMPK1, TAF6, QTRT1, LCK, NOL10, MYBBP1A, NHP2, DDX54, LAT, TAF2, MBTPS1, GNL3, DEF6, BCL10, NFKBIA, PHB, CD3G, CD3D, QARS, EIF3C, GRPEL1, MBTPS2, ORAOV1, SLC4A2, GATA3, ODF3, SLC7A6OS, ORAOV1, ALG13, or TAF1B gene. In some embodiments, the gene is any one of the following: HSPA8, RPP21, EXOSC6, LCP2, MYC, CD247, NOP14, VAV1, RHOH, TAF1C, TRMT112, CCND2, SH2D1A, MARS, CD3D, NELFCD LCK, LUC7L3, EIF2B4, ORAOV1. VARS, NOL10, ZBTB8OS, SLC35B1, NAA10, EIF2B3, DHX37, LAT, EMG1, ALDOA, GRPEL1, ARMC7, POLR2L, NOP56, PSENEN, RELA, SUPT4H1, VHL, GFER, BPTF, RAC2, TSR2, TAF6, PMPCA, EIF6, STT3B, POP7, GMPPB, TP53RK, CCNH TEX10, DHX33, QARS, EID2, IRF4, TAF2, LARS, GTF3A, NOP2, IMP3, RPL28, UTP3. EIF4G1, GPN1, UTP6, DAD1, ALG2, CDK6, MED19, RASGRP1, PHB2, NFS1, POLR2E, CDIPT, POLR3H, HARS, SEH1L, EIF2B5, TTC27, RRP12, JUNB, HSPE1, GMPS, EIF2S3, SRP14, FAM96B, RPL8, RRP36, MED11, ISG20L2, ROMO1, ATP6V1B2, RPN2, or WASH1. In one embodiment, the method comprises a) obtaining T cells from a subject that has the condition, e.g., an autoimmune disease, or a transplant; b) modifying the T cells using any of the methods provided herein to inhibit the expression of CYP2R1, LCP2, RPP21, VAV1, EIF2B3, RPP21, EXOSC6, RPN1, VARS, CD3D, GRAP2, TRMT112, ALG8, VAV1, EXOSC6, SH2D1A, HSPA8, ZAP70, DDX54, CD247, ALDOA, ZNF131, WDR36, AK2, LCP2, CD247, VHL, EIF2B2, PRELID1, GRPEL1, NAA10, ALDOA, ALG2, MARS, C4orf45, RAC2, LCK, SUPT4H1, SLC25A3, LUC7L3, C3orf17, RPP21, HARS, ZNRD1, CCNH, MYC, CCDC25, EEF1G, CCND2, GCLC, TAF2, EIF6, SEC63, EXOSC6, RPS19BP1, SEC61B, VHL, DAD1, BEND6, FBL, VARS, EIF2B4, RAC2, PAGR1, MYC, CD3E, LCP2, MYC, ENOSF1, POLR3H, NOP16, CLNS1A, POLR2L, ZPR1, CARD11, SLC35B1, TRMT112, FARSA, PRELID1, LARS, NOP16, POLR2L, HSPA8, CD247, GEMIN8, TTC27, PMPCA, PWP2, TAF1C, DDOST, ZNF654, FAU, EIF2B3, YARS, DDX20, DDX56, DDX49, UTP20, EPRS, RSL1D1, ATP1B3, EXOSC4, ARMC7, EIF2B4, AUP1, VAV1, PAK1IP1, EIF6, FAM157A, HSPE1-MOB4, LAT, DCAF13, PPP1R10, EXOSC2, SRP9, POLR3K, TAF6, EIF3H, ABCF1, FLJ44635, PTP4A2, EIF3CL, ABCB7, GTF2H4, MARS, TAF4, RPL5, FTSJ3, CD28, ALG13, CARD11, EIF4G1, UTP3, GARS, CACNB4, HSPA8, POP7, ERCC3, GDPD2, SUPT5H, POLR3D, RPP30, C12orf45, DPH3, EIF3B, LACTBL1, THAP11, IMP4, EXOSC7, NOB1, EIF4E, PLCG1, HUWE1, RBM19, GATA3, CCND2, TTI2, THG1L, TAF1C, UR11, TRMT112, EIF3H, CCND2, GCLM, RBSN, QARS, POP7, TAF4, HUWE1, CARS, PTP4A2, PES1, ZNF785, WDR26, PRR20D, STK11, PIK3CD, YARS, STRAP, WDR77, NANS, TARS, HSPA8, TMEM127, FAM35A, ZBTB8OS, BPTF, INO80D, NOP14, KARS, SH2D1A, RHOH, DIMT1, CMPK1, TAF6, QTRT1, LCK, NOL10, MYBBP1A, NHP2, DDX54, LAT, TAF2, MBTPS1, GNL3, DEF6, BCL10, NFKBIA, PHB, CD3G, CD3D, QARS, EIF3C, GRPEL1, MBTPS2, ORAOV1, SLC4A2, GATA3, ODF3, SLC7A6OS, ORAOV1, ALG13, or TAF1B gene; and c) administering the modified T cells to the subject. In some embodiments, the gene is any one of the following: HSPA8, RPP21, EXOSC6, LCP2, MYC, CD247, NOP14, VAV1, RHOH, TAF1C, TRMT112, CCND2, SH2D1A, MARS, CD3D, NELFCD LCK, LUC7L3, EIF2B4, ORAOV1, VARS, NOL10, ZBTB8OS, SLC35B1, NAA10, EIF2B3, DHX37, LAT, EMG1, ALDOA, GRPEL1, ARMC7, POLR2L, NOP56, PSENEN, RELA, SUPT4H1, VHL, GFER, BPTF, RAC2, TSR2, TAF6, PMPCA, EIF6, STT3B, POP7, GMPPB, TP53RK, CCNH, TEX10, DHX33, QARS, EID2, IRF4, TAF2, IARS, GTF3A, NOP2, IMP3, RPL28, UTP3. EIF4G1, GPN1, UTP6, DAD1, ALG2, CDK6, MED19, RASGRP1, PHB2, NFS1, POLR2E, CDIPT, POLR3H, HARS, SEH1L, EIF2B5, TTC27, RRP12, JUNB, HSPE1, GMPS, EIF2S3, SRP14, FAM96B, RPL8, RRP36, MED11, ISG20L2, ROMO1, ATP6V1B2, RPN2, or WASH1.

In some embodiments, modified T cells as described in the preceding paragraph are administered to a patient to treat or prevent transplant rejection.

In some embodiments, T cells modified as described herein to suppress immune function are administered to a patient that has an autoimmune disease or inflammatory disorder. In some embodiments, the autoimmune or inflammatory disease is osteoarthritis, rheumatoid arthritis, juvenile rheumatoid or idiopathic arthritis, multiple sclerosis, psoriasis, psoriatic arthritis, Crohn's disease, inflammatory bowel disease, ulcerative colitis, celiac disease, lupus, Grave's disease, Hashimoto's thyroiditis, Addison's disease, myasthenia gravis, Sjogren syndrome, type I diabetes, vasculitis, ankylosing spondylitis.

In certain embodiments, the genetically modified T cells, or individual populations of sub-types of the genetically modified T cells, are administered to the subject at a range of about one million to about 100 billion cells, such as, e.g., 1 million to about 50 billion cells (e.g., about 5 million cells, about 25 million cells, about 500 million cells, about 1 billion cells, about 5 billion cells, about 20 billion cells, about 30 billion cells, about 40 billion cells, or a range defined by any two of the foregoing values), such as about 10 million to about 100 billion cells (e.g., about 20 million cells, about 30 million cells, about 40 million cells, about 60 million cells, about 70 million cells, about 80 million cells, about 90 million cells, about billion cells, about 25 billion cells, about 50 billion cells, about 75 billion cells, about 90 billion cells, or a range defined by any two of the foregoing values), and in some cases about 100 million cells to about 50 billion cells (e.g., about 120 million cells, about 250 million cells, about 350 million cells, about 450 million cells, about 650 million cells, about 800 million cells, about 900 million cells, about 3 billion cells, about 30 billion cells, about 45 billion cells) or any value in between these ranges.

In some embodiments, the dose of total cells and/or dose of individual subpopulations of cells is within a range of between at or about $10^4$ and at or about $10^9$ cells/kilograms (kg) body weight, such as between $10^5$ and $10^6$ cells/kg body weight, for example, at least about $1\times10^5$ cells/kg, $1.5\times10^5$ cells/kg, $2\times10^5$ cells/kg, $5\times10^5$ cells/kg, or $1\times10^6$ cells/kg body weight.

The appropriate dosage may depend on the type of cancer to be treated, the severity and course of the disease, previous therapy, the subject's clinical history and response to the cells, and the discretion of the attending physician. The compositions and cells are in some embodiments suitably administered to the subject at one time or over a series of treatments.

The cells can be administered by any suitable means, for example, by bolus infusion, by injection, e.g., intravenous or subcutaneous injections, intraocular injection, periocular injection, subretinal injection, intravitreal injection, transseptal injection, subscleral injection, intrachoroidal injection, intracameral injection, subconjectval injection, subconjuntival injection, sub-Tenon's injection, retrobulbar injection, peribulbar injection, or posterior juxtascleral delivery. In some embodiments, they are administered by parenteral, intrapulmonary, and intranasal, and, if desired for local treatment, intralesional administration. Parenteral infusions include intramuscular, intravenous, intraarterial, intraperitoneal, or subcutaneous administration. In some embodiments, a given dose is administered by a single bolus administration of the cells. In some embodiments, it is administered by multiple bolus administrations of the cells, for example, over a period of no more than 3 days, or by continuous infusion administration of the cells.

In some embodiments, the cells are administered as part of a combination treatment, such as simultaneously with or sequentially with, in any order, another therapeutic intervention, such as an antibody or additional immunosuppressive agent. The cells in some embodiments are co-administered with one or more additional therapeutic agents or in connection with another therapeutic intervention, either simultaneously or sequentially in any order. In some contexts, the cells are co-administered with another therapy sufficiently close in time such that the cell populations enhance the effect of one or more additional therapeutic agents, or vice versa. In some embodiments, the cells are administered prior to the one or more additional therapeutic agents. In some embodiments, the cells are administered after the one or more additional therapeutic agents.

Publications cited herein and the material for which they are cited are hereby specifically incorporated by reference in their entireties.

EXAMPLES

The following examples are offered to illustrate, but not to limit the claimed invention.

Example 1. A Hybrid Approach to Introduce Traceable Genetic Perturbations in Primary Human T Cells We set out to establish a high-throughput CRISPR screening platform that works directly in ex vivo human hematopoietic cells. Current pooled CRISPR screening methods rely on establishing cell lines with stably integrated Cas9 expression cassettes. Our attempts to stably express *Streptococcus pyogenes* Cas9 by lentivirus in primary T cells resulted in extremely poor transduction efficiency. This low efficiency was prohibitive of large-scale pooled screens with primary cells, which are not immortalized and can only be expanded in culture for a limited amount of time. We previously showed efficient gene editing of primary human T cells by electroporation of Cas9 protein pre-loaded in vitro with small guide RNAs (sgRNAs) (Patel et al., 2017). We conceived of a hybrid system to introduce traceable sgRNA cassettes by lentivirus followed by electroporation with Cas9 protein (FIG. 1A). To test this strategy, we targeted the gene encoding a candidate cell surface protein, the alpha chain of the CD8 receptor (CD8A), as it is highly and uniformly expressed in human CD8$^+$ T cells. We optimized multiple steps in cell stimulation, lentiviral transduction, and Cas9 electroporation to ensure efficient delivery of each component while maintaining cell viability (FIG. 7A-D). Briefly, CD8$^+$ T cells were isolated from peripheral blood of healthy donors, stimulated, and then transduced with lentivirus encoding a sgRNA cassette and an mCherry fluorescence protein reporter gene. Following transduction, T cells were transfected with recombinant Cas9 protein by electroporation. At day 4 post-electroporation, the transduced cells (mCherry+) were largely (>80%) CD8 negative (FIG. 1B and FIG. 7E), indicative of successful targeting by the Cas9-sgRNA combination. Loss of CD8 protein was specifically programmed by the targeting sgRNA, as cells transduced with a non-targeting control sgRNA retained high levels of CD8 expression. By targeting PTPRC (CD45) with the same delivery strategy, we confirmed successful knockout at a second target and demonstrated efficacy of the system in both CD8$^+$ and CD4$^+$ T cells (FIG. 7F). Consistent with the observed loss of target protein expression, efficient gene editing was confirmed by sequencing the genomic target site (FIG. 7G). We conclude that sgRNA lentiviral infection with Cas9 protein electroporation (SLICE) results in effective and specific disruption of target genes.

Figure 7I:
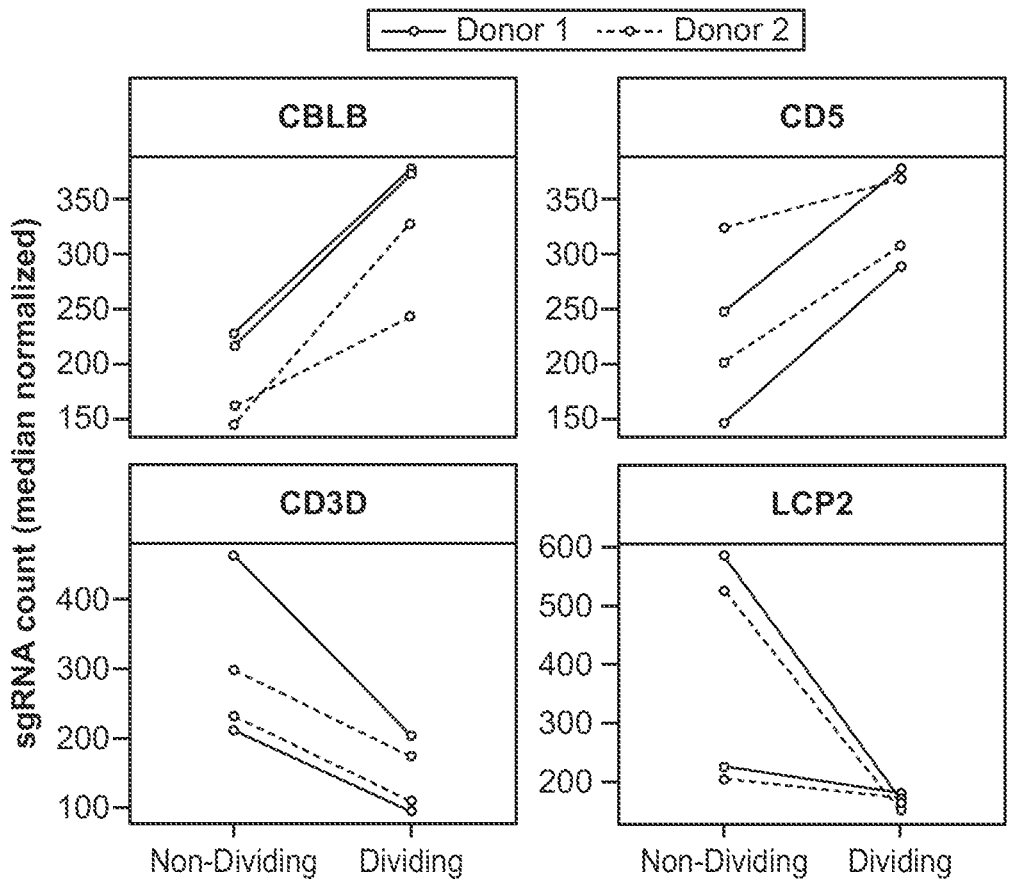
Figure 7J:
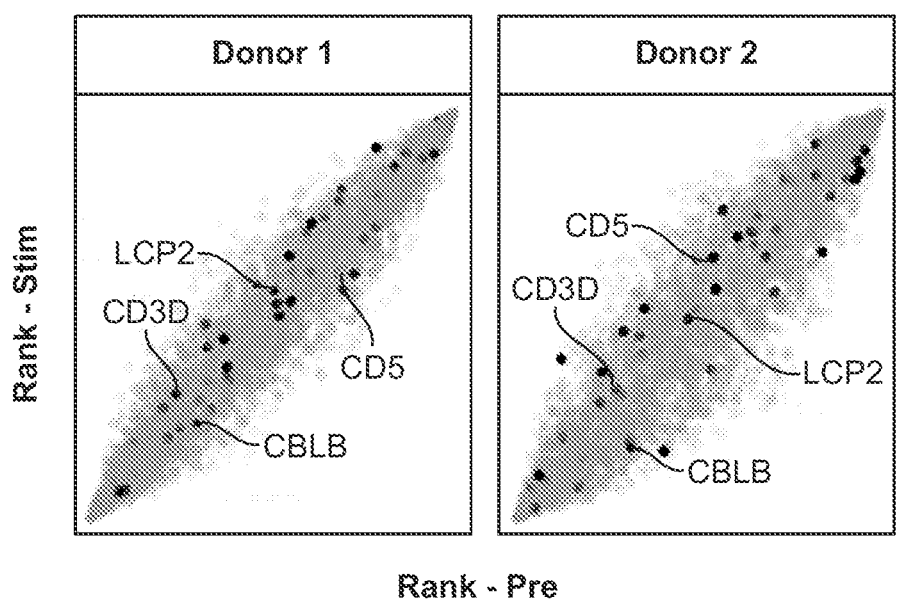

We next tested whether SLICE could be expanded to allow large-scale loss-of-function screens in primary cells with pools of lentivirus-encoded sgRNAs. We performed a screen to identify gene targets that regulate T cell proliferation in response to T cell receptor (TCR) stimulation. For pilot studies we generated a custom library of sgRNA plasmids targeting all annotated cell surface proteins and several canonical members of the TCR signaling pathway (~5000 guides targeting 1211 genes total and 48 non-targeting guides). CD8$^+$ T cells isolated from two healthy human donors were transduced with lentivirus encoding this sgRNA library, electroporated with Cas9, and then maintained in culture (Experimental Procedures). At day 10 post-electroporation, cells were labeled with CFSE to track cell divisions and then TCR stimulated. After four days of stimulation, CFSE levels revealed that the cells had undergone multiple divisions. Cells were sorted by FACS into two populations: (1) non-proliferating cells (CFSE high) and (2) highly-proliferating cells (CFSE low) (FIG. 1A, FIG. 7G and Experimental Procedures). We quantified sgRNA abundance from each population by deep sequencing of amplified sgRNA cassettes. Consistent with well-maintained coverage of sgRNAs across experimental steps, we were able to detect all library guides in the infected CD8+ T cells, with sgRNA abundance distribution being relatively uniform for each donor and across biological replicates (FIG. 7H). To identify sgRNAs that regulated T cell proliferation, we calculated the abundance-based rank difference between the highly dividing cells and non-dividing cells. sgRNAs with strong enrichment in dividing or non-dividing cells pointed to key biologic pathways. We found that sgRNAs targeting essential components of TCR signaling such as CD3D and LCP2, inhibited cell proliferation, as would be expected (de Saint Basile et al., 2004; Shen et al., 2009). We also found that proliferation could be enhanced in human T cells by targeting CD5 or CBLB, which have reported roles in negative regulation of T cell stimulation-response (Azzam et al., 2001; Naramura et al., 2002; Voisinne et al., 2016). sgRNAs targeting these genes were in the top 1% by rank difference in both biological replicates (FIG. 1C). Furthermore, multiple sgRNAs targeting these genes had concordant effects, increasing our confidence that the phenotype was not due to off-target effects (FIG. 7I). Importantly, sorting dividing and non-dividing primary cells based on CFSE provided much stronger enrichment of sgRNA sequences than simple growth-based screens with otherwise identical experimental timelines (FIG. 7J). Screens based on cell doublings have been largely successful using immortalized cell lines that can be cultured for prolonged durations, however this did not translate to screens in primary human T cells (Shalem et al., 2014; Wang et al., 2014). Taken together, these data demonstrate that SLICE pooled CRISPR screens can be used to discover positive and negative regulators of proliferation in primary human T cells.

A Genome-Wide Pooled CRISPR Screen Uncovers Regulators of TCR Response

Figure 8B:
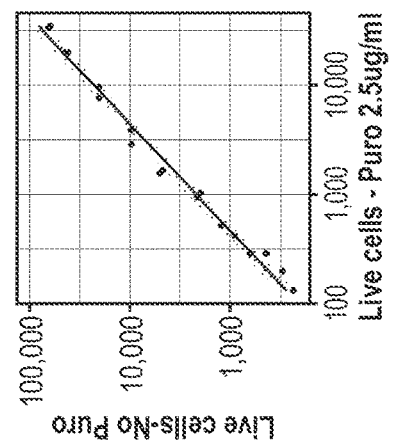
FIG. 8A-F. Genome-wide pooled CRISPR screens in primary T cells, Related to FIG. 2. Section A: Gating strategy for estimating transduction efficiency in the primary GW screen by puromycin titration. Section B: Transduced cells in Section A were cultured for two days with or without puromycin, in various seeding densities. The total number of live cells as in Section A was compared between the two conditions, across seed dilutions. The fitted line is a linear regression, with a slope of 0.51 ($R^2$=0.99), indicating efficient transduction. Section C: Gating and sorting strategy for a representative sample from the GW screen. We sorted the populations as indicated in the CFSE panel, allowing for a clear separation between sort bins. Section D: Comparison of hits discovered in the primary GW screen with two donors (green bars), and the joined data from a replicate screen with two more donors (orange bars). Hits were defined by having FDR<0.25 by MAGeCK RRA algorithm in each direction. Labels at top of bars are the numerical values of the number of hits in each group. Section E: Effect of TCR stimulation titer (x-axis) on the gene-level fold change for three positive and negative regulators of T cell stimulation. Section F: Enrichment of gene-level fold change by GSEA results for KEGG pathways with FDR<0.01. In addition, included is a gene set from a published shRNA for T cell tumor infiltration. Each dot is an annotated gene set (y-axis), x-axis shows the normalized enrichment score (NES), compared to mean of randomized gene sets of the same size. Size of each dot is negatively proportional to the p-value of each enrichment.
Figure 8A:
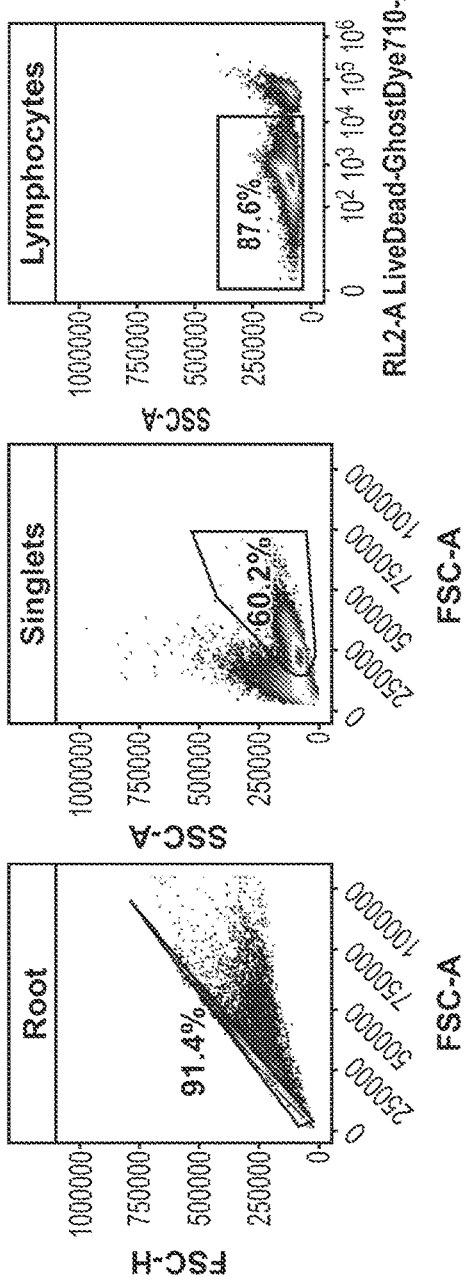
Figure 8D:
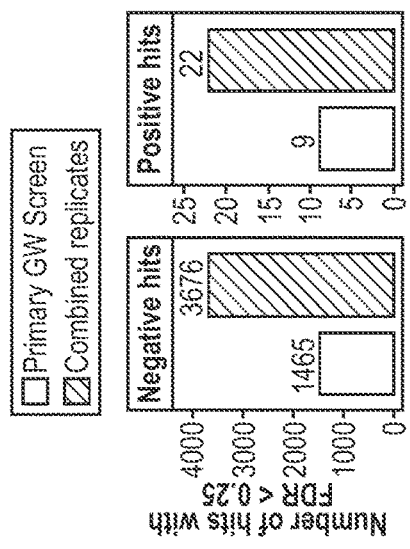
Figure 8C:
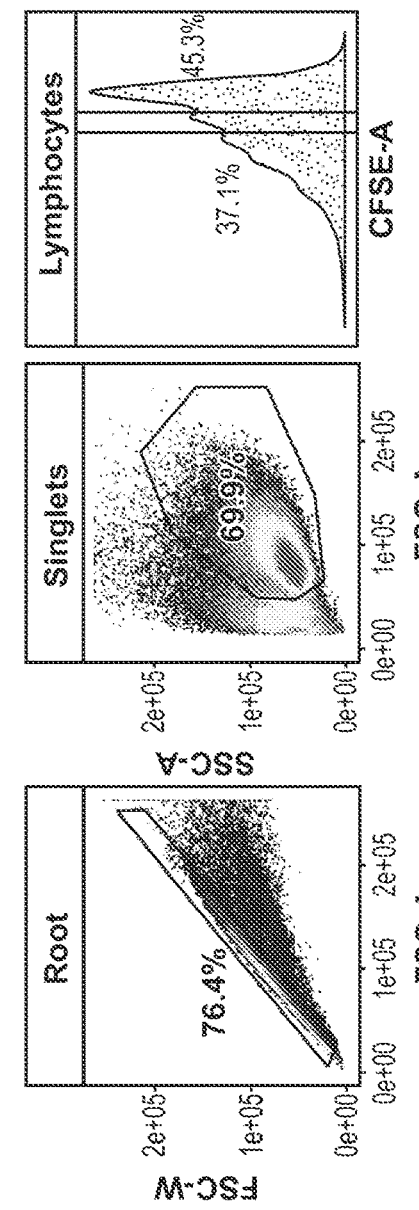
Figures 8E, 8F:
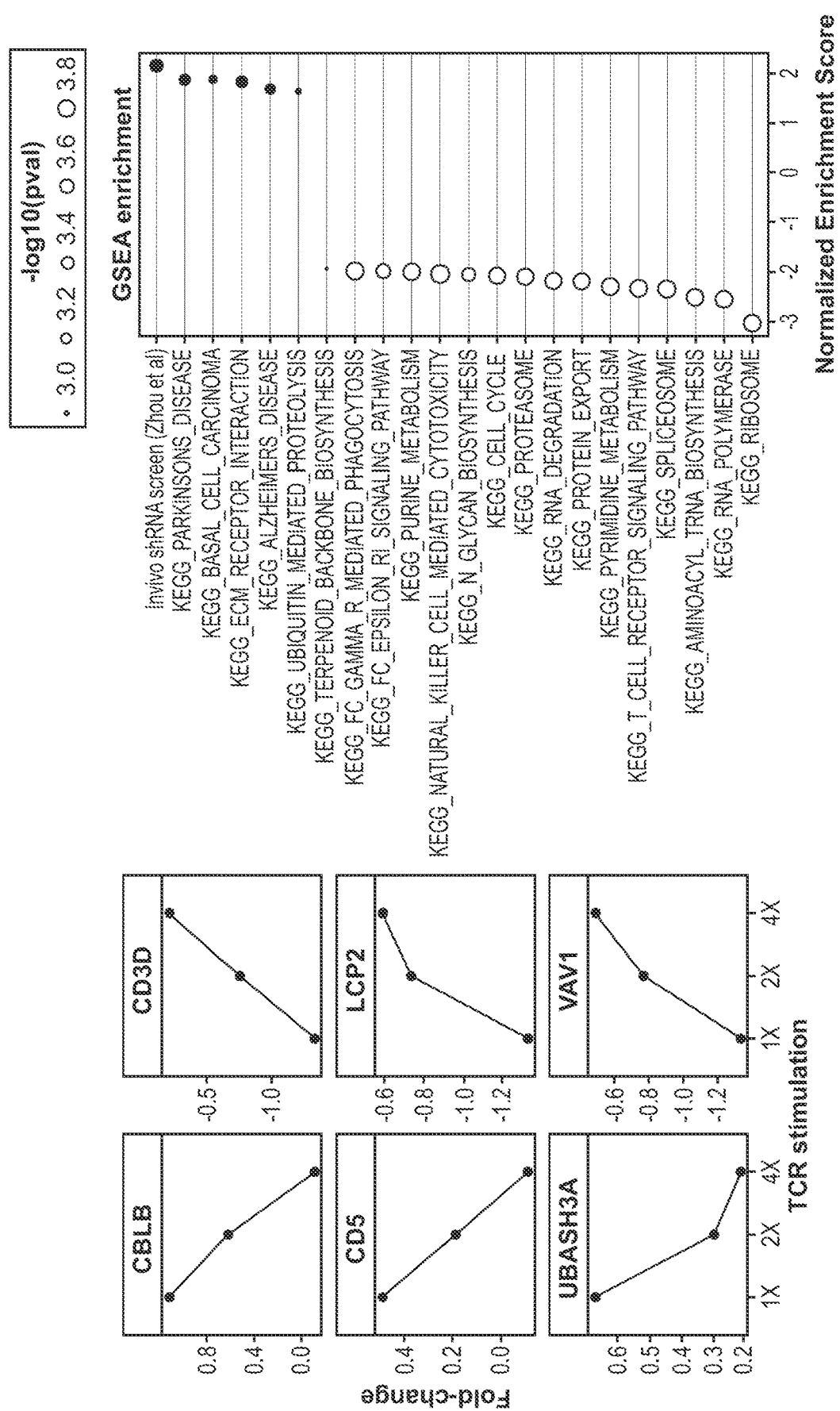

To take full advantage of this platform, we scaled-up from the targeted pilot screen to genome-wide (GW) scale (Doench et al., 2016), transducing a library of 77,441 sgRNAs (19,114 genes) into T cells from two healthy donors. After confirming successful transduction of these primary human T cells (FIG. 8,A-B), the cells were re-stimulated and then FACS sorted into non-proliferating and highly-proliferating populations based on CFSE levels (FIG. 8C and Experimental Procedures). MAGeCK software (Li et al., 2014) was used to systematically identify genes that are positively or negatively selected in the proliferating population of T cells. Top positive and negative regulators from the pilot screen were confirmed in both biological replicates of the GW screen along with numerous other hits (FIG. 2A, B). To hone the list of top candidates, we performed an independent secondary screen in cells from two additional human blood donors. The results were well correlated between the primary and secondary screens (FIG. 2C). Furthermore, integrated analysis of the two independent screens performed on a total of four human blood donors provided improved power for target discovery, particularly for negative regulators of T cell proliferation (FIG. 8D). To confirm that hits are in fact dependent on TCR stimulation, we performed GW screens with increasing levels of TCR stimulation. While similar gene targets appeared as positive and negative regulators across the conditions, the magnitude of the effects were blunted at higher levels of TCR stimulation, suggesting that stronger TCR stimulation can override the effects of these genetic perturbations (FIG. 2D and FIG. 8E). The observed dose-response confirmed that the majority of the screen hits are dependent on the TCR stimulus and serve to tune resulting proliferative responses. Taken together these screens identified dozens of genetic perturbations that positively and negatively modulate T cell proliferation.

Figure 2E:
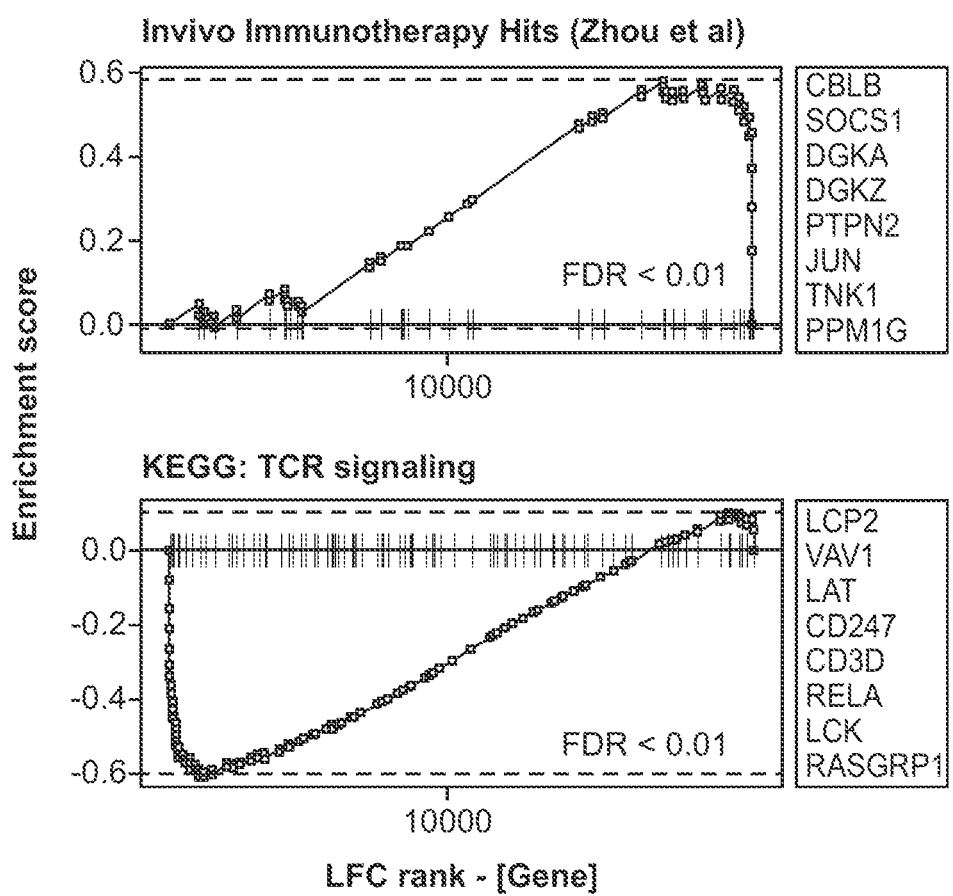

Genes identified in the integrated screen analysis were enriched with annotated pathways associated with TCR stimulation. Gene set enrichment analysis (GSEA) revealed strong over-representation of gene targets depleted from proliferating cells in the TCR signaling pathway (FDR<0.01, FIG. 2E and FIG. 8F). We also found a strong enrichment of genes abundant in dividing cells for hits from a published shRNA screen (Zhou et al., 2014) designed to discover gene targets that boost T cell proliferation in tumor tissue in vivo (FDR<0.01). This is striking, as the studies were done in a different organism with a different gene perturbation platform, yet there was significant enrichment for high ranking positive hits in our screen with the hit list discovered in the in vivo animal model. These global analyses confirmed that our functional screens could identify critical gene targets, now achievable at genome-wide scale directly in primary human cells.

Figure 2F:
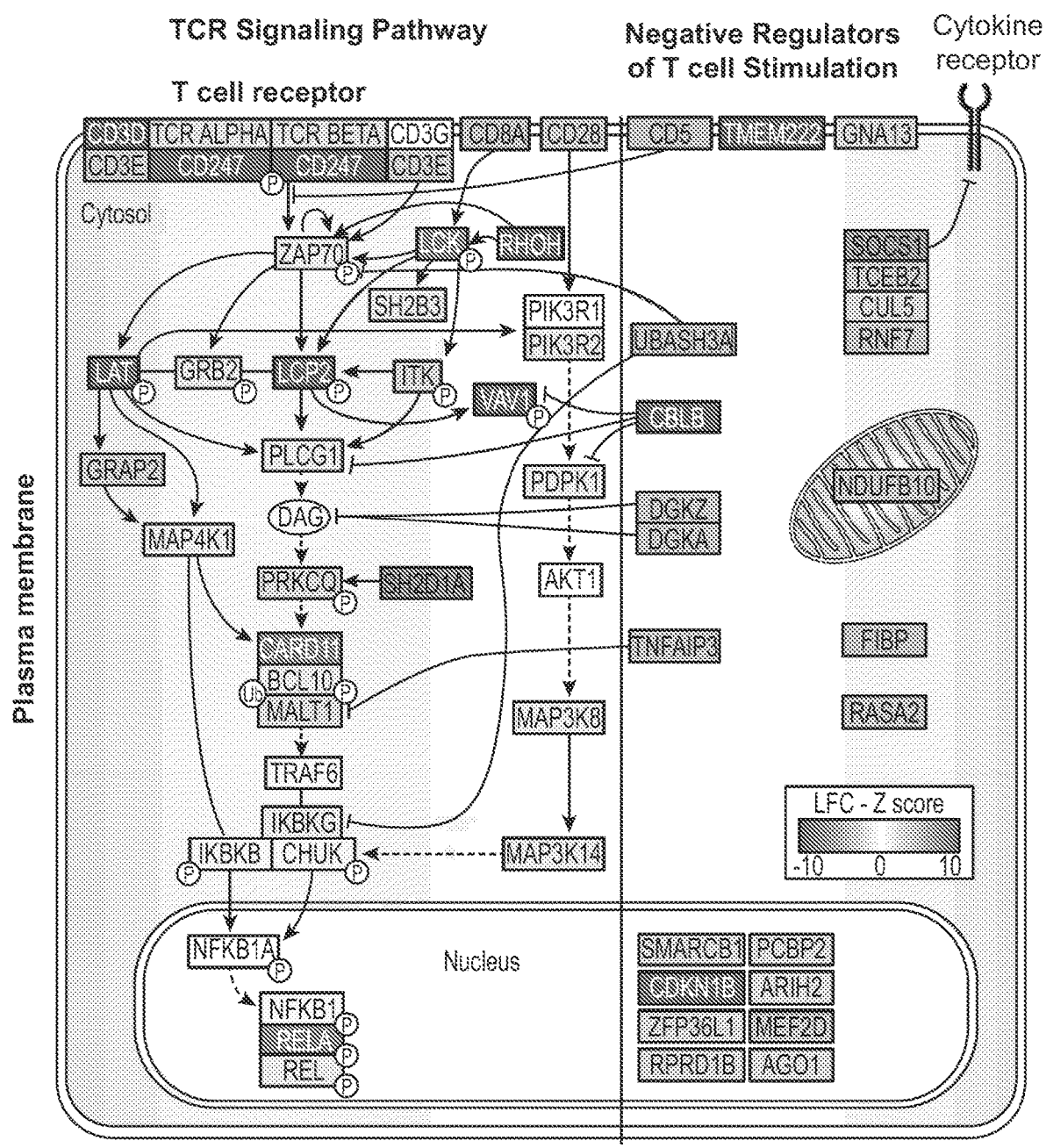

Targets depleted from proliferating cells in this GW screen encode key protein complexes critical for TCR signaling (FIG. 2F). For example, gene targets that impaired TCR dependent proliferation included the delta and zeta chains of the TCR complex itself (negative rank 18 and 6, respectively), LCK, (negative rank 20) which directly phosphorylates and activates the TCR ITAMs and the central signaling mediator ZAP70 (Dave et al., 1998; Tsuchihashi et al., 2000; Wang et al., 2010). LCK and ZAP70 are translocated to the immunological synapse by RhoH (negative rank 2) (Chae et al., 2010). The ZAP70 target, LCP2 (negative rank 4), is an adaptor protein required for TCR-induced activation and mediates integration of TCR and CD28 co-stimulation signaling by activating VAV1 (negative rank 8), which is required for TCR-induced calcium flux and signal transduction (Dennehy et al., 2007; Raab et al., 1997; Tybulewicz, 2005). LAT (negative rank 38) is another ZAP70 target, which upon phosphorylation recruits multiple key adaptor proteins for signaling downstream of TCR engagement (Bartelt and Houtman).

Genes that negatively regulate T cell proliferation have therapeutic potential to boost T cell function. Many of the negative regulators are less well-annotated in the canonical TCR signaling pathway, although functions have been assigned to some. Diacylglycerol (DAG) kinases, DGKA (rank 17) and DGKZ, (rank 1)—negative regulators of DAG-mediated signals—both were found to restrain human T cell proliferation following stimulation (Arranz-Nicolas et al., 2018; Chen et al., 2016; Gharbi et ah, 2011). The E3 ubiquitin-protein ligase, CBLB (rank 4) and its interacting partner, CD5 (rank 12), work together to inhibit TCR activation via ubiquitination leading to degradation of the TCR (Voisinne et ah, 2016). TCEB2 (rank 5) complexes with RNF7 (rank 34), CUL5 (rank 162), and SOCS1 (rank 3), which is a key suppressor of JAK/STAT signaling in activated T cells (Kamura et al., 1998; Liau et ah, 2018). UBASH3A (rank 10), TNFAIP3 and its partner TNIP1 (rank 13 and 24, respectively) inhibit TCR-induced NFkB signaling, a critical survival and growth signal for $CD8^+$ T cells (Düwel et ah, 2009; Ge et ah, 2017). In addition to these key complexes, genes encoding other less well-characterized cell surface receptors (e.g. TMEM222, GNA13), cytosolic signaling components (e.g. RASA2, FIBP), and nuclear factors (e.g. CDKN1B, ARIH2, ZFP36L1) were found to inhibit proliferation (FIG. 2F), revealing a promising resource set of candidate targets to boost the effects of T cell stimulation.

Arrayed Delivery of Cas9 RNPs Reveals that Hits Alter Stimulation Responses

We next confirmed the biological roles of high scoring genes in boosting T cell activation and proliferation with arrayed electroporation of individual Cas9 ribonucleoproteins (RNPs) (Hultquist et ah, 2016; Schumann et ah, 2015). We focused our validation primarily on a set of highly-ranked negative regulators of proliferation due to their therapeutic potential to enhance T cell function when targeted. We further examined to what extent positive hits influenced T cell proliferation following TCR stimulation. Briefly, CD8+ T cells from four human blood donors were stimulated, electroporated with RNPs, rested for 10 days, labelled with CFSE and re-stimulated (FIG. 3A and Experimental Procedures). High-throughput flow cytometry determined proliferation responses in edited and control cells based on CFSE dilution. This validated the ability of many of the tested gene targets to increase T cell proliferation post stimulation, consistent with their robust effect in the pooled screens (FIG. 9A). For example, CBLB and CD5 knockout cells showed a marked increase in number of divisions post stimulation compared to controls, persistent across guide RNAs and blood donors (FIG. 3B). To systematically quantify cell proliferation, we fitted the CFSE distribution using a mathematical model (Roederer, 2011) across our samples (FIG. 9B). This analysis revealed that perturbation of multiple negative regulators of T cell stimulation increased the proliferation index score compared to controls (7 out 10 gene perturbations negative regulators shown here). UBASH3A, CBLB, CD5, and RASA2 knockout T cells all showed greater than 2-fold increase in the proliferation index compared to non-targeting control cells (FIG. 3C). Notably, targeting these genes did not increase proliferation in the unstimulated cells, indicating that they are not general regulators of proliferation but instead appear to modulate proliferation induced by TCR signaling. In contrast, guides against gene targets that were depleted in the proliferating cells in the pooled screens showed a reduction in the proliferation index compared to the non-targeting controls. Thus we demonstrated through an orthogonal gene targeting system that the majority of top genes identified by our screens robustly modulate stimulation-dependent proliferation in human CD8 T cells.

Figure 3D:
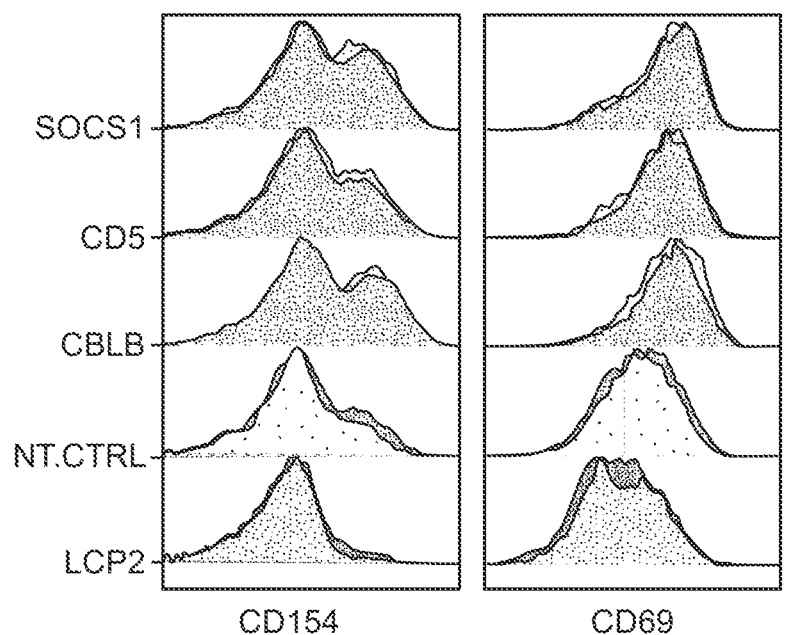
Figure 3E:
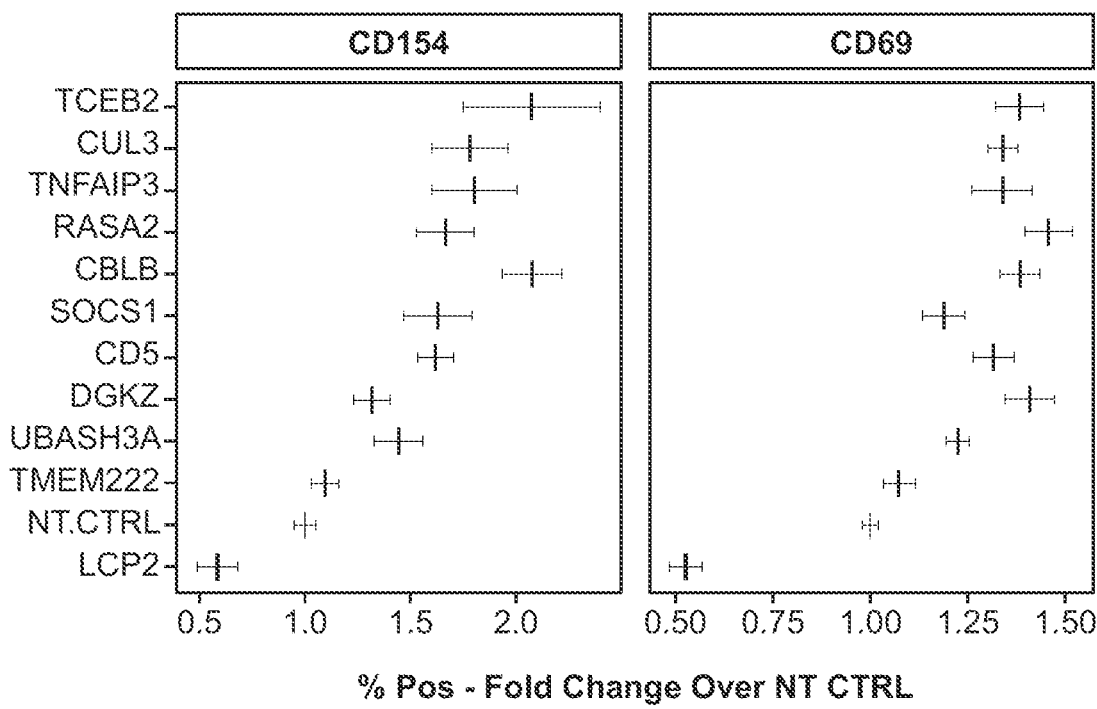

We next examined whether these hits modulate canonical responses to TCR stimulation in addition to cell proliferation. The phenotype of cells edited in an arrayed formatting could be assessed with multiple markers at different time points. We analyzed two different cell surface markers of early CD8+ T cell activation, CD69 and CD154 (Lopez-Cabrera et al., 1993; Shipkova and Wieland, 2012). At day 10 post-electroporation, cells were assessed 6 hours after re-stimulation. We found that T cells engineered to lack negative regulators of proliferation, such as SOCS1, CBLB, CD5, and others, also showed increased surface expression levels of both CD69 and CD154 compared to non-targeting control cells (FIG. 3D and FIG. 8C-D). Conversely, targeting a positive regulator of TCR signaling, LCP2, reduced expression of CD69 and CD154 in stimulated cells. Overall, the percent of cells expressing these activation markers in each condition was higher for positive hits compared to non-targeting control guides, consistent across two sgRNAs per gene, for four donors (FIG. 3E). Arrayed editing and phenotyping thus characterized the effects of genetic perturbations and revealed targets that boost stimulation-dependent proliferation and activation programs.

Figure 10C:
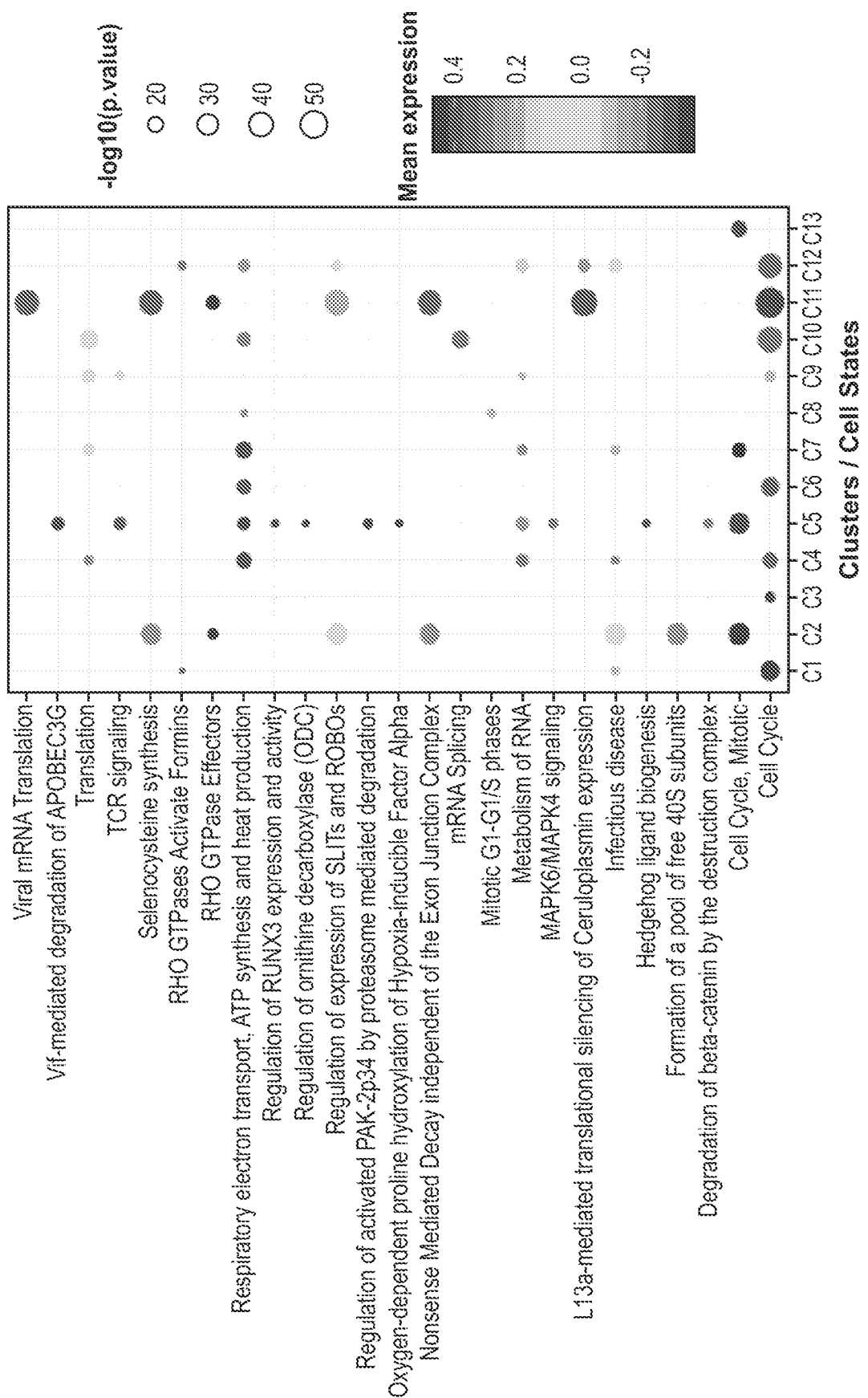

SLICE Paired with Single Cell RNA-Seq for Molecular Phenotyping of Modified Primary Human Cells We then more deeply characterized the stimulation-dependent transcriptional programs altered by ablation of key target genes in human T cells. The recent combination of pooled CRISPR screens with single-cell RNA-seq has enabled high-content analysis of transcriptional changes resulting from genetic perturbations in immortalized cell lines (Adamson et al., 2016; Datlinger et al., 2017; Dixit et al., 2016) or cells from transgenic mice (Jaitin et al., 2016). Here, we coupled SLICE with a droplet-based single-cell transcriptome readout for high-dimensional phenotyping of pooled perturbations in primary human T cells. We chose the CROP-Seq platform, as it offers a barcode-free pooled CRISPR screening with single-cell RNA-Seq using the readily available 10x Genomics platform (Datlinger et al., 2017). We generated a custom library targeting tops hits from our GW screen (2 sgRNAs per gene), known checkpoint genes (PDCD1, TNFRSF9, C10orf54, HAVCR2, LAG3, BTLA), and 8 non-targeting controls, for a total of 48 sgRNAs. Human T cells from two donors were transduced with this library, electroporated with Cas9 protein, and enriched with puromycin selection (Experimental Procedures) (FIG. 10A). Cells were subjected to single-cell transcriptome analysis either with or without re-stimulation to characterize alterations to cell state and stimulation response resulting from each genetic modification.

First, we analyzed the transcriptional states of more than 15,000 resting and stimulated single cells where we could identify a sgRNA barcode. Synthetic bulk gene expression profiles show that stimulated cells up regulated many cell cycle genes, indicating response to TCR stimulus (FIG. 10B). We next visualized the distribution of these single cell transcriptomes in reduced dimensions using Uniform Manifold Approximation and Projection (UMAP) (McInnes and Healy, 2018) (FIG. 4A). While the unstimulated T cells had donor-dependent basal gene expression patterns, stimulated cells from the two donors tended to have a shared transcriptional signature and clustered together. For example, stimulated cells generally induced expression of cell cycle genes (e.g.: MKI67) and cytolytic granzymes (e.g.: GZMB) (FIG. 4B). In contrast, unstimulated cells largely expressed markers of a resting state, such as IL7R and CCR7. TCR stimulation thus had a strong effect in inducing an activated cell state across biological replicates, although more cells appeared to have been stimulated strongly in Donor 1 than in Donor 2. To systematically impute cell states, we clustered single cells based on their shared nearest neighbors by gene expression (FIG. 4C). Stimulated cells were enriched in clusters 9-12, which were characterized by preferential expression of mitotic cell cycle and T cell activation cellular programs (Figure IOC). This analysis of single cell transcriptomes revealed a characteristic landscape of cell states in human T cells before and after re-stimulation.

Figure 10D:
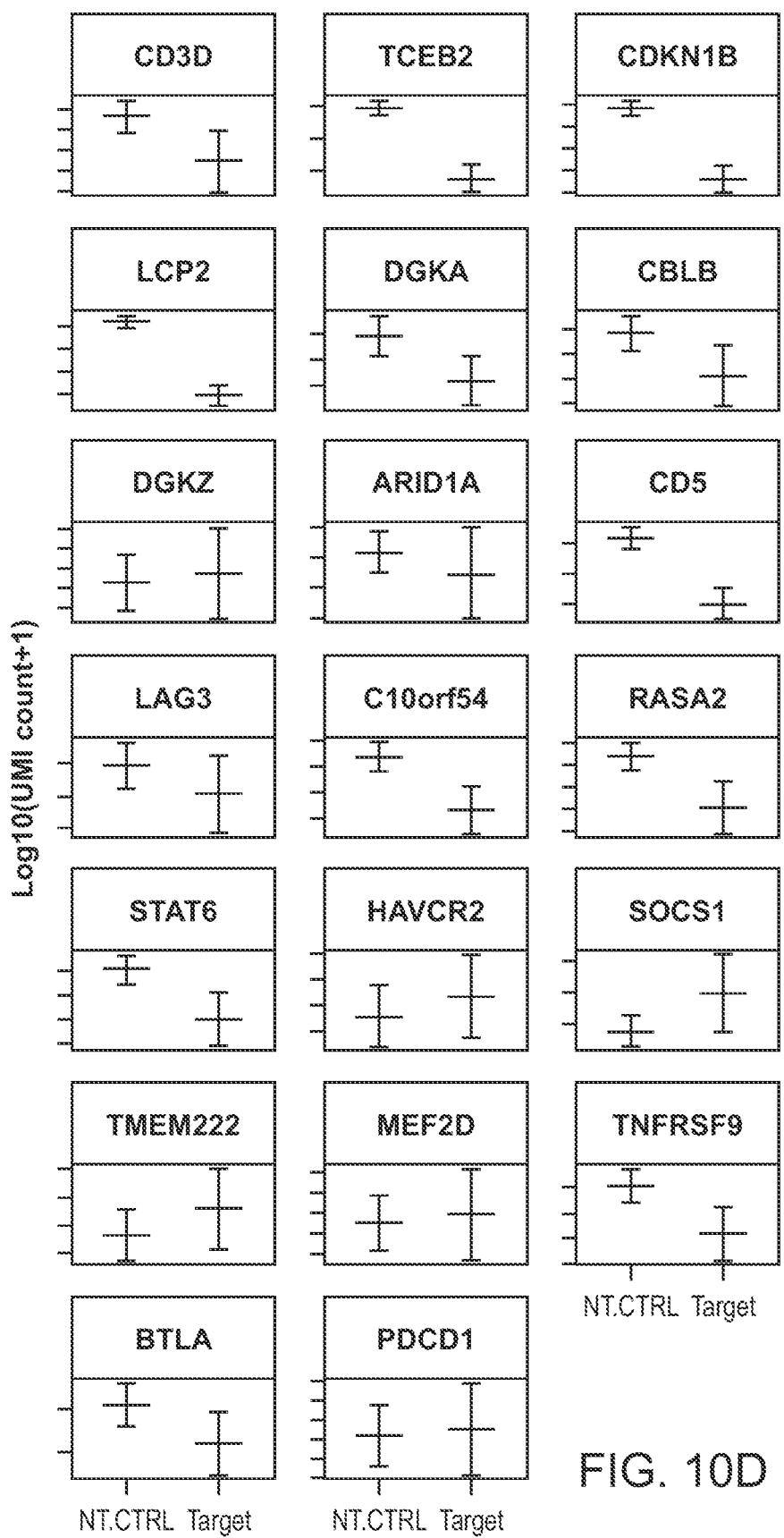
Figure 10E:
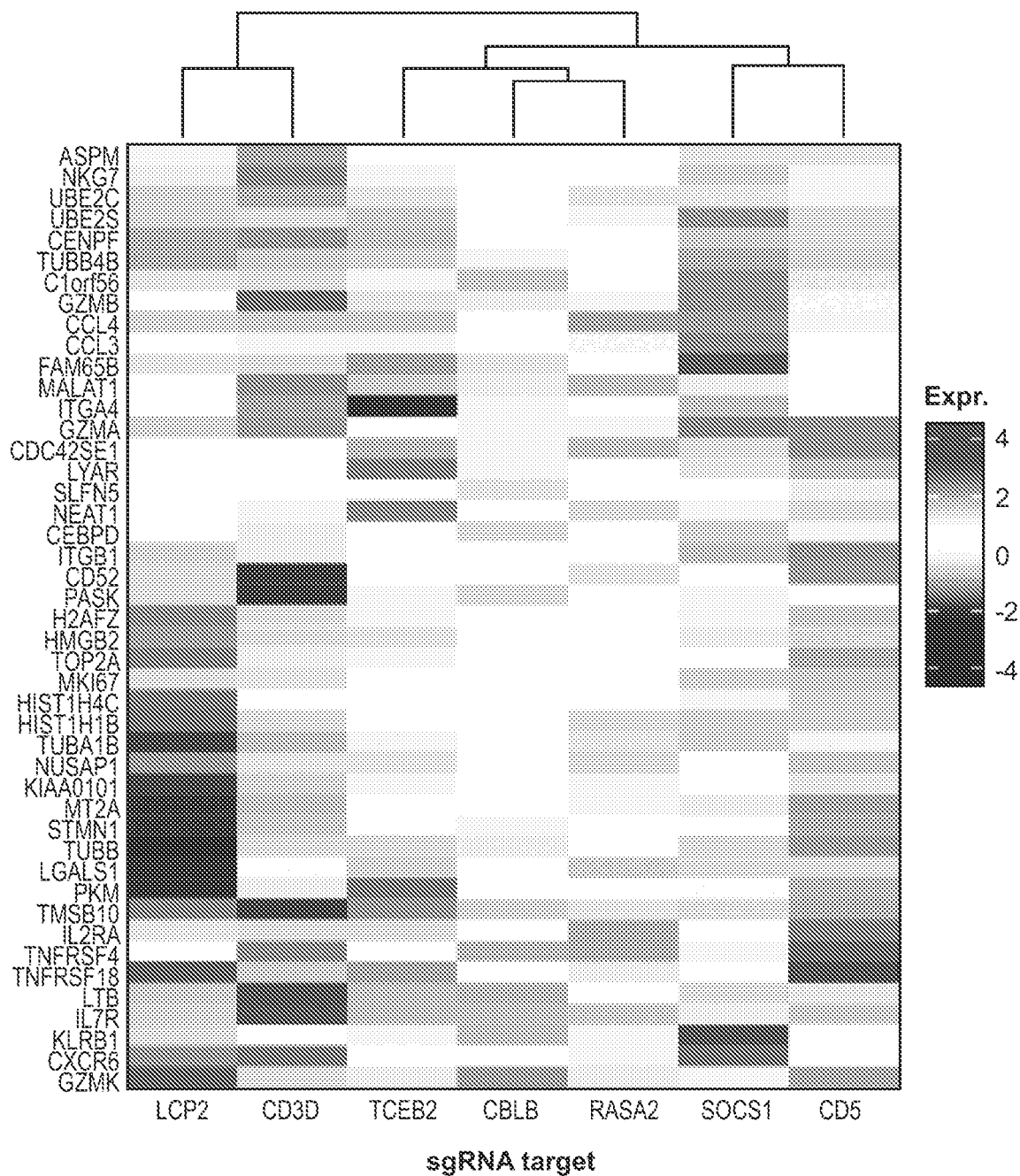

We next assessed the effect of CRISPR-mediated genetic perturbations on cell state. Efficient editing for the majority of gene targets was validated by reduced expression of sgRNA target transcripts compared to levels in cells with non-targeting control sgRNAs (FIG. 10D). We tested whether gene perturbations caused altered genetic programs. Cells with non-targeting control sgRNAs were relatively evenly distributed among clusters. In contrast, cells with CBLB and CD5 sgRNAs were enriched in clusters associated with proliferation and activation, and those with LCP2 sgRNAs were found mostly in clusters characterized by resting profiles (FIG. 4D). We then quantified which sgRNA targets pushed cells towards distinct cell-state clusters based on their transcriptional profiles (FIG. 4E). Targeting multiple negative regulators identified in the GW screen such as CD5, RASA2, SOCS1, and CBLB promoted the cluster 10-12 programs. Perturbation of negative regulators induced markers of activation states (IL2RA, TNFRSF18/GITR), cell cycle genes (MKL67, UBE2S, CENPF and TOP2A), and effector molecules (GZMB, XCL1) (FIG. 4F and FIG. 10E). In contrast, sgRNAs targeting CD3D or LCP2 inhibited the cluster 10 activation program and promoted the clusters 1-2 programs. SLICE paired with single cell RNA-Seq reveals how target gene manipulation shapes stimulation-dependent cell state.

Figure 10F:
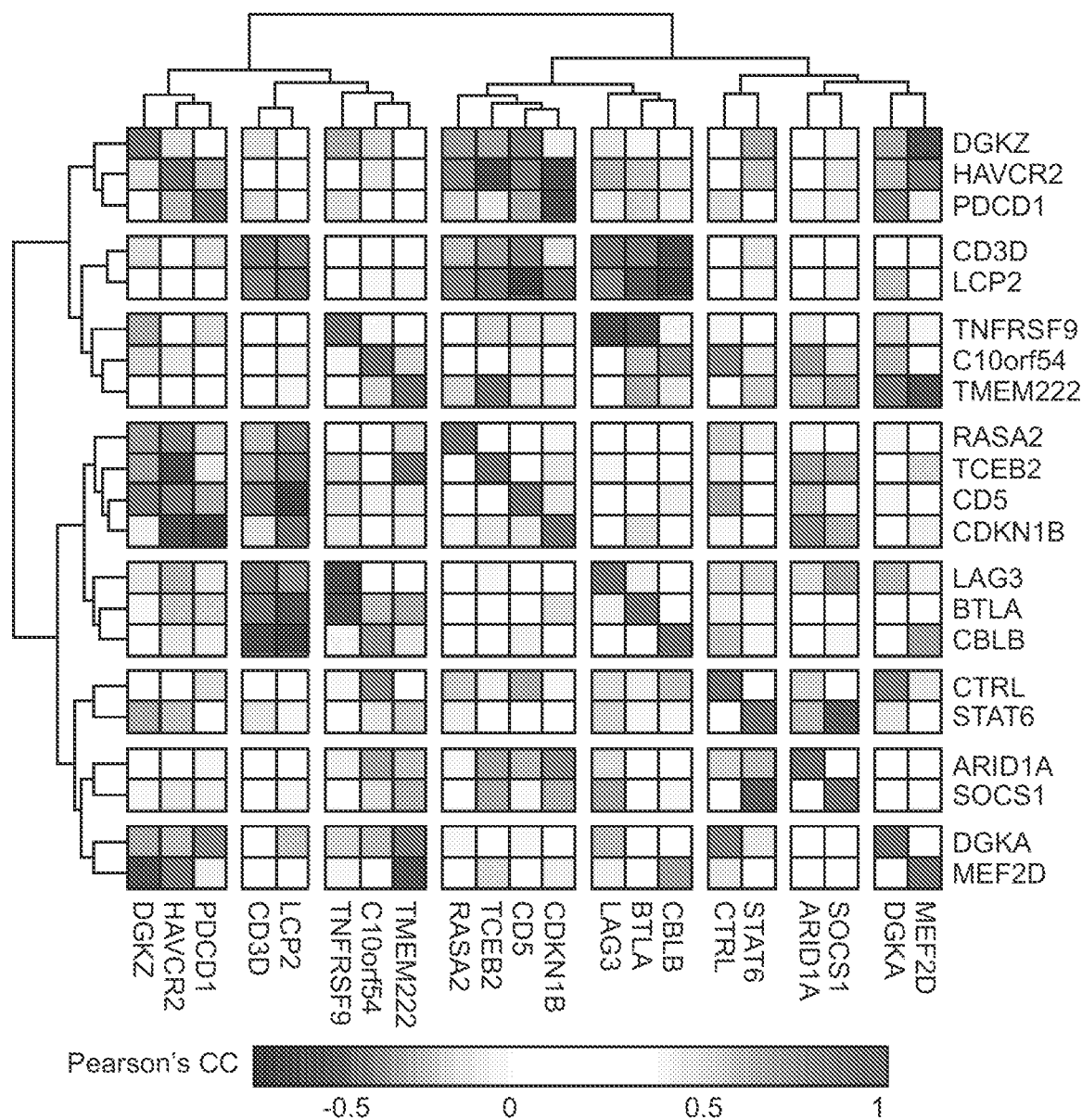

Targeting different negative regulators of proliferation led to distinct transcriptional consequences. Knockout of CBLB tended to induce a cell state signature similar to targeting known checkpoint genes BTLA or LAG3, as evidenced by similarity in cluster representation (FIG. 10F). A different shared activation program was observed as a result of targeting CD5, TCEB2, RASA2 or CDKN1B. The integration of SLICE pooled CRISPR screens and single cell RNA-Seq provides a powerful approach to both discover and characterize critical gene pathways in primary human cells. These data also demonstrate that targeting negative regulators of proliferation can also induce specialized stimulation-dependent effector gene programs that could enhance the potency of T cells.

Screen Hits Boost Tumor Killing In Vitro by Engineered Human T Cells

Figure 11B:
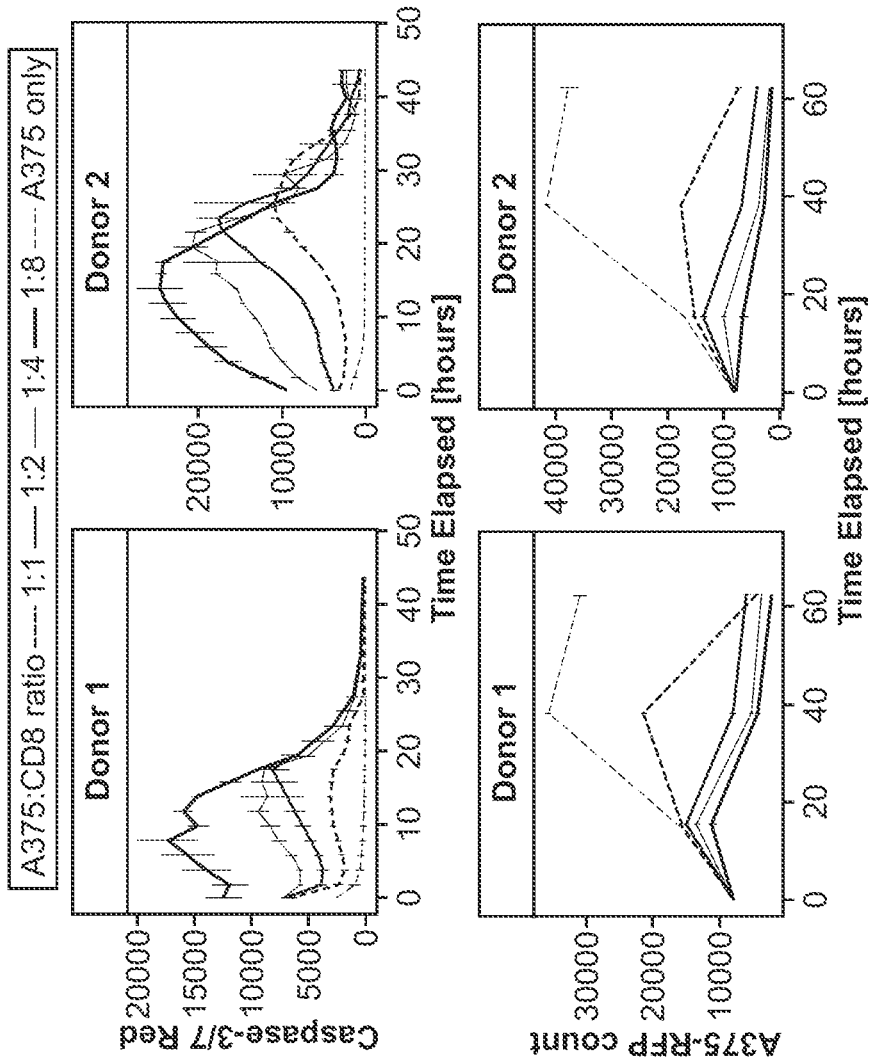
FIG. 11A-D. Tumor killing in vitro by engineered human T cells, Related to FIG. 5. Section A: T cells post transduction with the 1G4 TCR lentivirus show high transduction rates based on staining with HLA-A2+ restricted NY-ESO-1 peptide dextramer-PE. Cells were sorted to obtain a pure population of tetramer-positive, tumor specific CD8$^+$ T cells. Section B: Caspase levels measured on the IncuCyte demonstrate T cell induced apoptosis of target NY-ESO expressing A375 melanoma cells in a titration of increasing T cell to tumor cell ratios (top panels). This tumor cell killing corresponded with the A375 RFP-tagged nuclear counts over time for the same T cell to tumor cell ratios (bottom panels). Section C: A375 clearance for all gene targets assayed. Y-axis shows A375 count by IncuCyte software, normalized by the count in the NT. CTRL wells for each donor, timepoint and gene target. Lines show the mean for each donor (n=4), across two guides and two technical replicates. Error bars are SEM. Section D: Data in (B) quantified at 36 hours for two CD8 to A375 ratios. 1:4 is data summarized in FIG. 5C. Dots represent individual wells in the arrays, two guides and two replicates, for all donors (n=4).
Figure 11A:
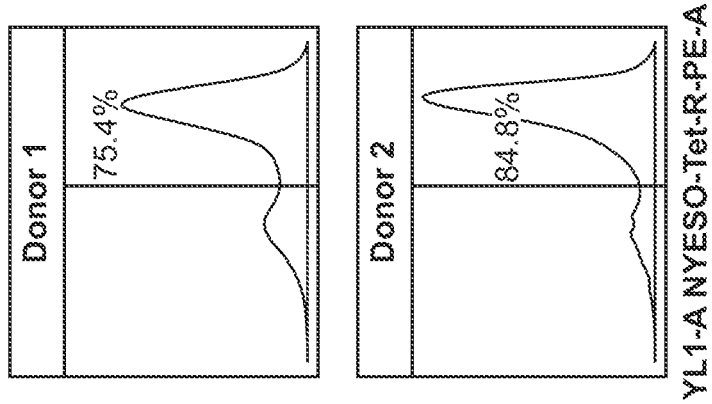

Cells engineered to have an enhanced proliferation response and to boost effector gene programs in response to TCR stimulation could hold promise for cancer immunotherapy. We tested the effects of target gene knockout in an antigen-specific in vitro tumor killing system (FIG. 5A). Specifically, we used an RFP-expressing A375 melanoma cell line, which expresses the tumor antigen NY-ESO, as a target cell (Robbins et al., 2008). Antigen specific T cells were generated by transduction with NY-ESO1-reactive a95:LY TCR (Wargo et al., 2009) (FIG. 11A). These transduced T cells were able to induce caspase-mediated cell death in the target A375 cells, which was exhibited by a rise in the level of caspase and a decline in the level of RFP-tagged A375 nuclei over time (FIG. 11B). NY-ESO TCR+ T cells were generated from four donors using lentiviral transduction and then edited with RNPs in an array of 24 guides, targeting 11 genes, including non-targeting controls (Methods). Antigen-specific T cells with or without gene deletion were then co-cultured with the A375 cells and killing was assessed by quantifying RFP-labeled A375 cells by live time-lapse microscopy over a span of four days.

Figures 11C, 11D:
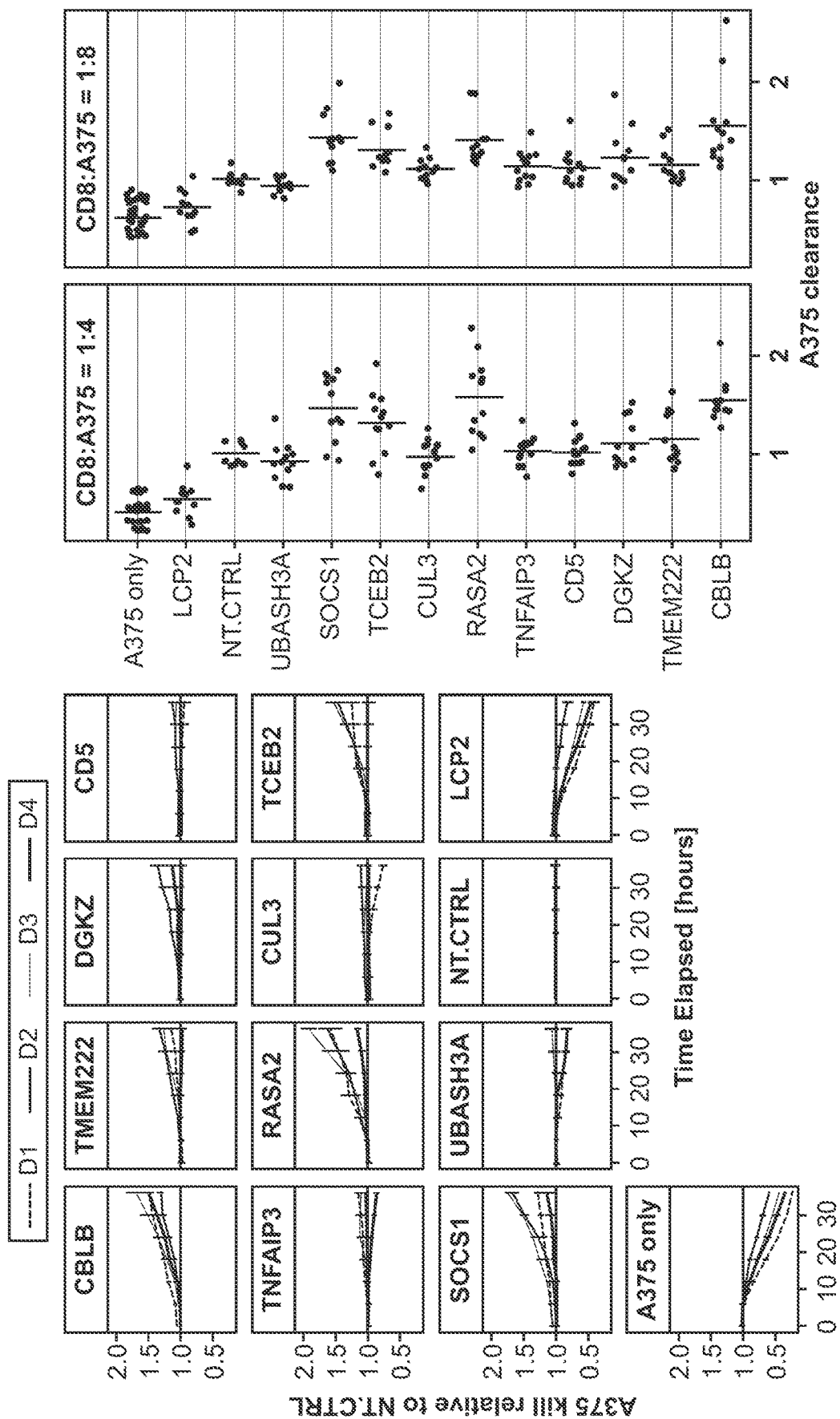
Figure 13B:
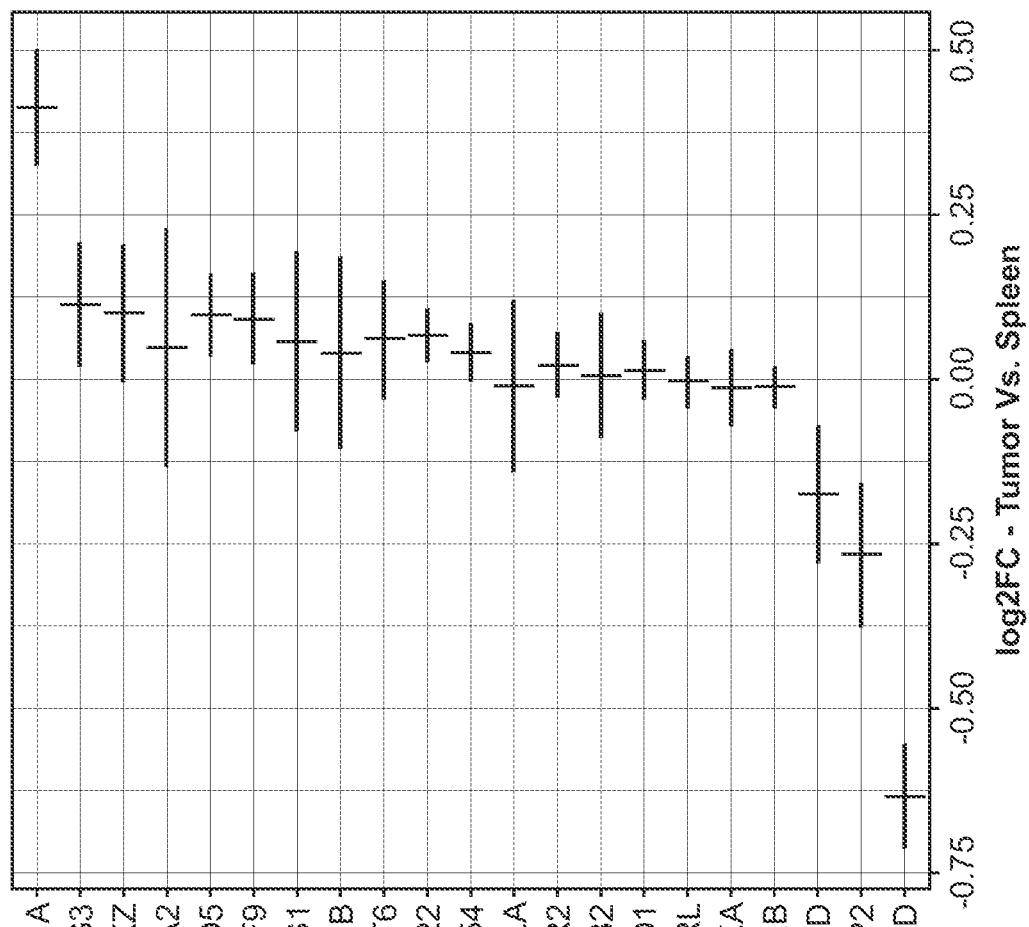
FIG. 13A-B. SLICE for in vivo pooled screens in humanized mouse model for immunotherapy. Section A: Principal competent analysis for guide counts from T cells collected from the spleen (left-most four dots) and tumor (right-most four dots), 7 days post transfer. Each dot is one sample (2 donors across 4 mice). A clear separation is evident for the guides enriched in each tissue. Section B: Log fold changes for in vivo SLICE experiment. Vertical lines are mean, horizontal line are SEM (n=2 per tissue, n=2 guides per gene target).
Figure 13A:
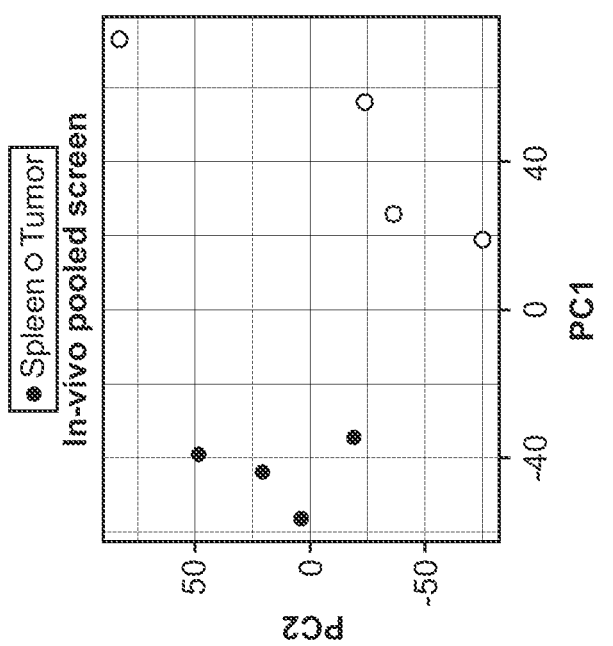

We compared the kinetics of tumor killing between gene-edited and control NY-ESO TCR+ T cells. NY-ESO specific T cells started to cluster around RFP+ tumor cells at 12 hours, with more efficient tumor clearance at 36 hours for certain sgRNA targets compared to non-targeting controls (FIG. 5B). As expected, knockout of LCP2—identified in our screens as essential for strong TCR stimulation response—strongly disabled T cell killing of A375 cells. In contrast, CRISPR-ablation of negative regulators SOCS1, TCEB2, RASA2, and CBLB each significantly increased tumor cell clearance compared to control T cells electroporated with a non-targeting guide RNA (FIG. 5C). Targeted deletion of these four genes led to improved kinetics of tumor clearance in our assay compared to the non-targeting control condition (FIG. 5D and FIG. 11C-D). Among these, CBLB has been best studied as an intracellular immune checkpoint that can be targeted in T cells to improve tumor control in mouse models (Peer et al., 2017). Targeting SOCS1, a negative regulator of the JAK/STAT signaling in T cells, showed enhanced T cell clearance comparable to CBLB (Liau et al., 2018). Ablation of TCEB2, a binding partner of SOCS1, also provided T cells an advantage in tumor clearance, suggesting that the SOCS1/TCEB2 complex restrains T cell responses and is a potential target for immunotherapy (Ilangumaran et al., 2017; Kamizono et al., 2001; Liau et al., 2018). RASA2, a GTPase-activating protein that stimulates the GTPase activity of wild-type RAS (Maertens and Cichowski, 2014), has not been well-studied in the context of primary T cells and the immune system, but our findings suggest it may be a modulator of TCR signaling and anti-tumor immunity. Strikingly, cells with gene ablation of TCEB2, SOCS1, CBLB and RASA2 all activated critical genes including Granzyme B (GZMB) and Interleukin-2 receptor alpha (IL2RA) more strongly than control cells (FIG. 4F). In summary, several gene targets identified in the genome-wide screen for proliferative response to stimulation also potentiated in vitro tumor killing activity.

SLICE Screen for Resistance to Immunosuppressive Adenosine Signaling

Adoptive cell therapies that are effective for the treatment of solid organ tumors will require cells that can respond robustly to tumor antigens even in an immunosuppressive tumor microenvironment. With genome editing, T cells could be rendered resistant to particular immunosuppressive cues, and it will be important to identify the relevant T cell pathways for modification. We reasoned that our SLICE screening platform also could be used to identify gene deletions that allow T cells to escape various forms of suppression. We focused on adenosine, a key immunosuppressive factor in the tumor microenvironment (Allard et al., 2017). We performed a genome-wide proliferation screen by stimulating T cells in the presence of an adenosine receptor 2 (A2A) agonist (CGS-21680) at a suppressive dose of 20 uM (FIG. 12A) versus a vehicle control for four days. We looked for sgRNAs that were enriched in the proliferating cell population (CFSE low) in the A2A treatment condition compared to vehicle (FIG. 12B).

While many gene modifications promoted TCR proliferative responses to stimulation in the presence or absence of the adenosine receptor agonist, we identified several sgRNAs that were only enriched in the dividing cells in the presence of CGS-21680 (FIG. 6A). These gene targets appear to play a selective role in adenosine receptor-mediated T cell suppression. Importantly, ADORA2A—encoding the receptor specifically targeted by CGS-21680—showed a high rank difference between the two treatment conditions (rank 19 in CGS-21680 vs rank 7399 in vehicle control), indicating that its knockout provided a specific escape from CGS-21680 (FIG. 6A and FIG. 12C). In contrast, ADORA2B, did not show any proliferative advantage when exposed to this selective A2A agonist, CGS-21680 (FIG. 6A). These findings encouraged us to investigate other gene targets that show a similar pattern to ADORA2A of selective resistance to CGS-21680. Several guanine nucleotide binding proteins with potential roles in adenosine-responsive signaling had a higher positive rank in the adenosine agonist GW screen, including GCGR (rank 35 vs. 1149), GNG3 (rank 199 vs. 12976), and GNAS (rank 836 vs. 2803). Strikingly, we found multiple guides targeting a previously uncharacterized gene FAM105A (rank 15 in CGS-21680 vs rank 13390 in vehicle control), were specifically enriched nearly to the same extent as ADORA2A (FIG. 6B). Although little is known about FAM105A function, GWAS of allergic diseases implicates a credible missense risk variant in this gene (Ferreira et al., 2017). A neighboring paralogue gene Otulin (FAM105B) encodes a deubiquitinase with essential role in immune regulation (Damgaard et al., 2016) (FIG. 12D). The screen results suggest a critical role for FAM105A in mediating adenosine immunosuppressive signals in T cells.

To validate our findings, we used our arrayed RNP platform to edit ADORA2A and FAM105A with CFSE proliferation readout across two donors. We found that targeting each of these genes with two different sgRNAs each led to resistance to suppression by CGS-21680, as predicted by our screen (FIG. 6C). Importantly, these edits did not lead to increased T cell proliferation in the absence of TCR stimulation, suggesting they selectively overcome CGS-21680 suppression of TCR stimulation. Lastly, we showed that ADORA2A and FAM105A targeted T cells were resistant to suppression by CGS-21680 in the in vitro cancer cell killing assay (FIG. 12E). Thus, we identified both extracellular and intracellular targets that could be modified to generate T cells resistant to adenosine suppression. Overall, these findings demonstrate that SLICE is able to identify both known and novel components of a pathway required for primary cell-response to a specific extracellular cue. This exemplifies the potential for this platform to be used to discover gene targets that can enhance specialized T cell functions.

SLICE In Vivo Pooled Screen to Reveal Regulators of T Cell Tumor Infiltration

Primary human CD8+ T cells from two donors were isolated and stimulated with anti-CD3/CD28 beads. The cells were then transduced with concentrated frozen lentivirus encoding an NY-ESO1-reactive α95:LY TCR as well as with lentivirus containing the CROPseq plasmid library previously described (Experimental Procedures). 48 hours after transduction the cells were electroplated as previously described (Experimental Procedures). 48 hours after electroporation, cells were exposed to 2.5 ug/ml puromycin to select for cells transduced with the CROPseq library (20 gene targets (2 guides per gene) and 8 non-targeting control guides, for a total of 48 guides). Cells were then expanded in Xvivo media with IL-2 at 50 U/mL, at 1e6 cells/ml for a total of 14 days post isolation. 7 days after the T cells were initially isolated, NOD/SCID/IL-2Rγ-null (NSG) male mice (Jackson Laboratory) at 8-12 weeks of age were seeded with tumours by subcutaneous injection into the flank of one million A375 human melanoma cells. At 7 days post tumour seeding, the NY-ESO-specific CROPseq library transduced T cells described above (now day 14) were resuspended at 1 million cells in 100 µl of serum-free RPMI and injected into the mice retro-orbitally in two mice per donor. 7 days after T cell transfer, tumors and spleens were harvested from each of the 4 mice and T cells were isolated by FACS. Genomic DNA was isolated from these cells and PCR amplified and barcoded as previously described (Experimental Procedures). Samples were then sequenced on a HiSeq 4000 (Illumina) and guide frequency was compared between the tumor and the spleen for each mouse and for each donor. In this pilot study using a limited number of mice, we found that guides targeting ARID1A was strongly enriched in the tumor compared to the spleen across for both donors. We further found that guides targeting CD5 also showed a trend of enrichment in the tumor over the spleen. Having demonstrated the technical feasibility of this experiment, we are expanding the size of our library and planning to perform this in vivo pooled screen in 5 mice per donor across 2 donors.

Tables 1-4 list gene targets identified by our SLICE screening platform.

Discussion

SLICE provides a new platform for genome-wide CRISPR loss-of-function screens in primary human T cells, a cell type that has enabled a revolution in cancer immunotherapies. SLICE screens can be performed routinely at large-scale in primary cells from multiple human donors, ensuring biologically reproducible discoveries. Here, we selected for genetic perturbations that enhanced stimulation-responsive T cell proliferation. Proliferation is a broad phenotype regulated by complex genetics. Arrayed editing with Cas9 RNPs allowed us to further characterize the effects of individual perturbations with multiplexed proteomics measured by flow cytometry. Finally, coupling SLICE with single-cell transcriptomics enabled more global assessment of the functional consequences of perturbing hits from the genome wide screen. Integration of these CRISPR-based functional genetic studies rapidly pinpointed genes in human T cells that can be targeted to enhance stimulation-dependent proliferation, activation responses, effector programs and in vitro cancer cell killing.

The potential power of human primary T cell loss-of-function screens was incidentally demonstrated in a patient who received CAR T cell therapy for chronic lymphocytic leukemia (CLL) (Fraietta et al., 2018). Non-targeted integration of lentiviral provirus encoding a CAR construct can disrupt endogenous genes. A lentiviral integration disrupting TET2 in a T cell from the patient showed preferential and near clonal massive expansion at the peak of response and likely contributed to the patient's complete remission. This patient happened to have a pre-existing hypomorphic mutation in the second allele of TET2. SLICE now provides an opportunity to search more systematically for genetic perturbations that enhance cell expansion and effector function for adoptive T cell therapies.

We found that ablation of at least four targets (SOCS1, TCEB2, RASA2, and CBLB) in human T cells enhanced proliferation and anti-cancer function. Of these, CBLB has been studied in mouse models as an intracellular checkpoint that can be targeted to enhance tumor control by CD8 T cells. Our data suggest that RASA2 and the SOCS1/TCEB2 complex members may also be fruitful targets for modulation in adoptive T cell cancer immunotherapies. These studies demonstrate the potential of SLICE as a tool in primary human CD8 T cells to rapidly discover and validate relevant candidate targets for developing novel immunotherapies. Looking forward, SLICE pooled screens could be adapted to select for perturbations that confer even more complex phenotypes on human T cells, including in vivo functions relevant for T cell therapies.

The SLICE pooled screening approach is flexible and versatile as it can be adapted to probe diverse genetic programs regulating of primary T cell biology. Primary T cell screens can be performed with various extracellular selective pressures and/or FACS-based phenotypic selections. We focused on CD8+ T cells, but showed that SLICE also can be employed to CD4+ T cells, and may be generalizable to many other primary cells. We demonstrated that a suppressive pressure can be added to the screen, in our case an adenosine agonist, to identify gene perturbations that confer resistance. Future screens could be designed to overcome additional critical suppressive forces in the tumor microenvironment, such as suppressive cytokines, metabolites, nutrient depletion, or suppressive cell types including regulatory T cells or myeloid-derived suppressor cells. In summary, we have developed a novel pooled CRISPR screening technology with potential for nearly unlimited explorations into uncharted biology of primary human cells.
Experimental Protocl: Methodology Employed in Examples
Isolation and Culture of Human CD8 T Cells Primary human T cells for all experiments were sourced from one of two origins: (1) residuals from leukoreduction chambers after Trima Apheresis (Blood Centers of the Pacific) or (2) fresh whole blood samples under a protocol approved by the UCSF Committee on Human Research (CHR #13-11950). Peripheral blood mononuclear cells (PBMCs) were isolated from samples by Lymphoprep centrifugation (STEMCELL, Cat #07861) using SepMate tubes (STEMCELL, Cat #85460). CD8 T cells were isolated from PBMCs by magnetic negative selection using EasySep Human CD8+ T Cell Isolation Kit (STEMCELL, Cat #17953) and used directly. When frozen cells were used (IncuCyte experiments), previously isolated PBMCs that had been frozen in Bambanker freezing media (Bulldog Bio, Cat #BB01) were thawed, CD8 T cells were isolated using the EasySep isolation kit previously described, and cells were rested in media without stimulation for one day prior to stimulation. Cells were cultured in X-Vivo media, consisting of X-Vivo15 medium (Lonza, Cat #04-418Q) with 5% Fetal Calf Serum, 50 mM 2-mercaptoethanol, and 10 mM N-Acetyl L-Cysteine. After isolation, cells were stimulated either with plate bound anti-human CD3 (Cat #40-0038, clone UCHT1) at 10 µg/mL and CD28 (clone CD28.2) at 5 µg/mL (Tonbo, Cat #40-0289) or with ImmunoCult Human CD3/CD28/CD2 T Cell Activator (STEMCELL, Cat #10970) as well as with IL-2 at 50 U/mL, at 1e6 cells/ml. The plateboud stimulation was utilized for the first T cell stimulation, while the ImmunoCult was used for the second T cell stimulation. Immunocult was used at ⅟16, ⅛, and ½ of the dose recommended by the manufacturer, which is 25 µL/mL of cells.
Lentiviral Production HEK 293T cells were seeded at 18 million cells in 15 cm poly-L-Lysine coated dishes 16 hours prior to transfection and cultured in DMEM+5% FBS+1% pen/strep. Cells were transfected with the sgRNA transfer plasmids and 2nd generation lentiviral packaging plasmids, pMD2.G (Addgene, Cat #12259) and psPAX2 (Addgene, Cat #12260) using the lipofectamine 3000 transfection reagent per the manufacturer's protocol (Cat #L3000001). The following day, media was refreshed with the addition of viral boost reagent at 500× as per the manufacturer's protocol (Alstem Cat #VB100). The viral supernatant was collected 48 hours post transfection and spun down at 300 g for 10 minutes, to remove cell debris. To concentrate the lentiviral particles, Alstem precipitation solution (Alstem Cat #VC100) was added, mixed, and refrigerated at 4° C. for four hours. The virus was then concentrated by centrifugation at 1500 g for 30 minutes, at 4° C. Finally lentiviral pellet was resuspended at 100× of original volume in cold PBS and stored until use at −80° C.

Lentiviral Transduction and Cas9 Electroporation 24 hours post stimulation, lentivirus was added directly to cultured T cells at a 1:300 v/v ratio and gently mixed by tilting. Following 24 hours, cells were collected, pelleted, and resuspended in Lonza electroporation buffer P3 (Lonza, Cat #V4XP-3032) at 20e6 cells/100 µl. Next, Cas9 protein (MacroLab, Berkeley, 40 µM stock) was added to cell suspension at 1:10 v/v ratio. Cells were electroporated at 20e6 cells per cuvette using the pulse code EH115 (Lonza, cat #VVPA-1002). The total number of cells for electroporation was scaled as required. Immediately after electroporation, 1 mL of pre-warmed media was added to each cuvette and cuvettes were placed at 37 degrees for 20 minutes. Cells were then transferred to culture vessels in X-Vivo media containing 50 U/ml IL-2 at 1e6 cells/ml in appropriate tissue culture vessels. Cells were expanded every two days, adding fresh media with IL-2 at 50 U/ml and maintaining the cell density at 1e6 cells/ml.

CFSE Staining

Cultured cells were collected, spun, washed with PBS, and then resuspended at 1-10 million cells/ml in PBS. CFSE (Biolegend, Cat #423801) was prepared per the manufacturer's protocol to make a 5 mM stock solution in DMSO. This stock solution was diluted 1:1000 in PBS for a 5 µM working solution, and then added in a 1:1 v/v ratio to cell suspension. After mixing, cells were incubated for 5 minutes in the dark at room temperature. The stain was then quenched with a volume of media that was at least 5× the stain volume (e.g. 2 ml+10 ml), and incubated for one minute at room temperature in the dark. Cells were then spun down and resuspended in media prior to restimulation.

Screen Pipeline

PBMCs from multiple human healthy human donors were isolated from TRIMA residuals (see methods). TRIMA residuals were purchased from Blood Centers of the Pacific. After CD8 T cells isolation as above (Day 0), cells were rested in X-Vivo media overnight and then stimulated with plate-bound anti-human CD3/CD28 and IL-2 at 50 U/mL the following day (Day 1). 24 hours after stimulation (Day 2), cells were transduced with concentrated lentivirus encoding the pooled sgRNA library (see methods). 48 hours after transduction (Day 3), cells were electroporated with CAS9 protein (methods). Cells were then cultured in media with IL-2 at 50 U/mL and expanded, keeping a goal density of 1e6 cells/ml of culture media. On day 14, cells were CFSE stained (see methods), split into the relevant arms of the screen, and then restimulated with immunocult (methods), four days later cells were FACS sorted based on CFSE level. Specifically, we defined the non-proliferating cells as those with the highest CFSE peak, and highly proliferative cells as in the 3rd highest CFSE peak and lower. Genomic DNA was isolated from sorted cell pellets, and then prepared for next generation sequencing. Barcoded amplified PCR product was sequenced on the HiSeq 4000. Data was analyzed using MAGeCK software pipeline.

Arrayed Cas9 Ribonucleotide Protein (RNP) Preparation and Electroporation

Lyophilized crRNAs and tracrRNAs (Dharmacon) were resuspended in 10 mM Tris-HCL (7.4 pH) with 150 mM KCl at a stock concentration of 160 µM and stored in −80° C. until use. To prepare Cas9-RNP, crRNAs and tracrRNAs were first thawed, mixed at a 1:1 v/v ratio and incubated at 37° C. for 30 minutes to complex gRNA. Cas9 protein (Stock 40 µM) was added at a 1:1 v/v ratio and incubated at 37° C. for 15 min. Assembled RNP were dispensed into a 96W V-bottom plate at 3 µL per well. Cells were spun down, resuspended in Lonza P3 buffer at 1e6 cells per 20 µL, and added to V-bottom plate with RNP. The cells and RNP mixture was transferred to 96 well electroporation cuvette plate (Lonza, cat #VVPA-1002) for nucleofection using the pulse code EH115. Immediately after electroporation, 80 uL of pre-warmed media was added to each well and incubated at 37° C. for 20 minutes. Cells were then transferred to culture vessels with 50 U/ml IL-2 at 1e6 cells/ml in appropriate tissue culture vessels.

Arrayed CFSE Staining

For CFSE staining of arrayed cells that were edited with RNPs, cells were collected from multiple replicate plates and combined into a deep well 96-well plate. Cells were spun down in the deep-well plate and after decanting the media, resuspended in 1 mL of PBS per well using a manual multichannel pipette. CFSE was prepared to make a 5 uM working solution in PBS per the manufacturer's protocol as described above. Next 1 mL of the 5 µM CFSE was then added in a 1:1 v/v ratio to each well of cells using the multichannel pipette. After mixing, cells were incubated for 5 minutes in the dark at room temperature. The stain was then quenched with 2 mLs of X-Vivo media using the multichannel pipette, and incubated for one minute at room temperature in the dark. Cells were then spun down in the deep-well plate, CFSE was decanted, and then cells were resuspended in X-Vivo media prior to restimulation.

Pooled sgRNA Library Construction

For the cloning of the cell surface sublibrary, we followed the custom sgRNA library cloning protocol as described by Joung et al. (Joung et al., 2016). We utilized the pgRNA-humanized backbone (Addgene, plasmid #44248). To optimize this plasmid for cloning the library, we first replaced the sgRNA with a 1.9 kb stuffer derived from the lentiGuide-Puro plasmid (Addgene, plasmid #52963). This stuffer was excised using BfuAI restriction enzyme and the backbone was gel purified. We selected a cell surface library including 1211 gene targets (4 guides per gene) with 5000 guides total including non-targeting controls. Guides were derived from the Brunello sgRNA library, and the pooled oligo library was ordered from Twist Bioscience. Oligos were PCR amplified and cloned into the pgRNA-humanized backbone by Gibson assembly as described by Joung et al. (Joung et al., 2016) For the genome-wide screens, the Brunello plasmid library in the lentiGuide-Puro backbone (Addgene, cat. 73178) was purchased from Addgene. The library was amplified using Endura ElectroCompetent Cells following the manufacturer's protocol (Endura, Cat #60242-1].

Preparation of gDNA for Next-Generation Sequencing

After cell sorting and collection, genomic DNA was isolated from cell pellets using a genomic DNA isolation kit (Machery-Nagel, Cat #740954.20). Amplification and barcoding of sgRNAs for the cell surface sublibrary was performed as described by Gilbert et al (Gilbert et al., 2014). For the genome-wide screen, after gDNA isolation, sgRNAs were amplified and barcoded using a two-step PCR protocol. Each sample was first divided into multiple 100 uL reactions with 4 µg of gDNA per reaction. Each reaction consisted of 50 uL of NEBNext 2× High Fidelity PCR Master Mix (NEB, cat #M0541L), 4 µg of gDNA, 2.5 µL each of the 10 µM read1-stagger-u6 and tracer-read2 primers, and water to 100 µL total. The PCR cycling conditions were: 3 minutes at 98° C., followed by 10 seconds at 98° C., 10 seconds at 62° C., 25 seconds at 72° C., for 20 cycles; and a final 2 minute extension at 72° C. After the PCR, all reactions were pooled for each sample and then purified using Agencourt AMPure XP SPRI beads (Beckman Coulter, cat #A63880) per the manufacturer's protocol. Next 5 µL was taken from each purified PCR product to go into a second PCR for indexing. Each reaction included 5 µL of PCR product, 25 µL of NEBNext 2× Master Mix (NEB, cat #M0541L), 1.25 µL each of the 10 µM p5-i5-read1 and read2-i7-p7 indexing primers, and water to 50 µL total per reaction. The PCR cycling conditions for the indexing PCR were: 3 minutes at 98° C., followed by 10 seconds at 98° C., 10 seconds at 62° C., 25 seconds at 72° C., for 10 cycles; and a final 2 minute extension at 72° C. Post PCR the samples were SPRI purified, quantified using the Qubit ssDNA high sensitivity assay kit (Thermo Fisher Scientific, cat #Q32854), and then analyzed on the 2100 Bioanalyzer Instrument. Samples were then sequenced on a HiSeq 4000 (Illumina).

A375 and T Cell In Vitro Co-Culture Assay

A375 melanoma cells were transduced with lentivirus to establish an RFP-nuclear tag (IncuCyte, Cat #4478) for optimal imaging on the IncuCyte live cell imaging system. One day after stimulation, CD8 T cells from healthy donors were transduced with virus containing the NY-ESO1-reactive α95:LY TCR construct. Five days after transduction, cells were FACS sorted for a pure population of cells expressing the construct using the HLA-A2+ restricted NY-ESO-1 peptide (SLLMWITQC (SEQ ID NO: 1)) dextramer-PE (Immundex, cat #WB2696). Cells were then expanded in X-Vivo media containing IL-2 at 50 U/ml for a total of 14 days after initial stimulation. On the day prior to co-culture, A375 cells were seeded at 5,000 cells per well in a 96W plate in 100 µL of complete RPMI media. Complete RPMI media includes RPMI (Gibco, cat #11875093), 10% Fetal Calf Serum, 1% L-glutamin, 1% NEAA, 1% HEPES, 1% pen/strep, 50 mM 2-mercaptoethanol, and 10 mM N-Acetyl L-Cysteine. The next day, 14 day-old NY-ESO-1 specific T cells were added to each well on top of the 5,000 A375 cells at indicated T cell to cancer cell ratios, 1:2, 1:4, and 1:8. T cells were added in 50 µL of complete RPMI with IL-2 at 150 U/ml and glucose at 6 g/dL. Plates were then imaged using the IncuCyte live cell imaging system, where number of A375 RFP-positive nuclei were counted over time. For initial optimization of this system, A375 cells were seeded at 24 thousand cells per well and T cells from two donors transduced with the NY-ESO specific TCR were added at the following T cell to tumor cell ratios (8:1, 4:1, 2:1, 1:1). The IncuCyte Caspase-3/7 red apoptosis reagent (IncuCyte, Cat #4704) was added to each well per the manufacturer's instructions, and then imaged every 4 hours on the IncuCyte live cell imaging system. In parallel, A375 cells with the RFP-nuclear tag were seeded at 4,000 cells per well, and the same T cells from two donors transduced with the NY-ESO specific TCR were added at the same ratios as from the above caspase experiment, and these were imaged in parallel.

CROPseq Library Production

The backbone plasmid used to clone the CROPseq library was CROPseq-Guide-Puro, purchased on Addgene (Addgene. Plasmid #86708). This library consisted of 20 gene targets (2 guides per gene selected from the Brunello library (Doench et al., 2016)) and 8 non-targeting control guides, for a total of 48 guides. Oligos for these library guides were purchased from Integrated DNA Technologies (IDT) and cloned into the CROPseq-Guide-Puro plasmid backbone using the methods described by Datlinger et al for amplification-free cloning of pooled gRNA libraries into the CROPseq-Guide-Puro plasmid. Lentivirus was produced from this pooled plasmid library and used to transduce CD8 T cells from two healthy donors, as previously described. 48 hours after transduction, cells were treated with 1 uM puromycin for three days, and subsequently sorted for live cells using Ghost Dye 710 (Tonbo Biosciences, cat #13-0871). Cells were then collected, counted, and loaded into the 10× Chromium single cell sequencing system with v2 chemistry.

CROPseq Guide Reamplification

For the guide reamplification, samples were amplified and barcoded using a two-step PCR protocol. First, each sample was divided into 8 PCR reactions with .1ng template of cDNA each. Each 25 uL reaction consisted of 1.25 uL P5 forward primer 1.25 uL Nextera Read 2 reverse primer, priming to the U6 promoter to enrich for guides, 12.5 uL NEBNext Ultra II Q5 Master Mix (NEB, cat #M0544L), .1ng template and water to 25 uL. The PCR cycling conditions were: 3 minutes at 98° C., followed by 10 seconds at 98° C., 10 seconds at 62° C., 25 seconds at 72° C., for 10 cycles, and a final 2 minute extension at 72° C. After the PCR, all reactions were pooled for each sample and purified using Agencourt AMPure XP SPRI beads per the manufacturer's protocol. Next, 1 uL was taken from each purified PCR product to go into a second PCR for indexing. Each reaction included 1 uL of PCR product, 12.5 uL NEBNext Ultra II Q5 Master Mix (NEB, cat #M0544L), 1.25 uL P5 forward primer, 1.25 uL Illumina i7 primer, and water to 25 uL. The PCR cycling conditions were: 3 minutes at 98° C., followed by 10 seconds at 98° C., 10 seconds at 62° C., 25 seconds at 72° C., for 10 cycles, and a final 2 minute extension at 72° C. After the PCR, all reactions were SPRI purified and quantified using the Qubit dsDNA high sensitivity assay kit (Thermo Fisher Scientific, cat #Q32854) and run on a gel to confirm size. Samples were then sequenced on a MiniSeq (Illumina).

Flow Cytometry for the Arrayed Validation

All array-based validation studies were processed in 96-well round-bottom plates and read on an Attune NxT Flow Cytometer with a 96-well plate reader. For the RNP-based proliferation validation assays for top targets from the genome-wide screen, cells were stained with CFSE in the 96-well format prior to restimulation as described in methods above. For the evaluation of activation marker levels on arrayed RNP-edited cells, the following antibodies were used: CD69 (Biolegend, cat #310904), CD154 (Biolegend, cat #310806), PD-1 (Biolegend, cat #329908), TIM-3 (Biolegend, cat #345005), LAG-3 (Biolegend, cat #369308), and CD8a (Biolegend, cat #301038).

Quantification and Statistical Analysis

Analysis of Pooled CRISPR Screens

To identify negative and positive hits in our screens, we used the MAGeCK software to quantify and test for guide enrichment (Li et al., 2014). Abundance of guides was first determined by using the MAGeCK "count" module for the raw fastq files. For genome-wide Brunello libraries, the 5' trim length was set to remove the staggered offset introduced by the library preparation, by using the parameter: "-trim-5 23,24,25,26,28,29,30". For targeted libraries the constant 5' trim was automatically detected by MAGeCK. We removed guides with an absolute count under 50 in more than 80% of the samples. To test for robust guide and gene-level enrichment, the MAGeCK "test" module was used with default parameters. This step includes median ratio normalization to account for varying read depths. We used the non-targeting control guides to estimate the size factor for normalization and mean-variance model for null distribution used to find significant guide enrichment. All donor replicates in each screen were grouped for analysis to account for biological noise. MAGeCK produced guide-level enrichment scores for each direction (i.e. positive and negative) which were then used for alpha-robust rank aggregation to obtain a gene-level score. The p-value for each gene is determined by a permutation test, randomizing guide assignments and adjusted for false discovery rates by the Benjamini-Hochberg method. Log2 fold change (LFC) is also calculated for each gene, defined throughout as the median LFC for all guides per gene target. Where indicated, LFC was normalized to have a mean of 0 and standard deviation of 1 to obtain the LFC Z-score.

Gene Set Enrichment Analysis for Screen Hits

To find enriched annotations within screen hits, we used Gene Set Enrichment Analysis, as implemented in the fgsea R package. The input for enrichment consisted of the LFC values for all genes tested in the screen. We used the KEGG pathways dataset as the reference gene annotation database, including only gene sets with more than 15 members and less than 500 members. For the external gene set for in vivo immunotherapy hits shown in FIG. 2E, we used the 43 genes as determined by Zhou et al, having 3 or more shRNA guides with over 4-fold enrichment. Normalized enrichment scores and p-values were determined by a permutation test with 10,000 iterations with same size randomized gene sets and adjusted with the FDR method.

Fitting CFSE Distributions for Arrayed Validation Screens

We used the FlowFit R package to extract quantitative parameters from the CFSE profiles across all samples. As CFSE staining for arrays was done for individual populations of edited cells, the signal peak for the parental population might shift slightly from well to well. To account for this, for each well the stimulated well was compared to an identical unstimulated well, expected to have a single peak at the end of the assay. The FlowFit package implements the Levenberg-Marquardt algorithm to estimate the size and position of the parental population peak. We then used the fitted parameters from the unstimulated wells to fit the CFSE profiles of the corresponding stimulated cells. These CFSE profiles are modeled as Gaussian distributions, with log2 distanced peaks resulting from cell division and CFSE dilution. The fitted models were inspected visually, adjusting fitting parameters to minimize deviance from the original CFSE signal. The fitted models were used to calculate the proliferation index, defined as the total count of cells at the end of the experiment divided by the calculated original starting number of parent cells. This parameter is robust to variation in the starting CFSE staining intensities.

Analysis of SLICE Paired with Single-Cell RNA-Seq

Pre-processing of the Illumina sequencing results from 10× Genomics V2 libraries was performed with CellRanger software, version 2.1. This pipeline produces sparse numerical matrices for each sample, with gene-level counts of unique molecular identifier (UMI) identified for all single cells passing default quality control metrics. These gene expression matrices were processed with Seurat R package, as described elsewhere (https://satijalab.org/seurat/pbmc3k_tutorial.html). Only cells with more than 500 genes identified were used for downstream analysis. Using Seurat, counts were log normalized, regressing out total UMI counts per cell and percent of mitochondrial genes detected per cell, and scaled to obtain gene level z-scores. We then applied principal component analysis (PCA), using the 1,000 most variable genes across cells. The first 30 PCA components were used to construct a uniform manifold approximation and projection (UMAP) to visualize single cells in a two dimensional plot, as in FIG. 4A. Gene expression for single cells as displayed in FIG. 4B was calculated as log10 (UMI count+1) and scaled. Clustering in FIG. 4C, was performed by the Louvain algorithm on the shared nearest neighbor graph, as implemented by FindClusters command from the Seurat R package. For synthetic bulk differential gene expression in Figure S4B, UMI counts per gene were summed for all cells with non-targeting control guides in each sample, and DESeq2 R package was used to determine differentially expressed genes.

To associate guides with identified cell barcodes, we processed both fastq files from the 10× libraries and from the re-amplification PCR. The read2 files were matched to the guide library using matchPattem as implemented in the R ShortRead package. The pattern used was the sequence of the U6 promoter preceding the guide sequence appended to the 20 bp library guide sequences (e.g. TGGAAAGGACGAAACACCGNNNNNNNNNNNNNNNN-NNNNNN, where N denotes the guide sequence (SEQ ID NO: 2)), allowing for 4 mismatches total. The mate Read1 pairs for reads with matched guides were used to determine the cell barcode and UMI assignment. We filtered out reads appearing less than twice and cells with more than one assigned guide. The Chi-square test was used to determine over-representation of cells with guides for the same gene target across cell-state driven clusters. Standardized residuals from the chi-square test were scaled and used to generate FIGS. 4E and 10F.

Data and Software Availability

Raw sequencing files for all screens performed are available at PENDING. Raw files for single cell RNA-Seq experiment are deposited to GEO PENDING. All code used to analyze data and produce figures in this work is available by request.

REFERENCES CITED IN INTRODUCTION AND EXAMPLES BY AUTHOR AND YEAR

Adamson, B., Norman, T. M., Jost, M., Cho, M. Y., Nuñez, J. K., Chen, Y., Villalta, J. E., Gilbert, L. A., Horlbeck, M. A., Hein, M. Y., et al. (2016). A Multiplexed Single-Cell CRISPR Screening Platform Enables Systematic Dissection of the Unfolded Protein Response. Cell 167, 1867-1882.e21.

Allard, D., Turcotte, M., and Stagg, J. (2017). Targeting A2 adenosine receptors in cancer. Immunol. Cell Biol. 95, 333-339.

Arranz-Nicolás, J., Ogando, J. J., Soutar, D., Arcos-Pérez, R., Meraviglia-Crivelli, D., Mañes, S., Mérida, I., Ávila-Flores, A., Arranz-Nicol\a'as, J., Ogando, J. J., et al. (2018). Diacylglycerol kinase α inactivation is an integral component of the costimulatory pathway that amplifies TCR signals. Cancer Immunol. Immunother. 67, 965-980.

Azzam, H. S., DeJarnette, J. B., Huang, K., Emmons, R., Park, C. S., Sommers, C. L., El-Khoury, D., Shores, E. W., and Love, P. E. (2001). Fine tuning of TCR signaling by CD5. J. Immunol. 166, 5464-5472.

Bartelt, R. R., and Houtman, J. C. D. The adaptor protein LAT serves as an integration node for signaling pathways that drive T cell activation. Wiley Interdisc. Rev. Syst. Biol. Med. 5, 101-110.

Chae, H.-D., Siefring, J. E., Hildeman, D. A., Gu, Y., and Williams, D. A. (2010). RhoH regulates subcellular localization of ZAP-70 and Lck in T cell receptor signaling. PLoS One 5, e13970.

Chen, S. S., Hu, Z., and Zhong, X.-P. (2016). Diacylglycerol Kinases in T Cell Tolerance and Effector Function. Front. Cell Dev. Biol. 4, 130.

Damgaard, R. B., Walker, J. A., Marco-Casanova, P., Morgan, N. V, Titheradge, H. L., Elliott, P. R., McHale, D., Maher, E. R., McKenzie, A. N. J., and Komander, D. (2016). The Deubiquitinase OTULIN Is an Essential Negative Regulator of Inflammation and Autoimmunity. Cell 166, 1215-1230.e20.

Datlinger, P., Rendeiro, A. F., Schmidl, C., Krausgruber, T., Traxler, P., Klughammer, J., Schuster, L. C., Kuchler, A., Alpar, D., and Bock, C. (2017). Pooled CRISPR screening with single-cell transcriptome readout. Nat. Methods 14, 297-301.

Dave, V. P., Keefe, R., Berger, M. A., Drbal, K., Punt, J. A., Wiest, D. L., Alarcon, B., and Kappes, D. J. (1998). Altered functional responsiveness of thymocyte subsets from CD3delta-deficient mice to TCR-CD3 engagement. Int. Immunol. 10, 1481-1490.

Dennehy, K. M., Elias, F., Na, S.-Y., Fischer, K.-D., Hünig, T., and Lühder, F. (2007). Mitogenic CD28 signals require the exchange factor Vav1 to enhance TCR signaling at the SLP-76-Vav-Itk signalosome. J. Immunol. 178, 1363-1371.

Dixit, A., Parnas, O., Li, B., Chen, J., Fulco, C. P., Jerby-Amon, L., Marjanovic, N. D., Dionne, D., Burks, T., Raychowdhury, R., et al. (2016). Perturb-Seq: Dissecting Molecular Circuits with Scalable Single-Cell RNA Profiling of Pooled Genetic Screens. Cell 167, 1853-1866.e17.

Doench, J. G. (2018). Am I ready for CRISPR? A user's guide to genetic screens. Nat. Rev. Genet. 19, 67-80.

Doench, J. G., Fusi, N., Sullender, M., Hegde, M., Vaimberg, E. W., Donovan, K. F., Smith, I., Tothova, Z., Wilen, C., Orchard, R., et al. (2016). Optimized sgRNA design to maximize activity and minimize off-target effects of CRISPR-Cas9. Nat. Biotechnol. 34, 184-191.

Düwel, M., Welteke, V., Oeckinghaus, A., Baens, M., Kloo, B., Ferch, U., Darnay, B. G., Ruland, J., Marynen, P., and Krappmann, D. (2009). A20 negatively regulates T cell receptor signaling to NF-kappaB by cleaving Malt1 ubiquitin chains. J. Immunol. 182, 7718-7728.

Ferreira, M. A., Vonk, J. M., Baurecht, H., Marenholz, I., Tian, C., Hoffman, J. D., Helmer, Q., Tillander, A., Ullemar, V., van Dongen, J., et al. (2017). Shared genetic origin of asthma, hay fever and eczema elucidates allergic disease biology. Nat. Genet. 49, 1752-1757.

Fraietta, J. A., Nobles, C. L., Sammons, M. A., Lundh, S., Carty, S. A., Reich, T. J., Cogdill, A. P., Morrissette, J. J. D., DeNizio, J. E., Reddy, S., et al. (2018). Disruption of TET2 promotes the therapeutic efficacy of CD19-targeted T cells. Nature 558, 307-312.

Ge, Y., Paisie, T. K., Newman, J. R. B., McIntyre, L. M., and Concannon, P. (2017). UBASH3A Mediates Risk for Type 1 Diabetes Through Inhibition of T-Cell Receptor-Induced NF-κB Signaling. Diabetes 66, 2033-2043.

Gharbi, S. I., Rincón, E., Avila-Flores, A., Torres-Ayuso, P., Almena, M., Cobos, M. A., Albar, J. P., and Mérida, I. (2011). Diacylglycerol kinase ζ controls diacylglycerol metabolism at the immunological synapse. Mol. Biol. Cell 22, 4406-4414.

Gilbert, L. A., Horlbeck, M. A., Adamson, B., Villalta, J. E., Chen, Y., Whitehead, E. H., Guimaraes, C., Panning, B., Ploegh, H. L., Bassik, M. C., et al. (2014). Genome-Scale CRISPR-Mediated Control of Gene Repression and Activation. Cell 159, 647-661.

Hultquist, J. F., Schumann, K., Woo, J. M., Manganaro, L., McGregor, M. J., Doudna, J., Simon, V., Krogan, N. J., and Marson, A. (2016). A Cas9 Ribonucleoprotein Platform for Functional Genetic Studies of HIV-Host Interactions in Primary Human T Cells. Cell Rep. 17, 1438-1452.

Ilangumaran, S., Bobbala, D., and Ramanathan, S. (2017). SOCS1: Regulator of T Cells in Autoimmunity and Cancer. Curr. Top. Microbiol. Immunol. 410, 159-189.

Jaitin, D. A., Weiner, A., Yofe, I., Lara-Astiaso, D., Keren-Shaul, H., David, E., Salame, T. M., Tanay, A., van Oudenaarden, A., and Amit, I. (2016). Dissecting Immune Circuits by Linking CRISPR-Pooled Screens with Single-Cell RNA-Seq. Cell 167, 1883-1896.e15.

Joung, J., Konermann, S., Gootenberg, J. S., Abudayyeh, O. O., Platt, R. J., Brigham, M. D., Sanjana, N. E., and Zhang, F. (2016). Protocol: Genome-scale CRISPR-Cas9 Knockout and Transcriptional Activation Screening. BioRxiv 12, 059626.

June, C. H., O'Connor, R. S., Kawalekar, O. U., Ghassemi, S., and Milone, M. C. (2018). CAR T cell immunotherapy for human cancer. Science 359, 1361-1365.

Kamizono, S., Hanada, T., Yasukawa, E L, Minoguchi, S., Kato, R., Minoguchi, M., Hattori, K., Hatakeyama, S., Yada, M., Morita, S., et al. (2001). The SOCS Box of SOCS-1 Accelerates Ubiquitin-dependent Proteolysis of TEL-JAK2. J. Biol. Chem. 276, 12530-12538.

Kamura, T., Sato, S., Haque, D., Liu, L., Kaelin, W. G., Conaway, R. C., and Conaway, J. W. (1998). The Elongin BC complex interacts with the conserved SOCS-box motif present in members of the SOCS, ras, WD-40 repeat, and ankyrin repeat families. Genes Dev. 12, 3872-3881.

Li, W., Xu, H., Xiao, T., Cong, L., Love, M. I., Zhang, F., Irizarry, R. A., Liu, J. S., Brown, M., and Liu, X. S. (2014). MAGeCK enables robust identification of essential genes from genome-scale CRISPR/Cas9 knockout screens. Genome Biol. 15, 554.

Liau, N. P. D., Laktyushin, A., Lucet, I. S., Murphy, J. M., Yao, S., Whitlock, E., Callaghan, K., Nicola, N. A., Kershaw, N. J., and Babon, J. J. (2018). The molecular basis of JAK/STAT inhibition by SOCS1. Nat. Commun. 9, 1558.

López-Cabrera, M., Santis, A. G., Fernández-Ruiz, E., Blacher, R., Esch, F., Sanchez-Mateos, P., Sánchez-Madrid, F., L\a'opez-Cabrera, M., Santis, A. G., Fern\a'andez-Ruiz, E., et al. (1993). Molecular cloning, expression, and chromosomal localization of the human earliest lymphocyte activation antigen AIM/CD69, a new member of the C-type animal lectin superfamily of signal-transmitting receptors. J. Exp. Med. 178, 537-547.

Maertens, O., and Cichowski, K. (2014). An expanding role for RAS GTPase activating proteins (RAS GAPs) in cancer. Adv. Biol. Regul. 55, 1-14.

Manguso, R. T., Pope, H. W., Zimmer, M. D., Brown, F. D., Yates, K. B., Miller, B. C., Collins, N. B., Bi, K., LaFleur, M. W., Juneja, V. R., et al. (2017). In vivo CRISPR screening identifies Ptpn2 as a cancer immunotherapy target. Nature 547, 413-418.

McInnes, L., and Healy, J. (2018). UMAP: Uniform Manifold Approximation and Projection for Dimension Reduction. 1-18.

Naramura, M., Jang, I.-K., Kole, H., Huang, F., Haines, D., and Gu, H. (2002). c-Cbl and Cbl-b regulate T cell responsiveness by promoting ligand-induced TCR downmodulation. Nat. Immunol. 3, 1192-1199.

Pan, D., Kobayashi, A., Jiang, P., de Andrade, L. F., Tay, R. E., Luoma, A. M., Tsoucas, D., Qiu, X., Lim, K., Rao, P., et al. (2018). A major chromatin regulator determines resistance of tumor cells to T cell-mediated killing. Science 359, 770-775.

Parnas, O., Jovanovic, M., Eisenhaure, T. M., Herbst, R. H., Dixit, A., Ye, C. J., Przybylski, D., Platt, R. J., Tirosh, I., Sanjana, N. E., et al. (2015). A Genome-wide CRISPR Screen in Primary Immune Cells to Dissect Regulatory Networks. Cell 162, 675-686.

Patel, S. J., Sanjana, N. E., Kishton, R. J., Eidizadeh, A., Vodnala, S. K., Cam, M., Gartner, J. J., Jia, L., Steinberg, S. M., Yamamoto, T. N., et al. (2017). Identification of essential genes for cancer immunotherapy. Nature 548, 537-542.

Peer, S., Baier, G., and Gruber, T. (2017). Cblb-deficient T cells are less susceptible to PD-L1-mediated inhibition. Oncotarget 8, 41841-41853.

Raab, M., da Silva, A. J., Findell, P. R., and Rudd, C. E. (1997). Regulation of Vav-SLP-76 binding by ZAP-70 and its relevance to TCR zeta/CD3 induction of interleukin-2. Immunity 6, 155-164.

Reck, M., Rodríguez-Abreu, D., Robinson, A. G., Hui, R., Csöszi, T., Fülöp, A., Gottfried, M., Peled, N., Tafreshi, A., Cuffe, S., et al. (2016). Pembrolizumab versus Chemotherapy for PD-L1-Positive Non-Small-Cell Lung Cancer. N. Engl. J. Med. 375, 1823-1833.

Ren, J., Liu, X., Fang, C., Jiang, S., June, C. H., and Zhao, Y. (2017). Multiplex Genome Editing to Generate Universal CAR T Cells Resistant to PD1 Inhibition. Clin. Cancer Res. 23, 2255-2266.

Robbins, P. F., Li, Y. F., El-Gamil, M., Zhao, Y., Wargo, J. A., Zheng, Z., Xu, H., Morgan, R. A., Feldman, S. A., Johnson, L. A., et al. (2008). Single and dual amino acid substitutions in TCR CDRs can enhance antigen-specific T cell functions. J. Immunol. 180, 6116-6131.

Roederer, M. (2011). Interpretation of cellular proliferation data: avoid the panglossian. Cytometry. A 79, 95-101.

Rupp, L. J., Schumann, K., Roybal, K. T., Gate, R. E., Ye, C. J., Lim, W. A., and Marson, A. (2017). CRISPR/Cas9-mediated PD-1 disruption enhances anti-tumor efficacy of human chimeric antigen receptor T cells. Sci. Rep. 7, 737.

de Saint Basile, G., Geissmann, F., Flori, E., Uring-Lambert, B., Soudais, C., Cavazzana-Calvo, M., Durandy, A., Jabado, N., Fischer, A., and Le Deist, F. (2004). Severe combined immunodeficiency caused by deficiency in either the delta or the epsilon subunit of CD3. J. Clin. Invest. 114, 1512-1517.

Schumann, K., Lin, S., Boyer, E., Simeonov, D. R., Subramaniam, M., Gate, R. E., Haliburton, G. E., Ye, C. J., Bluestone, J. a., Doudna, J. a., et al. (2015). Generation of knock-in primary human T cells using. Proc. Natl. Acad. Sci. U.S.A. 112, 10437-10442.

Shalem, O., Sanjana, N. E., Hartenian, E., Shi, X., Scott, D. A., Mikkelson, T., Heckl, D., Ebert, B. L., Root, D. E., Doench, J. G., et al. (2014). Genome-scale CRISPR-Cas9 knockout screening in human cells. Science 343, 84-87.

Shang, W., Jiang, Y., Boettcher, M., Ding, K., Mollenauer, M., Liu, Z., Wen, X., Liu, C., Hao, P., Zhao, S., et al. (2018). Genome-wide CRISPR screen identifies FAM49B as a key regulator of actin dynamics and T cell activation. Proc. Natl. Acad. Sci. U.S.A. 115, E4051-E4060.

Sharma, P., Hu-Lieskovan, S., Wargo, J. A., and Ribas, A. (2017). Primary, Adaptive, and Acquired Resistance to Cancer Immunotherapy. Cell 168, 707-723.

Shen, S., Lau, J., Zhu, M., Zou, J., Fuller, D., Li, Q., and Zhang, W. (2009). The importance of Src homology 2 domain-containing leukocyte phosphoprotein of 76 kilodaltons sterile-alpha motif domain in thymic selection and T-cell activation. Blood 114, 74-84.

Shipkova, M., and Wieland, E. (2012). Surface markers of lymphocyte activation and markers of cell proliferation. Clin. Chim. Acta. 413, 1338-1349.

Tsuchihashi, N., Matsuda, S., Reinherz, E. L., and Koyasu, S. (2000). Two YxxL segments of a single immunoreceptor tyrosine-based activation motif in the CD3zeta molecule differentially activate calcium mobilization and mitogen-activated protein kinase family pathways. Eur. J. Immunol. 30, 1785-1793.

Tybulewicz, V. L. J. (2005). Vav-family proteins in T-cell signalling. Curr. Opin. Immunol. 17, 267-274.

Voisinne, G., Garcia-Blesa, A., Chaoui, K., Fiore, F., Bergot, E., Girard, L., Malissen, M., Burlet-Schiltz, O., Gonzalez de Peredo, A., Malissen, B., et al. (2016). Co-recruitment analysis of the CBL and CBLB signalosomes in primary T cells identifies CD5 as a key regulator of TCR-induced ubiquitylation. Mol. Syst. Biol. 12, 876.

Wang, H., Kadlecek, T. A., Au-Yeung, B. B., Goodfellow, H. E. S., Hsu, L.-Y., Freedman, T. S., and Weiss, A. (2010). ZAP-70: an essential kinase in T-cell signaling. Cold Spring Harb. Perspect. Biol. 2, a002279.

Wang, T., Wei, J. J., Sabatini, D. M., and Lander, E. S. (2014). Genetic screens in human cells using the CRISPR-Cas9 system. Science 343, 80-84.

Wargo, J. A., Robbins, P. F., Li, Y., Zhao, Y., El-Gamil, M., Caragacianu, D., Zheng, Z., Hong, J. A., Downey, S., Schrump, D. S., et al. (2009). Recognition of NY-ESO-1+ tumor cells by engineered lymphocytes is enhanced by improved vector design and epigenetic modulation of tumor antigen expression. Cancer Immunol. Immunother. 58, 383-394.

Wolchok, J. D., Chiarion-Sileni, V., Gonzalez, R., Rutkowski, P., Grob, J.-J., Cowey, C. L., Lao, C. D., Wagstaff, J., Schadendorf, D., Ferrucci, P. F., et al. (2017). Overall Survival with Combined Nivolumab and Ipilimumab in Advanced Melanoma. N. Engl. J. Med. 377, 1345-1356.

Zhou, P., Shaffer, D. R., Alvarez Arias, D. A., Nakazaki, Y., Pos, W., Torres, A. J., Cremasco, V., Dougan, S. K., Cowley, G. S., Elpek, K., et al. (2014). In vivo discovery of immunotherapy targets in the tumour microenvironment. Nature 506, 52-57.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for the contents for which they are cited.

TABLE 1

| Gene | sgRNA Sequence | LFC (~effect magnitude) | |
|---|---|---|---|
| AGO1 | GAACGCGCTGAGAGTCCGTG | 0.83176 | (SEQ ID NO: 3) |
| ARIH2 | CCTGTACCCGAATAACCATG | 0.38127 | (SEQ ID NO: 4) |
| CBLB | TGCACAGAACTATCGTACCA | 1.9597 | (SEQ ID NO: 5) |
| CBLB | TTCCGCAAAATAGAGCCCCA | 1.5917 | (SEQ ID NO: 6) |
| CBLB | TGTGGGATGTCGACTCCTAG | 0.78764 | (SEQ ID NO: 7) |
| CD5 | CGGCTCAGCTGGTATGACCC | 1.4145 | (SEQ ID NO: 8) |
| CD5 | AAGCGTCAAAAGTCTGCCAG | 0.5512 | (SEQ ID NO: 9) |
| CD8A | AGGTTCCAGGTCCGATCCAG | 0.80844 | (SEQ ID NO: 10) |
| CD8A | GCAGGAAGACCGGCACGAAG | 0.6365 | (SEQ ID NO: 11) |
| CDKN1B | AGTTCTACTACAGACCCCCG | 0.86229 | (SEQ ID NO: 12) |
| CDKN1B | GGGCAAGTACGAGTGGCAAG | 0.98862 | (SEQ ID NO: 13) |
| CDKN1B | TGGACCACGAAGAGTTAACC | 0.81122 | (SEQ ID NO: 14) |
| DGKA | CAGCACTAGCAGTGGCACGG | 0.72196 | (SEQ ID NO: 15) |
| DGKA | CTCCCAAACTGACCTCTAGG | 0.70806 | (SEQ ID NO: 16) |
| DGKZ | GAATAAGATGTTCTACGCCG | 0.62824 | (SEQ ID NO: 17) |
| DGKZ | CCCCGTGCAGCGAGTCAGAG | 0.4938 | (SEQ ID NO: 18) |
| DGKZ | CTCTCCTCAGTACCACAGCA | 0.65868 | (SEQ ID NO: 19) |
| DGKZ | AGGCTCCAGGAATGTCCGCG | 0.42268 | (SEQ ID NO: 20) |
| FIBP | CCGCTTTCCAGTGACCGACG | 0.55863 | (SEQ ID NO: 21) |
| GNA13 | AGAGCATTATGGGCAGACAG | 0.38252 | (SEQ ID NO: 22) |
| MEF2D | CAAGTACCGACGCGCCAGCG | 0.72547 | (SEQ ID NO: 23) |
| MEF2D | CATCATCCCTCACGGACCCG | 0.46001 | (SEQ ID NO: 24) |
| RASA2 | AGATATCACACATTACAGTG | 0.86096 | (SEQ ID NO: 25) |
| RASA2 | TTAGCATCAAGGCATGCCAT | 0.72575 | (SEQ ID NO: 26) |
| RASA2 | AGGATCGACTTGTGGAACAA | 0.41341 | (SEQ ID NO: 27) |
| SMARCB1 | GAGAACCTCGGAACATACGG | 0.62715 | (SEQ ID NO: 28) |
| SOCS1 | GGGCCCCCAGTAGAATCCGC | 1.2551 | (SEQ ID NO: 29) |
| SOCS1 | CGAAAAAGCAGTTCCGCTGG | 0.60876 | (SEQ ID NO: 30) |
| SOCS1 | CGGCGTGCGAACGGAATGTG | 0.78419 | (SEQ ID NO: 31) |
| TCEB2 | GAGCAGCGGCTGTACAAGGT | 1.0955 | (SEQ ID NO: 32) |
| TCEB2 | CTTGGCGTCCGTGAAGATGG | 0.61346 | (SEQ ID NO: 33) |
| TMEM222 | ACGGACATGAAGCAATATCA | 1.0461 | (SEQ ID NO: 34) |
| TMEM222 | TGAGGAGTACAAGCACCGCA | 1.3341 | (SEQ ID NO: 35) |
| TMEM222 | GACTCACTGAGACAAAGTAG | 0.87272 | (SEQ ID NO: 36) |
| TNFAIP3 | TATGCCATGAGTGCTCAGAG | 0.651 | (SEQ ID NO: 37) |
| TNFAIP3 | CCACTTGTTAACAGAGACCG | 0.63302 | (SEQ ID NO: 38) |

TABLE 1-continued

Positive Hits from GW Screen

| Gene | sgRNA Sequence | LFC (~effect magnitude) | |
|---|---|---|---|
| UBASH3A | CGTGCTGGTGGTTCGCCACG | 1.0191 | (SEQ ID NO: 39) |
| UBASH3A | CCAGTACAAACCCCAGAACG | 0.6566 | (SEQ ID NO: 40) |

TABLE 2

Hits from In Vitro and In Vivo Analysis

In Vitro Tumor Kill

| Gene | sgRNA Sequence | |
|---|---|---|
| CBLB | TGCACAGAACTATCGTACCA | (SEQ ID NO: 41) |
| CBLB | TTCCGCAAAATAGAGCCCCA | (SEQ ID NO: 42) |
| SOCS1 | CGGCGTGCGAACGGAATGTG | (SEQ ID NO: 43) |
| SOCS1 | GGGCCCCCAGTAGAATCCGC | (SEQ ID NO: 44) |
| TMEM222 | ACGGACATGAAGCAATATCA | (SEQ ID NO: 45) |
| TMEM222 | TGAGGAGTACAAGCACCGCA | (SEQ ID NO: 46) |
| RASA2 | AGATATCACACATTACAGTG | (SEQ ID NO: 47) |
| RASA2 | TTAGCATCAAGGCATGCCAT | (SEQ ID NO: 48) |
| TCEB2 | CTTGGCGTCCGTGAAGATGG | (SEQ ID NO: 49) |
| TCEB2 | GAGCAGCGGCTGTACAAGGT | (SEQ ID NO: 50) |

In Vivo Tumor Infiltrate

| Gene | sgRNA Sequence | |
|---|---|---|
| ARID1A | CAGCAGAACTCTCACGACCA | (SEQ ID NO: 51) |
| SOCS1 | CGGCGTGCGAACGGAATGTG | (SEQ ID NO: 52) |

TABLE 3

Adenosine Resistance

| Gene | sgRNA Sequence | |
|---|---|---|
| ADORA2A | ATGCTAGGTTGGAACAACTG | (SEQ ID NO: 53) |
| ADORA2A | GCGGCGGCCGACATCGCAGT | (SEQ ID NO: 54) |
| ADORA2A | AAGCAGTTGATGATGTGTAG | (SEQ ID NO: 55) |
| FAM105A | TTATTTCAGATATTCAGCCA | (SEQ ID NO: 56) |
| FAM105A | CACCCCGTAACAAGCTGATG | (SEQ ID NO: 57) |
| FAM105A | GAAGTGACCAAGTTCACTCC | (SEQ ID NO: 58) |

TABLE 4

Negative hits-GW screen

| Gene | sgRNA Sequence | |
|---|---|---|
| CYP2R1 | AATCGCCCACCGTAGCACAT | (SEQ ID NO: 59) |
| LCP2 | AGCCACGAAGAGGACAATGG | (SEQ ID NO: 60) |
| RPP21 | AGGACCGCGAGGCCTTCCAG | (SEQ ID NO: 61) |
| VAV1 | CACAACCCACAGCGACACGG | (SEQ ID NO: 62) |
| EIF2B3 | AACAGACGTTGCCTTACATG | (SEQ ID NO: 63) |
| RPP21 | GTGAAGAGGACTCTCTGTCG | (SEQ ID NO: 64) |
| EXOSC6 | TCGTCGGCCGCGTACAGCTG | (SEQ ID NO: 65) |
| RPN1 | TGAGGACGTGAAGCGCACAG | (SEQ ID NO: 66) |
| VARS | CCGCAGCGAACGTACCACTG | (SEQ ID NO: 67) |
| CD3D | ACTTCGATAATGAACTTGCA | (SEQ ID NO: 68) |
| GRAP2 | AAGGTCATGCGAGACAACAA | (SEQ ID NO: 69) |
| TRMT112 | TCATACGCGCCACGAAGTTG | (SEQ ID NO: 70) |
| ALG8 | TACCTGAAATAATCGTGCAA | (SEQ ID NO: 71) |
| VAV1 | GCTGGTGAAACACACGCAGG | (SEQ ID NO: 72) |
| EXOSC6 | GAGCAGGCGACCGCGCAGCG | (SEQ ID NO: 73) |
| SH2D1A | ATAGCTGCCATCCAGCCCAG | (SEQ ID NO: 74) |
| HSPA8 | AAATCGGGCACGGGTAATGG | (SEQ ID NO: 75) |
| ZAP70 | GGCAAGTACTGCATTCCCGA | (SEQ ID NO: 76) |
| DDX54 | CCACGCCGAGTACCTCACTG | (SEQ ID NO: 77) |
| CD247 | CACAGTTGCCGATTACAGGT | (SEQ ID NO: 78) |
| ALDOA | CTGAGTGCAAGCATGGCCTG | (SEQ ID NO: 79) |
| ZNF131 | ATTACCAGCAAGTACCGTCA | (SEQ ID NO: 80) |
| WDR36 | GTTCTATGTAACAACCTGCG | (SEQ ID NO: 81) |
| AK2 | GTGAGGCAGGCAGAAATGGT | (SEQ ID NO: 82) |
| LCP2 | GGAGCTAATGAACGATCTAG | (SEQ ID NO: 83) |
| CD247 | CTGGCCCTGCTGGTACGCGG | (SEQ ID NO: 84) |
| VHL | CATACGGGCAGCACGACGCG | (SEQ ID NO: 85) |
| EIF2B2 | GGACCACCGCTGGAGCAACG | (SEQ ID NO: 86) |
| PRELID1 | TCACTCGGTGTACGTCCTGG | (SEQ ID NO: 87) |
| GRPEL1 | ACACTGAGAACTTACGGCAG | (SEQ ID NO: 88) |
| NAA10 | AGCCAGACCGAGGCGCCGGT | (SEQ ID NO: 89) |
| ALDOA | AATGGCGAGACTACCACCCA | (SEQ ID NO: 90) |

TABLE 4-continued

Negative hits-GW screen

| Gene | sgRNA Sequence |
|---|---|
| ALG2 | CACAGCGCACCGGTAGCTCG (SEQ ID NO: 91) |
| MARS | ATAACCCGAGACCTCAAATG (SEQ ID NO: 92) |
| C4orf45 | TTTATCAACAAATCAAGACT (SEQ ID NO: 93) |
| RAC2 | ATCCCCAGGAACTCACACGG (SEQ ID NO: 94) |
| LCK | CTACAACGGGCACACGAAGG (SEQ ID NO: 95) |
| SUPT4H1 | AGGACAGCTGGGTCTCCAAG (SEQ ID NO: 96) |
| SLC25A3 | TCTGATCTCACCTTCCACGG (SEQ ID NO: 97) |
| LUC7L3 | CCGCGGGACTTACGCTCTCG (SEQ ID NO: 98) |
| C3orf17 | ACTCCACCACTGGCTGACTG (SEQ ID NO: 99) |
| RPP21 | TCTTCACCGAGGGATCCCTG (SEQ ID NO: 100) |
| HARS | AGGGCTGGATTACTACACTG (SEQ ID NO: 101) |
| ZNRD1 | ACGGTCACCTGTATTCGCTG (SEQ ID NO: 102) |
| CCNH | GTCCAAGAGGACTCTCCCGG (SEQ ID NO: 103) |
| MYC | AGAGTGCATCGACCCCTCGG (SEQ ID NO: 104) |
| CCDC25 | CAGTTACCTTATGTAATCGA (SEQ ID NO: 105) |
| EEF1G | TGCCTCTGCAGTGAGCAATG (SEQ ID NO: 106) |
| CCND2 | CACTTGAAGTAGGAGCACTG (SEQ ID NO: 107) |
| GCLC | AGGCCAACATGCGAAAACGC (SEQ ID NO: 108) |
| TAF2 | TCCTGGAACTCAGAAATACG (SEQ ID NO: 109) |
| EIF6 | CGATAGACGCGTGCACCACG (SEQ ID NO: 110) |
| SEC63 | TGGGAAATTAGCCTAACCTG (SEQ ID NO: 111) |
| EXOSC6 | GGGCGTGGAGATGTACGACC (SEQ ID NO: 112) |
| RPS19BP1 | GACCAGGACGAGAAGCACCG (SEQ ID NO: 113) |
| SEC61B | ACCCCCAGTGGCACTAACGT (SEQ ID NO: 114) |
| VHL | CGCCGCATCCACAGCTACCG (SEQ ID NO: 115) |
| DAD1 | CGGGCTTCATCTCTTGTGTG (SEQ ID NO: 116) |
| BEND6 | TGACCAAAGACTGTCGAAGT (SEQ ID NO: 117) |
| FBL | ACCAGATCCACATCAAACCG (SEQ ID NO: 118) |
| VARS | GGTGAGTGGACGCAATGAGG (SEQ ID NO: 119) |
| EIF2B4 | CTGCAGGCCGAGTCGCACCA (SEQ ID NO: 120) |
| RAC2 | ACAGCAAGCCAGTGAACCTG (SEQ ID NO: 121) |
| PAGR1 | TTGCAGCTCCAGAGTACCGT (SEQ ID NO: 122) |
| MYC | GCTGCACCGAGTCGTAGTCG (SEQ ID NO: 123) |
| CD3E | GATGGAGACTTTATATGCTG (SEQ ID NO: 124) |
| LCP2 | TGAACTCCACAGGTCACTCG (SEQ ID NO: 125) |
| MYC | CTTCGGGGAGACAACGACGG (SEQ ID NO: 126) |
| ENOSF1 | GTGCCCCAGAATGTCATCAG (SEQ ID NO: 127) |
| POLR3H | GCTCAACGACTCCATTGCCG (SEQ ID NO: 128) |
| NOP14 | CACAAGAAGACTCAACAGGA (SEQ ID NO: 129) |
| CLNS1A | GTACCCTTTACATCGCTGAG (SEQ ID NO: 130) |
| POLR2L | TTCACTTGTGGCAAGATCGT (SEQ ID NO: 131) |
| ZPR1 | GGTGATCAATCCTTCAACAG (SEQ ID NO: 132) |
| CARD11 | TGAGGATCGAGATGGTGCGG (SEQ ID NO: 133) |
| SLC35B1 | TTGGCTTGCAGGATTTACCA (SEQ ID NO: 134) |
| TRMT112 | GATACCTAAAGTGGAGTGGT (SEQ ID NO: 135) |
| FARSA | AAGCGGACCCACTCTCAGGG (SEQ ID NO: 136) |
| PRELID1 | AATAGTCGCTCGGCCCAGCG (SEQ ID NO: 137) |
| LARS | TGCTATAAGAGACTAACCAC (SEQ ID NO: 138) |
| NOP16 | GCGCCGCGGATCGAATGGTG (SEQ ID NO: 139) |
| POLR2L | CCTGTACGCTGCTTCACTTG (SEQ ID NO: 140) |
| HSPA8 | TGGTGGTATTACGCTTGATG (SEQ ID NO: 141) |
| CD247 | GCAGAGAAGGAAGAACCCTC (SEQ ID NO: 142) |
| GEMIN8 | AGTACTTTGCAGAGACCGAG (SEQ ID NO: 143) |
| TTC27 | GCCGAGTGGAACGGGCAATG (SEQ ID NO: 144) |
| PMPCA | TAGCAAAGGCTTGGACACGG (SEQ ID NO: 145) |
| PWP2 | GCACTTGACGTTGTACCGAG (SEQ ID NO: 146) |
| TAF1C | TGGAGCCTAAGATCCAGTGG (SEQ ID NO: 147) |
| DDOST | CCCGGACAAGCCTATCACCC (SEQ ID NO: 148) |
| ZNF654 | CAAGCCTTTAACTGAATGTG (SEQ ID NO: 149) |
| FAU | CACCCCGCACTGGCCCAGAG (SEQ ID NO: 150) |
| EIF2B3 | AGTCATTGTGGTTACAACCA (SEQ ID NO: 151) |
| YARS | GAGTTCTAGAAGTTCCCATG (SEQ ID NO: 152) |
| DDX20 | AAGCAGCAGTGACTCGAAGT (SEQ ID NO: 153) |
| DDX56 | ATCATCTCACAGTTCAACCA (SEQ ID NO: 154) |
| DDX49 | AGCCCAAGCAGTCTCGACCT (SEQ ID NO: 155) |
| UTP20 | AATATGAGGTAACACCACGA (SEQ ID NO: 156) |
| EPRS | ACTTTGGGACTATACCACAC (SEQ ID NO: 157) |
| RSL1D1 | GCTATACGTATTGGTCACGT (SEQ ID NO: 158) |
| ATP1B3 | CGACCACCGGAGAATTCCTG (SEQ ID NO: 159) |
| EXOSC4 | GGCTCGGCCTACATTGAGCA (SEQ ID NO: 160) |
| ARMC7 | ACCAATAGCAAACTCCACCA (SEQ ID NO: 161) |
| EIF2B4 | ATAAACTAAAACCCTACATG (SEQ ID NO: 162) |
| AUP1 | GACCAGCACACAAAGCTGGG (SEQ ID NO: 163) |
| VAV1 | TGGCCGGCCCAAGATCGACG (SEQ ID NO: 164) |
| PAK1IP1 | TCAGCAGCAATGGACTCTTG (SEQ ID NO: 165) |
| EIF6 | TCCGATCGCTACCAGACAGT (SEQ ID NO: 166) |

TABLE 4-continued

Negative hits-GW screen

| Gene | sgRNA Sequence |
|---|---|
| FAM157A | AACTCGCTCCCCAAGCCCGT (SEQ ID NO: 167) |
| HSPE1-MOB4 | ATTTCATCAAAGGATTCATC (SEQ ID NO: 168) |
| LAT | GTGGCGAGCTACGAGAACGA (SEQ ID NO: 169) |
| DCAF13 | ACCAAGTTGGACTTACAGAG (SEQ ID NO: 170) |
| PPP1R10 | AGCTCCGGGACTTCAACAGG (SEQ ID NO: 171) |
| EXOSC2 | TCGTCCATGAACCTTCCTGG (SEQ ID NO: 172) |
| SRP9 | GATGCCGCAGTACCAGACCT (SEQ ID NO: 173) |
| POLR3K | GCACAACATCACCCGCAAGG (SEQ ID NO: 174) |
| TAF6 | GACAACTCGTGGATGCTCCG (SEQ ID NO: 175) |
| EIF3H | CTATGGCTCATTCGTTACCC (SEQ ID NO: 176) |
| ABCF1 | CTGCAGAGGCCAAAGCACGG (SEQ ID NO: 177) |
| FLJ44635 | TGGAAGGGAAGATAGTCAGT (SEQ ID NO: 178) |
| PTP4A2 | ATTGTGTTGCAGGATTGGGA (SEQ ID NO: 179) |
| EIF3CL | GGATGCGGATATAGAACCGG (SEQ ID NO: 180) |
| ABCB7 | CACACCACAGACAGCTACCG (SEQ ID NO: 181) |
| GTF2H4 | ACAATCGGTCCAATACCCCA (SEQ ID NO: 182) |
| MARS | AAGATGACCTCACTAACCAG (SEQ ID NO: 183) |
| TAF4 | GCTCCCATTCAAAGTTTGCG (SEQ ID NO: 184) |
| RPL5 | GACTGGTGATGAATACAATG (SEQ ID NO: 185) |
| FTSJ3 | AGTGTTACGAACCATCCCCC (SEQ ID NO: 186) |
| CD28 | TGTCGTACGCTACAAGCA (SEQ ID NO: 187) |
| ALG13 | GCGCCGACACACACGCAATG (SEQ ID NO: 188) |
| CARD11 | CATCGTCAGACGCTACAAGG (SEQ ID NO: 189) |
| EIF4G1 | TGGTGGTGAGCAGACGACAA (SEQ ID NO: 190) |
| UTP3 | AGGAGGCACAGATCATTCAG (SEQ ID NO: 191) |
| GARS | TGGCTCGTGCATGACAGGAG (SEQ ID NO: 192) |
| CACNB4 | TAATTGAACGTTCGAACACC (SEQ ID NO: 193) |
| HSPA8 | AAACCAACCTCACCTTCCCA (SEQ ID NO: 194) |
| POP7 | GCAGCGCGATGTTGATGGCG (SEQ ID NO: 195) |
| ERCC3 | AGGGCATGCTTACCACCCAG (SEQ ID NO: 196) |
| GDPD2 | AGTCCATCCAGTGTCCCCAG (SEQ ID NO: 197) |
| SUPT5H | TGTGAAGGCTACATCTACG (SEQ ID NO: 198) |
| POLR3D | AGGTCCCTGGAACGGATGGA (SEQ ID NO: 199) |
| RPP30 | CCTGTGAAGGCGATTGACCG (SEQ ID NO: 200) |
| C12orf45 | CTGTACCTGGTCCAATACTG (SEQ ID NO: 201) |
| DPH3 | TTTATAATGAGAGAGCAGCT (SEQ ID NO: 202) |
| EIF3B | AAGAGGCATTGCTCTATGGG (SEQ ID NO: 203) |
| LACTBL1 | CTGGCATCAGCCGAACAGCA (SEQ ID NO: 204) |
| THAP11 | AGTAGCGCGCAGACCCGCTG (SEQ ID NO: 205) |
| IMP4 | GGCGCCCAGCGAATGAACCG (SEQ ID NO: 206) |
| EXOSC7 | TGGGAGTGAAAGCAGAAATG (SEQ ID NO: 207) |
| NOB1 | AGCCCTTACCGGAATACGTG (SEQ ID NO: 208) |
| EIF4E | AAACTTGGCAAGCAAACCTG (SEQ ID NO: 209) |
| PLCG1 | ATAGCGATCAAAGTCCCGTG (SEQ ID NO: 210) |
| HUWE1 | AAGCGCTCAAATCGGACCAA (SEQ ID NO: 211) |
| RBM19 | GGGTAGTGGAGCTCAGACAG (SEQ ID NO: 212) |
| GATA3 | AGGTACCCTCCGACCCACCA (SEQ ID NO: 213) |
| CCND2 | TGAAGGTCTGAGCATGCTTG (SEQ ID NO: 214) |
| TTI2 | GATGGAGACAGTGTACCCC (SEQ ID NO: 215) |
| THG1L | TGGACGGCCGGAATTTCCAT (SEQ ID NO: 216) |
| TAF1C | CCGATGCTGAAGTGGAACCA (SEQ ID NO: 217) |
| URI1 | CTGTAGGTTTAGTTGAGCAC (SEQ ID NO: 218) |
| TRMT112 | TGGAGGCGGCCGATAACGTG (SEQ ID NO: 219) |
| EIF3H | TCTGATCAATGTCCTAATGT (SEQ ID NO: 220) |
| CCND2 | ATGTGCTCAATGAAGTCATG (SEQ ID NO: 221) |
| GCLM | ACGGGGAACCTGCTGAACTG (SEQ ID NO: 222) |
| RBSN | GAGTGCGCACTTCATCCATG (SEQ ID NO: 223) |
| QARS | TGGAGTGACCACATAGCCTG (SEQ ID NO: 224) |
| POP7 | AGAGCACGCGTTCTGACCCC (SEQ ID NO: 225) |
| TAF4 | GACCGAGCTACTCAGCACCA (SEQ ID NO: 226) |
| HUWE1 | TGGTATGACGAAGGGTACAG (SEQ ID NO: 227) |
| CARS | TGGCACATACTCACTAACCC (SEQ ID NO: 228) |
| PTP4A2 | TACTCTCAACAAGTTCACAG (SEQ ID NO: 229) |
| PES1 | TAGGGAGTGATCCACACGAT (SEQ ID NO: 230) |
| ZNF785 | ATGAAGTGGCTGTCAAGGAG (SEQ ID NO: 231) |
| WDR26 | CAGCCTGAATGTCAATAACG (SEQ ID NO: 232) |
| PRR20D | CTTACGTGAAACCCTTCAGA (SEQ ID NO: 233) |
| STK11 | GTTGCGAAGGATCCCCAACG (SEQ ID NO: 234) |
| PIK3CD | CAGCGGCTGCCGGAACACTG (SEQ ID NO: 235) |
| YARS | TGATCTCCTTGATCGGAAGG (SEQ ID NO: 236) |
| STRAP | AGGAGATGAATTGATGACCC (SEQ ID NO: 237) |
| WDR77 | CTCCGCCGGAGTCCAAACGG (SEQ ID NO: 238) |
| NANS | GAGATCGGCCAGAACCACCA (SEQ ID NO: 239) |
| TARS | CCTTTGATAGATCTCTGCCG (SEQ ID NO: 240) |
| HSPA8 | GAAACATTGGCCCTTTATGG (SEQ ID NO: 241) |
| TMEM127 | GCACAGCGCCGTGATAGACA (SEQ ID NO: 242) |

TABLE 4-continued

Negative hits-GW screen

| Gene | sgRNA Sequence |
|---|---|
| FAM35A | GCTATCTCCATGCCATGTGA (SEQ ID NO: 243) |
| ZBTB8OS | TGAAGAACAGAAGGCGATCA (SEQ ID NO: 244) |
| BPTF | GCCTTCGATCAAGTGCACTG (SEQ ID NO: 245) |
| INO80D | GACTTGCAGACTGAACCCTG (SEQ ID NO: 246) |
| NOP14 | CAACAGCAACATGAGCCCCG (SEQ ID NO: 247) |
| KARS | TGTCTACATGGAACTTGTGT (SEQ ID NO: 248) |
| SH2D1A | GGATGGCAGCTATTTGCTGA (SEQ ID NO: 249) |
| RHOH | GGTGAAGCGCACCAACAGAG (SEQ ID NO: 250) |
| DIMT1 | AACAGCATTATCGATAAGGT (SEQ ID NO: 251) |
| CMPK1 | TCAAGGATGGAACAAGACCA (SEQ ID NO: 252) |
| TAF6 | GGCGTAGTCAATGTCACTGG (SEQ ID NO: 253) |
| QTRT1 | TGGTTAGCAGTACTGTGACT (SEQ ID NO: 254) |
| LCK | GACCCACTGGTTACCTACGA (SEQ ID NO: 255) |
| NOL10 | ACCCATGCATATATGCCCGG (SEQ ID NO: 256) |
| MYBBP1A | GCGTCTAATCACGGGACTCG (SEQ ID NO: 257) |
| NHP2 | TGTAGAGCTTCCGCGTGAGG (SEQ ID NO: 258) |
| DDX54 | GAGGCATCGCTGGAGCTACG (SEQ ID NO: 259) |
| LAT | TTTACCAGTTTGTATCCAAG (SEQ ID NO: 260) |
| TAF2 | CAGAGTATGAATCAACACAA (SEQ ID NO: 261) |
| MBTPS1 | GCTCAAACATGTTGACCCCG (SEQ ID NO: 262) |
| GNL3 | GTAATGTTGGTGTATCCATG (SEQ ID NO: 263) |
| DEF6 | TCATCAGGAACCATGATCAG (SEQ ID NO: 264) |
| BCL10 | TCGCCGAATAGATTCAACAA (SEQ ID NO: 265) |
| NFKBIA | CTGGACGACCGCCACGACAG (SEQ ID NO: 266) |
| PHB | TAATTGGTTTCTGTACCCAC (SEQ ID NO: 267) |
| CD3G | AAAGAGAAAGCCAGATATGG (SEQ ID NO: 268) |
| CD3D | TTGCAATACCAGCATCACAT (SEQ ID NO: 269) |
| QARS | GTGACTCCGCACATACTCAA (SEQ ID NO: 270) |
| EIF3C | AGGATGCGGATATAGAACCG (SEQ ID NO: 271) |
| GRPEL1 | GTGGCTGTGCACAACAACCG (SEQ ID NO: 272) |
| MBTPS2 | ATGGCAAGAGAATTACTGGG (SEQ ID NO: 273) |
| ORAOV1 | CATGGGGAAGGGTATCGGGA (SEQ ID NO: 274) |
| SLC4A2 | GAAGACGCAGGACCTGATAG (SEQ ID NO: 275) |
| GATA3 | CAGGGAGTGTGTGAACTGTG (SEQ ID NO: 276) |
| ODF3 | TTGGGGTTTACATTGTAACG (SEQ ID NO: 277) |
| SLC7A6OS | AGGAGTCCGAGTACACGCCG (SEQ ID NO: 278) |
| ORAOV1 | AGTAGTTTGGGTGTGATGGA (SEQ ID NO: 279) |
| ALG13 | AAGTGCGTGTTTGTTACCGT (SEQ ID NO: 280) |
| TAF1B | AAATAAAAGCCCTCAACCGG (SEQ ID NO: 281) |

What is claimed is:

1. A genetically modified hematopoietic cell that comprises a genetic modification that inhibits expression or activity of a polypeptide product encoded by a RAS p21 protein activator 2 (RASA2) gene, wherein expression or activity of the polypeptide product is inhibited by at least 60% compared to a control wild-type hematopoietic cell; wherein the genetically modified hematopoietic cell is a T-cell and inhibition of expression increases proliferation-of the cell induced by T-cell receptor signaling.

2. The genetically modified hematopoietic cell of claim 1, wherein the genetic modification inactivates the RASA2 gene.

3. The genetically modified hematopoietic cell of claim 1, wherein the genetically modified hematopoietic cell is a primary T-cell.

4. The genetically modified hematopoietic cell of claim claim 1, wherein the T-cell is a CD8+ T cell or CD4+ T cell.

5. The genetically modified hematopoietic cell of claim 1, wherein the RASA2 gene is inhibited using a clustered, regularly interspaced, short palindromic repeats (CRISPR) system.

6. The genetically modified hematopoietic cell of claim 1, wherein the RASA2 gene is inhibited using a transcription activator-like effector nuclease (TALEN) system, a zinc finger nuclease system, or a meganuclease system.

7. The genetically modified hematopoietic cell of claim 1, wherein the RASA2 gene is inhibited using inhibitory RNA.

8. The genetically modified hematopoietic cell of claim 1, wherein the RASA2 gene is inhibited using shRNA, siRNA, microRNA, or an antisense RNA.

9. A population of cells comprising the genetically modified cell of claim 1.

10. A cell culture comprising a genetically modified hematopoietic cell of claim 1.

\* \* \* \* \*

SEQUENCE LISTING

<160> NUMBER OF SEQ ID NOS: 281

<210> SEQ ID NO 1
<211> LENGTH: 9
<212> TYPE: PRT
<213> ORGANISM: Homo sapiens

<400> SEQUENCE: 1

Ser Leu Leu Met Trp Ile Thr Gln Cys
1               5

<210> SEQ ID NO 2
<211> LENGTH: 39
<212> TYPE: DNA
<213> ORGANISM: Artificial Sequence
<220> FEATURE:
<223> OTHER INFORMATION: Description of Artificial Sequence: Synthetic
      oligonucleotide
<220> FEATURE:
<221> NAME/KEY: modified_base
<222> LOCATION: (20)..(39)
<223> OTHER INFORMATION: a, c, t, g, unknown or other

<400> SEQUENCE: 2
tggaaaggac gaaacaccgn nnnnnnnnn nnnnnnnn                    39

```
<210> SEQ ID NO 3
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 3
gaacgcgctg agagtccgtg                                                  20

<210> SEQ ID NO 4
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 4
cctgtacccg aataaccatg                                                  20

<210> SEQ ID NO 5
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 5
tgcacagaac tatcgtacca                                                  20

<210> SEQ ID NO 6
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 6
ttccgcaaaa tagagcccca                                                  20

<210> SEQ ID NO 7
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 7
tgtgggatgt cgactcctag                                                  20

<210> SEQ ID NO 8
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 8
cggctcagct ggtatgaccc                                                  20
```

```
<210> SEQ ID NO 9
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 9
aagcgtcaaa agtctgccag                                                    20

<210> SEQ ID NO 10
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 10
aggttccagg tccgatccag                                                    20

<210> SEQ ID NO 11
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 11
gcaggaagac cggcacgaag                                                    20

<210> SEQ ID NO 12
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 12
agttctacta cagaccccccg                                                   20

<210> SEQ ID NO 13
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 13
gggcaagtac gagtggcaag                                                    20

<210> SEQ ID NO 14
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 14
tggaccacga agagttaacc                                                    20

<210> SEQ ID NO 15
```

```
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 15
cagcactagc agtggcacgg                                                     20

<210> SEQ ID NO 16
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 16
ctcccaaact gacctctagg                                                     20

<210> SEQ ID NO 17
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 17
gaataagatg ttctacgccg                                                     20

<210> SEQ ID NO 18
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 18
ccccgtgcag cgagtcagag                                                     20

<210> SEQ ID NO 19
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 19
ctctcctcag taccacagca                                                     20

<210> SEQ ID NO 20
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 20
aggctccagg aatgtccgcg                                                     20

<210> SEQ ID NO 21
<211> LENGTH: 20
```

```
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 21
ccgctttcca gtgaccgacg                                                  20

<210> SEQ ID NO 22
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 22
agagcattat gggcagacag                                                  20

<210> SEQ ID NO 23
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 23
caagtaccga cgcgccagcg                                                  20

<210> SEQ ID NO 24
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 24
catcatccct cacggacccg                                                  20

<210> SEQ ID NO 25
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 25
agatatcaca cattacagtg                                                  20

<210> SEQ ID NO 26
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 26
ttagcatcaa ggcatgccat                                                  20

<210> SEQ ID NO 27
<211> LENGTH: 20
<212> TYPE: DNA
```

```
<213> ORGANISM: Artificial Sequence
<220> FEATURE:
<223> OTHER INFORMATION: Description of Artificial Sequence: Synthetic
      oligonucleotide

<400> SEQUENCE: 27
aggatcgact tgtggaacaa                                                   20

<210> SEQ ID NO 28
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 28
gagaacctcg gaacatacgg                                                   20

<210> SEQ ID NO 29
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 29
gggcccccag tagaatccgc                                                   20

<210> SEQ ID NO 30
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 30
cgaaaaagca gttccgctgg                                                   20

<210> SEQ ID NO 31
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 31
cggcgtgcga acggaatgtg                                                   20

<210> SEQ ID NO 32
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 32
gagcagcggc tgtacaaggt                                                   20

<210> SEQ ID NO 33
<211> LENGTH: 20
<212> TYPE: DNA
<213> ORGANISM: Artificial Sequence
```

```
<220> FEATURE:
<223> OTHER INFORMATION: Description of Artificial Sequence: Synthetic
      oligonucleotide

<400> SEQUENCE: 33
cttggcgtcc gtgaagatgg                                                       20

<210> SEQ ID NO 34
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 34
acggacatga agcaatatca                                                       20

<210> SEQ ID NO 35
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 35
tgaggagtac aagcaccgca                                                       20

<210> SEQ ID NO 36
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 36
gactcactga gacaaagtag                                                       20

<210> SEQ ID NO 37
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 37
tatgccatga gtgctcagag                                                       20

<210> SEQ ID NO 38
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 38
ccacttgtta acagagaccg                                                       20

<210> SEQ ID NO 39
<211> LENGTH: 20
<212> TYPE: DNA
<213> ORGANISM: Artificial Sequence
<220> FEATURE:
```

```
<223> OTHER INFORMATION: Description of Artificial Sequence: Synthetic
      oligonucleotide

<400> SEQUENCE: 39
cgtgctggtg gttcgccacg                                                   20

<210> SEQ ID NO 40
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 40
ccagtacaaa ccccagaacg                                                   20

<210> SEQ ID NO 41
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 41
tgcacagaac tatcgtacca                                                   20

<210> SEQ ID NO 42
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 42
ttccgcaaaa tagagcccca                                                   20

<210> SEQ ID NO 43
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 43
cggcgtgcga acggaatgtg                                                   20

<210> SEQ ID NO 44
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 44 gggccccag tagaatccgc                                                    20

<210> SEQ ID NO 45
<211> LENGTH: 20
<212> TYPE: DNA
<213> ORGANISM: Artificial Sequence
<220> FEATURE:
<223> OTHER INFORMATION: Description of Artificial Sequence: Synthetic
``` oligonucleotide

<400> SEQUENCE: 45
acggacatga agcaatatca                                               20

<210> SEQ ID NO 46
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 46
tgaggagtac aagcaccgca                                               20

<210> SEQ ID NO 47
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 47
agatatcaca cattacagtg                                               20

<210> SEQ ID NO 48
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 48
ttagcatcaa ggcatgccat                                               20

<210> SEQ ID NO 49
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 49
cttggcgtcc gtgaagatgg                                               20

<210> SEQ ID NO 50
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 50
gagcagcggc tgtacaaggt                                               20

<210> SEQ ID NO 51
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 51
cagcagaact ctcacgacca                                                20

<210> SEQ ID NO 52
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 52
cggcgtgcga acggaatgtg                                                20

<210> SEQ ID NO 53
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 53
atgctaggtt ggaacaactg                                                20

<210> SEQ ID NO 54
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 54
gcggcggccg acatcgcagt                                                20

<210> SEQ ID NO 55
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 55
aagcagttga tgatgtgtag                                                20

<210> SEQ ID NO 56
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 56
ttatttcaga tattcagcca                                                20

<210> SEQ ID NO 57
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

```
<400> SEQUENCE: 57 cacccccgtaa caagctgatg                                              20

<210> SEQ ID NO 58
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 58
gaagtgacca agttcactcc                                               20

<210> SEQ ID NO 59
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 59
aatcgcccac cgtagcacat                                               20

<210> SEQ ID NO 60
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 60
agccacgaag aggacaatgg                                               20

<210> SEQ ID NO 61
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 61
aggaccgcga ggccttccag                                               20

<210> SEQ ID NO 62
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 62
cacaacccac agcgacacgg                                               20

<210> SEQ ID NO 63
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 63
```
aacagacgtt gccttacatg                                              20

<210> SEQ ID NO 64
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 64
gtgaagagga ctctctgtcg                                              20

<210> SEQ ID NO 65
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 65
tcgtcggccg cgtacagctg                                              20

<210> SEQ ID NO 66
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 66
tgaggacgtg aagcgcacag                                              20

<210> SEQ ID NO 67
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 67
ccgcagcgaa cgtaccactg                                              20

<210> SEQ ID NO 68
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 68
acttcgataa tgaacttgca                                              20

<210> SEQ ID NO 69
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 69
aaggtcatgc gagacaacaa                                              20

<210> SEQ ID NO 70
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 70
tcatacgcgc cacgaagttg                                              20

<210> SEQ ID NO 71
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 71
tacctgaaat aatcgtgcaa                                              20

<210> SEQ ID NO 72
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 72
gctggtgaaa cacacgcagg                                              20

<210> SEQ ID NO 73
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 73
gagcaggcga ccgcgcagcg                                              20

<210> SEQ ID NO 74
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 74
atagctgcca tccagcccag                                              20

<210> SEQ ID NO 75
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 75
aaatcgggca cgggtaatgg                                              20

<210> SEQ ID NO 76
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 76
ggcaagtact gcattcccga                                           20

<210> SEQ ID NO 77
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 77
ccacgccgag tacctcactg                                           20

<210> SEQ ID NO 78
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 78
cacagttgcc gattacaggt                                           20

<210> SEQ ID NO 79
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 79
ctgagtgcaa gcatggcctg                                           20

<210> SEQ ID NO 80
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 80
attaccagca agtaccgtca                                           20

<210> SEQ ID NO 81
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 81
gttctatgta acaacctgcg                                           20

<210> SEQ ID NO 82
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 82
gtgaggcagg cagaaatggt                                              20

<210> SEQ ID NO 83
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 83
ggagctaatg aacgatctag                                              20

<210> SEQ ID NO 84
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 84
ctggccctgc tggtacgcgg                                              20

<210> SEQ ID NO 85
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 85
catacgggca gcacgacgcg                                              20

<210> SEQ ID NO 86
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 86
ggaccaccgc tggagcaacg                                              20

<210> SEQ ID NO 87
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 87
tcactcggtg tacgtcctgg                                              20

<210> SEQ ID NO 88
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 88
acactgagaa cttacggcag                                              20

<210> SEQ ID NO 89
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 89
agccagaccg aggcgccggt                                              20

<210> SEQ ID NO 90
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 90
aatggcgaga ctaccaccca                                              20

<210> SEQ ID NO 91
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 91
cacagcgcac cggtagctcg                                              20

<210> SEQ ID NO 92
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 92
ataacccgag acctcaaatg                                              20

<210> SEQ ID NO 93
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 93
tttatcaaca aatcaagact                                              20

<210> SEQ ID NO 94

```
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 94
atccccagga actcacacgg                                                   20

<210> SEQ ID NO 95
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 95
ctacaacggg cacacgaagg                                                   20

<210> SEQ ID NO 96
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 96
aggacagctg ggtctccaag                                                   20

<210> SEQ ID NO 97
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 97
tctgatctca ccttccacgg                                                   20

<210> SEQ ID NO 98
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 98
ccgcgggact tacgctctcg                                                   20

<210> SEQ ID NO 99
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 99
actccaccac tggctgactg                                                   20

<210> SEQ ID NO 100
<211> LENGTH: 20
```

```
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 100
tcttcaccga gggatccctg                                                   20

<210> SEQ ID NO 101
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 101
agggctggat tactacactg                                                   20

<210> SEQ ID NO 102
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 102
acggtcacct gtattcgctg                                                   20

<210> SEQ ID NO 103
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 103
gtccaagagg actctcccgg                                                   20

<210> SEQ ID NO 104
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 104
agagtgcatc gacccctcgg                                                   20

<210> SEQ ID NO 105
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 105
cagttacctt atgtaatcga                                                   20

<210> SEQ ID NO 106
<211> LENGTH: 20
<212> TYPE: DNA
```

```
<213> ORGANISM: Artificial Sequence
<220> FEATURE:
<223> OTHER INFORMATION: Description of Artificial Sequence: Synthetic
      oligonucleotide

<400> SEQUENCE: 106
tgcctctgca gtgagcaatg                                              20

<210> SEQ ID NO 107
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 107
cacttgaagt aggagcactg                                              20

<210> SEQ ID NO 108
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 108
aggccaacat gcgaaaacgc                                              20

<210> SEQ ID NO 109
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 109
tcctggaact cagaaatacg                                              20

<210> SEQ ID NO 110
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 110
cgatagacgc gtgcaccacg                                              20

<210> SEQ ID NO 111
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 111
tgggaaatta gcctaacctg                                              20

<210> SEQ ID NO 112
<211> LENGTH: 20
<212> TYPE: DNA
<213> ORGANISM: Artificial Sequence
```

```
<220> FEATURE:
<223> OTHER INFORMATION: Description of Artificial Sequence: Synthetic
      oligonucleotide

<400> SEQUENCE: 112
gggcgtggag atgtacgacc                                                    20

<210> SEQ ID NO 113
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 113
gaccaggacg agaagcaccg                                                    20

<210> SEQ ID NO 114
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 114 accccccagtg gcactaacgt                                                   20

<210> SEQ ID NO 115
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 115
cgccgcatcc acagctaccg                                                    20

<210> SEQ ID NO 116
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 116
cgggcttcat ctcttgtgtg                                                    20

<210> SEQ ID NO 117
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 117
tgaccaaaga ctgtcgaagt                                                    20

<210> SEQ ID NO 118
<211> LENGTH: 20
<212> TYPE: DNA
<213> ORGANISM: Artificial Sequence
<220> FEATURE:
```

<223> OTHER INFORMATION: Description of Artificial Sequence: Synthetic
      oligonucleotide

<400> SEQUENCE: 118
accagatcca catcaaaccg                                                      20

<210> SEQ ID NO 119
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 119
ggtgagtgga cgcaatgagg                                                      20

<210> SEQ ID NO 120
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 120
ctgcaggccg agtcgcacca                                                      20

<210> SEQ ID NO 121
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 121
acagcaagcc agtgaacctg                                                      20

<210> SEQ ID NO 122
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 122
ttgcagctcc agagtaccgt                                                      20

<210> SEQ ID NO 123
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 123
gctgcaccga gtcgtagtcg                                                      20

<210> SEQ ID NO 124
<211> LENGTH: 20
<212> TYPE: DNA
<213> ORGANISM: Artificial Sequence
<220> FEATURE:
<223> OTHER INFORMATION: Description of Artificial Sequence: Synthetic oligonucleotide

<400> SEQUENCE: 124
gatggagact ttatatgctg                                        20

<210> SEQ ID NO 125
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 125
tgaactccac aggtcactcg                                        20

<210> SEQ ID NO 126
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 126
cttcggggag acaacgacgg                                        20

<210> SEQ ID NO 127
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 127
gtgccccaga atgtcatcag                                        20

<210> SEQ ID NO 128
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 128
gctcaacgac tccattgccg                                        20

<210> SEQ ID NO 129
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 129
cacaagaaga ctcaacagga                                        20

<210> SEQ ID NO 130
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 130
gtacccttta catcgctgag                                              20

<210> SEQ ID NO 131
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 131
ttcacttgtg gcaagatcgt                                              20

<210> SEQ ID NO 132
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 132
ggtgatcaat ccttcaacag                                              20

<210> SEQ ID NO 133
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 133
tgaggatcga gatggtgcgg                                              20

<210> SEQ ID NO 134
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 134
ttggcttgca ggatttacca                                              20

<210> SEQ ID NO 135
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 135
gatacctaaa gtggagtggt                                              20

<210> SEQ ID NO 136
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

```
<400> SEQUENCE: 136
aagcggaccc actctcaggg                                                   20

<210> SEQ ID NO 137
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 137
aatagtcgct cggcccagcg                                                   20

<210> SEQ ID NO 138
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 138
tgctataaga gactaaccac                                                   20

<210> SEQ ID NO 139
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 139
gcgccgcgga tcgaatggtg                                                   20

<210> SEQ ID NO 140
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 140
cctgtacgct gcttcacttg                                                   20

<210> SEQ ID NO 141
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 141
tggtggtatt acgcttgatg                                                   20

<210> SEQ ID NO 142
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 142
```
gcagagaagg aagaaccctc                                        20

<210> SEQ ID NO 143
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 143
agtactttgc agagaccgag                                        20

<210> SEQ ID NO 144
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 144
gccgagtgga acgggcaatg                                        20

<210> SEQ ID NO 145
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 145
tagcaaaggc ttggacacgg                                        20

<210> SEQ ID NO 146
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 146
gcacttgacg ttgtaccgag                                        20

<210> SEQ ID NO 147
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 147
tggagcctaa gatccagtgg                                        20

<210> SEQ ID NO 148
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 148
cccggacaag cctatcaccc                                         20

<210> SEQ ID NO 149
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 149 caagcccttta actgaatgtg                                        20

<210> SEQ ID NO 150
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 150
caccccgcac tggcccagag                                         20

<210> SEQ ID NO 151
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 151
agtcattgtg gttacaacca                                         20

<210> SEQ ID NO 152
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 152
gagttctaga agttcccatg                                         20

<210> SEQ ID NO 153
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 153
aagcagcagt gactcgaagt                                         20

<210> SEQ ID NO 154
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 154
atcatctcac agttcaacca                                         20

<210> SEQ ID NO 155
<211> LENGTH: 20
<212> TYPE: DNA
<213> ORGANISM: Artificial Sequence
<220> FEATURE:
<223> OTHER INFORMATION: Description of Artificial Sequence: Synthetic
     oligonucleotide

<400> SEQUENCE: 155
agcccaagca gtctcgacct                                              20

<210> SEQ ID NO 156
<211> LENGTH: 20
<212> TYPE: DNA
<213> ORGANISM: Artificial Sequence
<220> FEATURE:
<223> OTHER INFORMATION: Description of Artificial Sequence: Synthetic
     oligonucleotide

<400> SEQUENCE: 156
aatatgaggt aacaccacga                                              20

<210> SEQ ID NO 157
<211> LENGTH: 20
<212> TYPE: DNA
<213> ORGANISM: Artificial Sequence
<220> FEATURE:
<223> OTHER INFORMATION: Description of Artificial Sequence: Synthetic
     oligonucleotide

<400> SEQUENCE: 157
actttgggac tataccacac                                              20

<210> SEQ ID NO 158
<211> LENGTH: 20
<212> TYPE: DNA
<213> ORGANISM: Artificial Sequence
<220> FEATURE:
<223> OTHER INFORMATION: Description of Artificial Sequence: Synthetic
     oligonucleotide

<400> SEQUENCE: 158
gctatacgta ttggtcacgt                                              20

<210> SEQ ID NO 159
<211> LENGTH: 20
<212> TYPE: DNA
<213> ORGANISM: Artificial Sequence
<220> FEATURE:
<223> OTHER INFORMATION: Description of Artificial Sequence: Synthetic
     oligonucleotide

<400> SEQUENCE: 159
cgaccaccgg agaattcctg                                              20

<210> SEQ ID NO 160
<211> LENGTH: 20
<212> TYPE: DNA
<213> ORGANISM: Artificial Sequence
<220> FEATURE:
<223> OTHER INFORMATION: Description of Artificial Sequence: Synthetic
     oligonucleotide

<400> SEQUENCE: 160
ggctcggcct acattgagca                                              20

```
<210> SEQ ID NO 161
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 161
accaatagca aactccacca                                               20

<210> SEQ ID NO 162
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 162
ataaactaaa accctacatg                                               20

<210> SEQ ID NO 163
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 163
gaccagcaca caaagctggg                                               20

<210> SEQ ID NO 164
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 164
tggccggccc aagatcgacg                                               20

<210> SEQ ID NO 165
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 165
tcagcagcaa tggactcttg                                               20

<210> SEQ ID NO 166
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 166
tccgatcgct accagacagt                                               20
```

<210> SEQ ID NO 167
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 167
aactcgctcc ccaagcccgt                                              20

<210> SEQ ID NO 168
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 168
atttcatcaa aggattcatc                                              20

<210> SEQ ID NO 169
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 169
gtggcgagct acgagaacga                                              20

<210> SEQ ID NO 170
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 170
accaagttgg acttacagag                                              20

<210> SEQ ID NO 171
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 171
agctccggga cttcaacagg                                              20

<210> SEQ ID NO 172
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 172
tcgtccatga accttcctgg                                              20

<210> SEQ ID NO 173

<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 173
gatgccgcag taccagacct                                               20

<210> SEQ ID NO 174
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 174
gcacaacatc acccgcaagg                                               20

<210> SEQ ID NO 175
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 175
gacaactcgt ggatgctccg                                               20

<210> SEQ ID NO 176
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 176
ctatggctca ttcgttaccc                                               20

<210> SEQ ID NO 177
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 177
ctgcagaggc caaagcacgg                                               20

<210> SEQ ID NO 178
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 178
tggaagggaa gatagtcagt                                               20

<210> SEQ ID NO 179
<211> LENGTH: 20

<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 179
attgtgttgc aggattggga                                               20

<210> SEQ ID NO 180
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 180
ggatgcggat atagaaccgg                                               20

<210> SEQ ID NO 181
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 181
cacaccacag acagctaccg                                               20

<210> SEQ ID NO 182
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 182
acaatcggtc caatacccca                                               20

<210> SEQ ID NO 183
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 183
aagatgacct cactaaccag                                               20

<210> SEQ ID NO 184
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 184
gctcccattc aaagtttgcg                                               20

<210> SEQ ID NO 185
<211> LENGTH: 20
<212> TYPE: DNA

```
<213> ORGANISM: Artificial Sequence
<220> FEATURE:
<223> OTHER INFORMATION: Description of Artificial Sequence: Synthetic
      oligonucleotide

<400> SEQUENCE: 185
gactggtgat gaatacaatg                                              20

<210> SEQ ID NO 186
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 186
agtgttacga accatccccc                                              20

<210> SEQ ID NO 187
<211> LENGTH: 18
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 187
tgtcgtacgc tacaagca                                                18

<210> SEQ ID NO 188
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 188
gcgccgacac acacgcaatg                                              20

<210> SEQ ID NO 189
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 189
catcgtcaga cgctacaagg                                              20

<210> SEQ ID NO 190
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 190
tggtggtgag cagacgacaa                                              20

<210> SEQ ID NO 191
<211> LENGTH: 20
<212> TYPE: DNA
<213> ORGANISM: Artificial Sequence
```

```
<220> FEATURE:
<223> OTHER INFORMATION: Description of Artificial Sequence: Synthetic
      oligonucleotide

<400> SEQUENCE: 191
aggaggcaca gatcattcag                                                   20

<210> SEQ ID NO 192
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 192
tggctcgtgc atgacaggag                                                   20

<210> SEQ ID NO 193
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 193
taattgaacg ttcgaacacc                                                   20

<210> SEQ ID NO 194
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 194
aaaccaacct caccttccca                                                   20

<210> SEQ ID NO 195
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 195
gcagcgcgat gttgatggcg                                                   20

<210> SEQ ID NO 196
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 196
agggcatgct taccacccag                                                   20

<210> SEQ ID NO 197
<211> LENGTH: 20
<212> TYPE: DNA
<213> ORGANISM: Artificial Sequence
<220> FEATURE:
```

<223> OTHER INFORMATION: Description of Artificial Sequence: Synthetic
      oligonucleotide

<400> SEQUENCE: 197
agtccatcca gtgtccccag                                                  20

<210> SEQ ID NO 198
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 198
tgtgaagggc tacatctacg                                                  20

<210> SEQ ID NO 199
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 199
aggtccctgg aacggatgga                                                  20

<210> SEQ ID NO 200
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 200
cctgtgaagg cgattgaccg                                                  20

<210> SEQ ID NO 201
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 201
ctgtacctgg tccaatactg                                                  20

<210> SEQ ID NO 202
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 202
tttataatga gagagcagct                                                  20

<210> SEQ ID NO 203
<211> LENGTH: 20
<212> TYPE: DNA
<213> ORGANISM: Artificial Sequence
<220> FEATURE:
<223> OTHER INFORMATION: Description of Artificial Sequence: Synthetic oligonucleotide

<400> SEQUENCE: 203
aagaggcatt gctctatggg                                               20

<210> SEQ ID NO 204
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 204
ctggcatcag ccgaacagca                                               20

<210> SEQ ID NO 205
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 205
agtagcgcgc agacccgctg                                               20

<210> SEQ ID NO 206
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 206
ggcgcccagc gaatgaaccg                                               20

<210> SEQ ID NO 207
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 207
tgggagtgaa agcagaaatg                                               20

<210> SEQ ID NO 208
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 208
agcccttacc ggaatacgtg                                               20

<210> SEQ ID NO 209
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

```
<400> SEQUENCE: 209
aaacttggca agcaaacctg                                                   20

<210> SEQ ID NO 210
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 210
atagcgatca aagtcccgtg                                                   20

<210> SEQ ID NO 211
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 211
aagcgctcaa atcggaccaa                                                   20

<210> SEQ ID NO 212
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 212
gggtagtgga gctcagacag                                                   20

<210> SEQ ID NO 213
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 213
aggtaccctc cgacccacca                                                   20

<210> SEQ ID NO 214
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 214
tgaaggtctg agcatgcttg                                                   20

<210> SEQ ID NO 215
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide
```

```
<400> SEQUENCE: 215
gatggagaca gtgtacaccc                                              20

<210> SEQ ID NO 216
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 216
tggacggccg gaatttccat                                              20

<210> SEQ ID NO 217
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 217
ccgatgctga agtggaacca                                              20

<210> SEQ ID NO 218
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 218
ctgtaggttt agttgagcac                                              20

<210> SEQ ID NO 219
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 219
tggaggcggc cgataacgtg                                              20

<210> SEQ ID NO 220
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 220
tctgatcaat gtcctaatgt                                              20

<210> SEQ ID NO 221
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 221
```
atgtgctcaa tgaagtcatg    20

<210> SEQ ID NO 222
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 222
acggggaacc tgctgaactg    20

<210> SEQ ID NO 223
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 223
gagtgcgcac ttcatccatg    20

<210> SEQ ID NO 224
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 224
tggagtgacc acatagcctg    20

<210> SEQ ID NO 225
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 225
agagcacgcg ttctgacccc    20

<210> SEQ ID NO 226
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 226
gaccgagcta ctcagcacca    20

<210> SEQ ID NO 227
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 227

```
tggtatgacg aagggtacag                                          20
```

<210> SEQ ID NO 228
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 228

```
tggcacatac tcactaaccc                                          20
```

<210> SEQ ID NO 229
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 229

```
tactctcaac aagttcacag                                          20
```

<210> SEQ ID NO 230
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 230

```
tagggagtga tccacacgat                                          20
```

<210> SEQ ID NO 231
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 231

```
atgaagtggc tgtcaaggag                                          20
```

<210> SEQ ID NO 232
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 232

```
cagcctgaat gtcaataacg                                          20
```

<210> SEQ ID NO 233
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 233

```
cttacgtgaa acccttcaga                                          20
```

<210> SEQ ID NO 234
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 234
gttgcgaagg atccccaacg                                          20

<210> SEQ ID NO 235
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 235
cagcggctgc cggaacactg                                          20

<210> SEQ ID NO 236
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 236
tgatctcctt gatcggaagg                                          20

<210> SEQ ID NO 237
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 237
aggagatgaa ttgatgaccc                                          20

<210> SEQ ID NO 238
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 238
ctccgccgga gtccaaacgg                                          20

<210> SEQ ID NO 239
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 239
gagatcggcc agaaccacca                                          20

<210> SEQ ID NO 240
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 240
cctttgatag atctctgccg                                              20

<210> SEQ ID NO 241
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 241
gaaacattgg ccctttatgg                                              20

<210> SEQ ID NO 242
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 242
gcacagcgcc gtgatagaca                                              20

<210> SEQ ID NO 243
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 243
gctatctcca tgccatgtga                                              20

<210> SEQ ID NO 244
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 244
tgaagaacag aaggcgatca                                              20

<210> SEQ ID NO 245
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 245
gccttcgatc aagtgcactg                                              20

```
<210> SEQ ID NO 246
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 246
gacttgcaga ctgaaccctg                                             20

<210> SEQ ID NO 247
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 247
caacagcaac atgagccccg                                             20

<210> SEQ ID NO 248
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 248
tgtctacatg gaacttgtgt                                             20

<210> SEQ ID NO 249
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 249
ggatggcagc tatttgctga                                             20

<210> SEQ ID NO 250
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 250
ggtgaagcgc accaacagag                                             20

<210> SEQ ID NO 251
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 251
aacagcatta tcgataaggt                                             20

<210> SEQ ID NO 252
```

```
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 252
tcaaggatgg aacaagacca                                               20

<210> SEQ ID NO 253
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 253
ggcgtagtca atgtcactgg                                               20

<210> SEQ ID NO 254
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 254
tggttagcag tactgtgact                                               20

<210> SEQ ID NO 255
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 255
gacccactgg ttacctacga                                               20

<210> SEQ ID NO 256
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 256
acccatgcat atatgcccgg                                               20

<210> SEQ ID NO 257
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 257
gcgtctaatc acgggactcg                                               20

<210> SEQ ID NO 258
<211> LENGTH: 20
```

```
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 258
tgtagagctt ccgcgtgagg                                              20

<210> SEQ ID NO 259
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 259
gaggcatcgc tggagctacg                                              20

<210> SEQ ID NO 260
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 260
tttaccagtt tgtatccaag                                              20

<210> SEQ ID NO 261
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 261
cagagtatga atcaacacaa                                              20

<210> SEQ ID NO 262
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 262
gctcaaacat gttgaccccg                                              20

<210> SEQ ID NO 263
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 263
gtaatgttgg tgtatccatg                                              20

<210> SEQ ID NO 264
<211> LENGTH: 20
<212> TYPE: DNA
```

<213> ORGANISM: Artificial Sequence
<220> FEATURE:
<223> OTHER INFORMATION: Description of Artificial Sequence: Synthetic
      oligonucleotide

<400> SEQUENCE: 264
tcatcaggaa ccatgatcag                                              20

<210> SEQ ID NO 265
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 265
tcgccgaata gattcaacaa                                              20

<210> SEQ ID NO 266
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 266
ctggacgacc gccacgacag                                              20

<210> SEQ ID NO 267
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 267
taattggttt ctgtacccac                                              20

<210> SEQ ID NO 268
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 268
aaagagaaag ccagatatgg                                              20

<210> SEQ ID NO 269
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 269
ttgcaatacc agcatcacat                                              20

<210> SEQ ID NO 270
<211> LENGTH: 20
<212> TYPE: DNA
<213> ORGANISM: Artificial Sequence

```
<220> FEATURE:
<223> OTHER INFORMATION: Description of Artificial Sequence: Synthetic
      oligonucleotide

<400> SEQUENCE: 270
gtgactccgc acatactcaa                                                   20

<210> SEQ ID NO 271
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 271
aggatgcgga tatagaaccg                                                   20

<210> SEQ ID NO 272
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 272
gtggctgtgc acaacaaccg                                                   20

<210> SEQ ID NO 273
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 273
atggcaagag aattactggg                                                   20

<210> SEQ ID NO 274
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 274
catggggaag ggtatcggga                                                   20

<210> SEQ ID NO 275
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 275
gaagacgcag gacctgatag                                                   20

<210> SEQ ID NO 276
<211> LENGTH: 20
```

```
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 276
cagggagtgt gtgaactgtg                                              20

<210> SEQ ID NO 277
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 277
ttggggttta cattgtaacg                                              20

<210> SEQ ID NO 278
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 278
aggagtccga gtacacgccg                                              20

<210> SEQ ID NO 279
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 279
agtagtttgg gtgtgatgga                                              20

<210> SEQ ID NO 280
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 280
aagtgcgtgt ttgttaccgt                                              20

<210> SEQ ID NO 281
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 281
aaataaaagc cctcaaccgg                                              20
```